United States Patent [19]
Hirata et al.

[11] Patent Number: 5,485,308
[45] Date of Patent: Jan. 16, 1996

[54] REAR-PROJECTION TYPE IMAGE DISPLAY APPARATUS AND REAR-PROJECTION TYPE SCREEN

[75] Inventors: Koji Hirata, Kamakura; Takahiko Yoshida, Miura; Hiroki Yoshikawa, Hiratsuka; Masayuki Muranaka; Atsuo Osawa, both of Yokohama; Yutaka Matuda, Fujisawa, all of Japan

[73] Assignee: Hitachi, Ltd., Tokyo, Japan

[21] Appl. No.: 387,354

[22] Filed: Feb. 13, 1995

Related U.S. Application Data

[63] Continuation of Ser. No. 994,101, Dec. 21, 1992, abandoned.

[30] Foreign Application Priority Data

| Dec. 24, 1991 | [JP] | Japan | 3-355569 |
| Jun. 1, 1992 | [JP] | Japan | 4-140388 |
| Jul. 30, 1992 | [JP] | Japan | 4-203450 |
| May 15, 1994 | [JP] | Japan | 4-123462 |

[51] Int. Cl.$^6$ ............................................... G03B 21/60
[52] U.S. Cl. ................................... 359/457; 359/460
[58] Field of Search ............................ 359/454, 455, 359/456, 457, 460

[56] References Cited

U.S. PATENT DOCUMENTS

| 4,399,455 | 8/1983 | Alvarez | 358/60 |
| 4,859,027 | 8/1989 | Kishida | 350/128 |
| 4,919,518 | 4/1989 | Ogino et al. | 350/128 |
| 5,066,099 | 11/1991 | Yoshida et al. | 359/457 |

*Primary Examiner*—Michael L. Gellner
*Assistant Examiner*—D. P. Malley
*Attorney, Agent, or Firm*—Antonelli, Terry, Stout & Kraus

[57] ABSTRACT

A rear-projection screen for a rear-projection image display apparatus comprises a Fresnel lens sheet, a first lenticular lens sheet, and a second lenticular lens sheet or a Fresnel lens sheet, first and second lenticular lens sheets and a light absorbing sheet. A light entrance surface of the first lenticular lens sheet or a light exit surface thereof, or both of these surfaces are formed by contiguously and vertically arranging a plurality of horizontally elongate lenticular lenses. A thickness of the first lenticular lens sheet is selected to be the thinner than thicknesses of the Fresnel lens sheet, the second lenticular lens sheet, and the light absorbing sheet. The entrance surface and the exit surface of the second lenticular lens sheet are formed by contiguously and horizontally arranging a plurality of vertically elongate lenticular lenses. Particles of a light diffusing material are not necessarily dispersed in the base sheet of the second lenticular lens sheet. The rear-projection image display apparatus provided with this rear-projection screen has satisfactory focusing characteristics and enhanced vertical directional characteristics and is capable of displaying an image in high brightness and high contrast.

23 Claims, 50 Drawing Sheets

VERTICAL VIEWING ANGLE β (DEGREE)

FIG. 58A
FIG. 58B
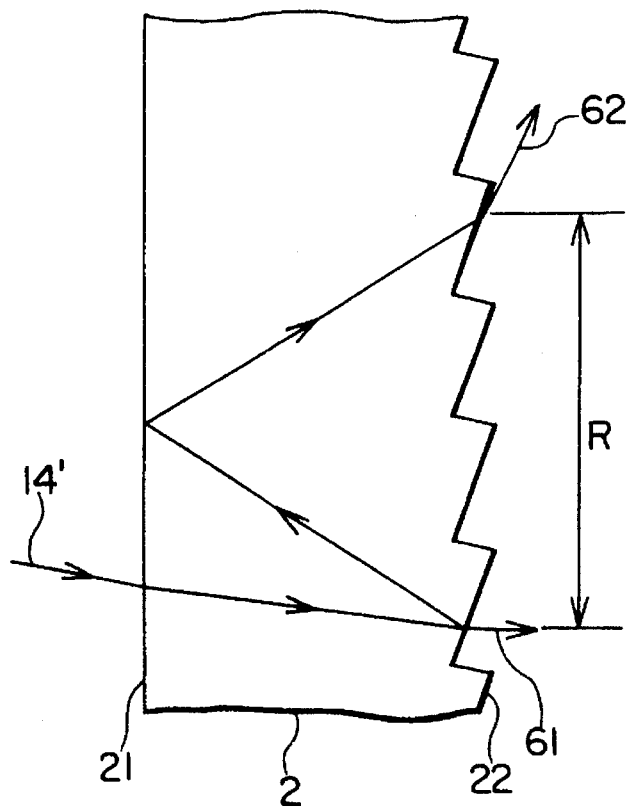
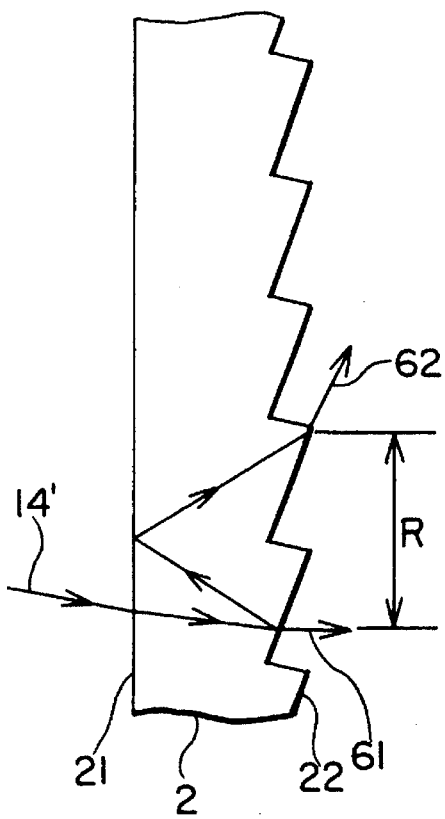

1

REAR-PROJECTION TYPE IMAGE DISPLAY APPARATUS AND REAR-PROJECTION TYPE SCREEN

This application is a continuation of Ser. No. 07/994,101, filed Dec. 21, 1992, now abandoned.

BACKGROUND OF THE INVENTION

FIELD OF THE INVENTION

The present invention relates to a rear-projection type screen and to a rear-projection type image display apparatus employing the rear-projection type screen.

A rear-projection type image display apparatus such as a rear-projection type television receiver has been marketed in which an image displayed on a projection type CRT (cathode-ray tube), or a liquid crystal display device functioning as a small-sized image generating source is magnified by way of a projection lens, and then the magnified image is projected on a rear-projection type screen.

Since the image quality of the rear-projection type image display apparatus has been greatly improved in recent years and the feelings of reality can be enjoyed by a large-screen, such rear-projection type image display apparatuses have come into wide use in the domestic and industrial fields.

When the rear-projection type image display apparatus uses a projection type CRT as a video source (image generating source), an image of the three primary colors is composed on a rear-projection screen by combining red, green and blue images by the combined function of a CRT and a projection lens to display the image in a sufficiently high brightness on the rear-projection screen.

As stated in JP-A-56-117226 and 58-93043, such a rear-projection type image display apparatus employs a two-layer laminated rear-projection screen constructed of a Fresnel lens sheet and a lenticular lens sheet. The lenticular lens sheet includes a light diffusion material dispersed as particles into the lenticular sheet or stacked in a diffusion layer over the surface of the lenticular lens.

FIG. 1 is a perspective view of an essential portion of a prior art rear-projection type screen.

Referring to FIG. 1, a rear-projection type screen 1 is arranged by a Fresnel lens sheet 2 positioned at the side of the image generating source (CRT screens). Reference numeral 4' denotes a lenticular lens sheet. The respective base sheets of the Fresnel lens sheet 2 and the lenticular lens sheet 4' are formed of a transparent, thermoplastic resin. Particles of a diffusion material 15 are dispersed in the base sheet of the lenticular lens sheet 4'. The Fresnel lens sheet 2 has an entrance surface 21 and an exit surface 22. The entrance surface 21 has the shape of a vertical arrangement of a plurality of horizontally elongate lenticular lenses each having the shape of a portion of a cylinder along a longitudinal direction corresponding to a screen horizontal direction, and the exit surface 22 has the shape of the stepped setbacks of a Fresnel lens.

The lenticular lens sheet 4' has an entrance surface 41' formed by horizontally arranging a plurality of first vertically elongate lenticular lenses, and an exit surface 42' formed by horizontally arranging a plurality of second vertically elongate lenticular lenses substantially similar to the first vertically elongate lenticular lenses, and a plurality of ridges 43' formed between the adjacent second vertically elongate lenticular lenses, respectively. The upper surface of

2 each ridge 43' is stacked with a light absorbing strip (black strip) 16.

In the above-described conventional rear-projection screen, light rays emitted from points on an image displayed on the screen of a projection CRT travel through a projection lens, not shown, and fall on the entrance surface 21 of the Fresnel lens sheet 2. If the entrance surface 21 is a flat plane and no lenticular lens is employed, the light rays emerging from the exit surface 22 of the Fresnel lens 2 are collimated substantially by the Fresnel lens forming the exit surface 22 of the Fresnel lens sheet 2, and then the substantially parallel light rays fall on the lenticular lens sheet 4'.

The parallel light rays are directed toward a focus near the second vertically elongate lenticular lenses forming the exit surface 42' by the first vertically elongate lenticular lenses forming the entrance surface 41', the light rays are diffused horizontally from the focal point, the light rays are diffused vertically and horizontally by the particles of the diffusion material 15 dispersed in the base sheet of the lenticular lens sheet 4', and emerges from the surface of the lenticular lens sheet 4' on the image viewing side.

However, since the entrance surface 21 of the Fresnel lens sheet 2 is formed of the horizontally elongate lenticular lenses, as shown in FIG. 1, the light rays falling on the entrance surface 21 of the Fresnel lens sheet 2 are diffused vertically by the horizontally elongate lenticular lenses, and the light rays are further diffused vertically by the particles of the diffusion material 15 dispersed in the base sheet of the lenticular lens sheet 4'.

The horizontally elongate lenticular lenses forming the entrance surface 21 of the Fresnel lens sheet 2 will be now described more in detail as follows.

Referring to FIG. 2, shown is the Fresnel lens sheet 2 of the rear-projection screen 1 of FIG. 1 in a vertical sectional view. In FIG. 2, reference numeral 14 indicates incident light rays.

In FIG. 2, as previously described, the light entrance surface 21 of the Fresnel lens sheet 2 has such a shape that a plurality of the horizontally elongate lenticular lenses constructed of a portion of a cylinder along the longitudinal direction corresponding to the screen horizontal direction are arranged along the vertical direction of the screen. A pitch of this horizontally elongate lenticular lense is selected to be smaller than the pitch of the scanning line for the projected image, or the pitch of the pixel. Furthermore, the pitch of the lenticular lenses is determined so that Moiré resulting from interference between the lenticular lenses and the scanning lines and Moiré resulting from interference between the lenticular lenses and portions of the rings of the Fresnel lens of the Fresnel lens sheet 2, corresponding to the upper and lower portions of the screen are minimized.

More concretely, the horizontally elongate lenticular lenses are arranged at a pitch sufficiently smaller than those of the first vertically elongate lenticular lenses and the second vertically elongate lenticular lenses of the lenticular lens sheet 4', and the pitch of the horizontally elongate lenticular lenses is determined so that the ratio between the pitch of the scanning lines and the pitch of the horizontally elongate lenticular lens is not the simple ratio of integers.

For example, assuming now that the rear-projection type screen is selected to be 800 mm in horizontal size and 600 mm in vertical size, the horizontal screen pitch is 0.78 mm, and the number of horizontal scanning lines displayed on the rear-projection screen is 480, the pitch of the scanning lines is 1.25 mm. In most cases, the pitch of the ridges of the Fresnel lens is in the range of about 0.1 mm to about 0.12 mm, and the pitch of the horizontally elongate lenticular lenses is in the range of about 0.08 mm to about 0.1 mm, when the pitch of scanning lines is 1.25 mm.

On the other hand, when the incident light rays 14 fall on the horizontally elongate lenticular lenses forming the entrance surface 21, the angle of incidence of the light rays 14 for the same scanning line or the same picture element is dependent on the point of incidence, even if the same scanning lines or the same pixels are present. Accordingly, the light rays 14 are refracted at different angles of refraction, so that the incident light rays 14 are diffused vertically. Furthermore, if the radius of curvature of the horizontally elongate lenticular lens is relatively small, the incident angles of the incident light rays are relatively large and, consequently, the light rays 14 are diffused in a greater angular range so that directivity is widened, namely, a so-called vertical viewing angle increases.

The vertically elongate lenticular lenses forming the entrance surface 41' and exit surface 42' of the lenticular lens sheet 4' will be now described more in detail hereinafter.

FIGS. 3 and 4 show the lenticular lens sheet 4' of the rear-projection screen 1 as a horizontal sectional view.

In FIG. 3 and FIG. 4, the surface of each first vertically elongate lenticular lens forming the entrance surface 4' is a portion of the surface of an elliptic cylinder of a cross section having the shape of an ellipse having a major axis extending in the direction of the thickness (indicated by 1,1' in drawing) of the lenticular lens sheet 4' having one focus positioned within the base sheet and the other focus positioned near the exit surface 42'. The eccentricity "e" of the ellipse is approximately equal to the reciprocal of the refractive index "n" of the base sheet.

As shown in FIG. 3, all the green rays falling on the first vertically elongate lenticular lens in parallel to the major axis of the ellipse converge on the focus positioned near the exit surface 42', and then the green rays diverge horizontally from the focus. As shown in FIG. 4, all the red and blue rays falling on the first vertically elongate lenticular lens at an angle to the major axis of the ellipse converge on the focus positioned near the exit surface 42', and then the red and blue rays diverge horizontally from the focal point.

The surface of each second vertically elongate lenticular lens forming the exit surface 42' is a portion of the surface of an elliptic cylinder substantially resembling the mirror image of the surface of the corresponding first vertically elongate lenticular lens. The second vertically elongate lenticular lens makes the horizontal directional characteristics of the emerging red, green and blue rays parallel to each other.

The light diffusion material 15 dispersed in the base sheet of the lenticular lens sheet 4', will now be described more in detail hereinafter.

FIGS. 5A and 5B show the lenticular lens sheet 4' of the rear-projection screen 1 of FIG. 1 in sectional views. FIG. 5A represents a vertical sectional view of a portion of one lenticular lens at the right exit surface 42', and FIG. 5B shows a horizontal sectional view thereof.

In FIGS. 5A and 5B, the light diffusing material are dispersed as particles in the base sheet of the lenticular lens sheet 4' to diffuse the incident light rays 14 vertically and horizontally while the incident light rays 14 travel from the entrance surface 41' to the exit surface 42'. The angular range of diffusion of the light rays 14 increases, the directional characteristics are widened and the viewing angle increases with the increase of the quantity of the light diffusing material contained in the base sheet of the lenticular lens sheet 4'.

There are certain problems in the foregoing prior art transparent screen (TS) to be solved, which will now be described hereinafter.

A first problem is an insufficient range in the vertical viewing angle and the horizontal viewing angle.

FIG. 6 is an explanatory diagram for explaining a generic horizontal viewing angle and a generic vertical viewing angle. It is assumed that a horizontal viewing angle and a vertical viewing angle are 0 degree, respectively, when a viewer is positioned directly opposite to the transparent screen (along the direction of FD). The brightness of the image point on the rear-projection screen TS as viewed from the viewing position on the line FD is $B_0$, and the brightness of the image point as viewed from a viewing position on a line extending at a horizontal angle $\alpha$ is $B_\alpha$. Then, a ratio (relative brightness RB) $H=B_\alpha/B_0$ is obtained. Similarly, the brightness of the image point as viewed from a viewing position on a line extending at a vertical viewing angle $\beta$ is $B_\beta$ and a ratio (relative brightness RB) $H=B_\beta/B_0$ is obtained.

If the relative brightness H is smaller than a threshold, the image is scarcely visible. The ranges of the horizontal viewing angle $\alpha$ and the vertical viewing angle $\beta$, in which the image is visible, will be referred to as a horizontal angular range (HR) of visibility and a vertical angular range (VR) of visibility, respectively. The horizontal viewing angle $\alpha$ and the vertical viewing angle $\beta$ making the relative brightness $H=B/B_0=50\%$ and the relative brightness $H=B_\alpha/B_0=50\%$ will be referred to as a specific horizontal viewing angle and the specific vertical viewing angle, respectively.

FIG. 7 is a graph showing the directional characteristics of the prior art rear-projection screen, in which the horizontal viewing angle $\alpha$ and the vertical viewing angle $\beta$ are measured on the horizontal axis, a curve indicated by solid lines represents horizontal directional characteristics (HDC), and a curve indicated by broken lines represents vertical directional characteristics (VDC).

As shown in FIG. 7, the image on the rear-projection screen is invisible when the horizontal viewing angle $\alpha$ is outside an angular range of ±47° or when the vertical viewing angle $\beta$ is outside an angular range of ±25°. The vertical viewing angle, at which the relative brightness (RB) $H=B_\beta/B_0=50\%$, is as small as on the order of ±9°.

FIG. 8 is a graph showing the vertical directional characteristics (VDC) of the horizontally elongate lenticular lens of the Fresnel lens sheet 2 of the prior art rear-projection screen.

As shown in FIG. 8, the prior art rear-projection screen having the Fresnel lens sheet 2 provided with horizontally elongate lenticular lenses having a radius of curvature on the order of 0.3 mm has a vertical angular range of visibility on the order of ±4°. The combined functions of the horizontally elongate lenticular lenses and the light diffusing material dispersed in the base sheet of the lenticular lens sheet 4' makes the vertical angular range of visibility of the rear-projection screen ±25°.

FIG. 9 is a graph showing desirable directional characteristics of a rear-projection screen.

As shown in FIG. 9, the vertical directional characteristics and the horizontal directional characteristics are wider than those of the prior art rear-projection screen, and both the desirable horizontal angular range of visibility and the desirable vertical angular range of visibility are on the order of ±70°.

The expansion of the vertical directional characteristics and increase in the specific vertical viewing angle to improve the directional characteristics of the prior art rear-projection screen can be achieved by increasing the quantity of the light diffusing material 15 contained in the base sheet of the lenticular lens sheet 4' or reducing the radius of curvature of the horizontally elongate lenticular lenses forming the entrance surface 21 of the Fresnel lens sheet 2.

However, increase in the quantity of the light diffusing material 15 contained in the base sheet of the lenticular lens sheet 4' of the prior art rear-projection screen entails the following problems.

FIG. 10 is a vertical sectional view of the rear-projection screen of FIG. 1, showing the vertical diffusion of the incident light rays. FIG. 11 is a schematic sectional view for representing that the incident light rays are diffused in the horizontal direction of the screen image in the horizontal section of the rear-projection screen shown in FIG. 1. Reference numeral 14 denotes incident light rays.

As shown in FIG. 10 and FIG. 11, the incident light rays 14 falling on the Fresnel lens sheet 2 are refracted and diffused vertically by the horizontally elongate lenticular lenses forming the entrance surface 21. The diffused light rays fall on the lenticular lens sheet 4'. Since the diffused light rays are further diffused by the light diffusing material 15 contained in the base sheet of the lenticular lens sheet 4' as the diffused light rays travel through the lenticular lens sheet 4', the width "d" of the light rays outgoing is much greater than the width of the incident light rays 14, and the width of the scanning line or the size of the picture element is increased on the exit surface 42' and, consequently, the image focusing characteristics is deteriorated.

At this time, if the quantity of the light diffusing material 15 contained in the base sheet of the lenticular lens sheet 4' is increased to enhance the vertical directional characteristics of the rear-projection screen, the width of the scanning line or the size of the picture element will be further increased on the exit surface 42' of the lenticular lens sheet 4' and, consequently, the image focusing characteristics will be further deteriorated.

As shown in FIGS. 10 and 11, the incident light rays 14 undergo not only diffusion but also scattering in the lenticular lens sheet 4' by the base sheet containing the light diffusing material 15. Therefore, some of the light rays 14 are reflected toward the entrance surface 41', stray in the lenticular lens sheet 4' or are absorbed by the light absorbing strips 16. Such light rays are unable to reach the foci positioned near the exit surface 42' and unable to emerge from the exit surface 42', which reduces the brightness of the rear-projection screen. The degree of reduction in the brightness increases with increase in the light diffusing material content of the base sheet of the lenticular lens sheet 4'.

The light rays among the incident light rays 14, scattered by the light diffusing material 15 and strayed in the lenticular lens sheet 4' are unnecessarily reflected repeatedly in the projecting optical system and some of the finally reach the screen plane (namely, the exit surface 42' of the lenticular lens sheet 4') to deteriorate the contrast of the image. Although nearly half of the ambient light, such as illuminating light, is absorbed by the light absorbing strips 16 formed on the exit surface 42' of the lenticular lens sheet 4', the ambient light falling on the second vertically elongate lenticular lenses forming the exit surface 42' is reflected diffusibly by the light diffusing material 15, which also deteriorates contrast in the image. Thus, the effect of the light diffusing material 15 on the deterioration of contrast is significant.

Reduction in the radius of curvature of the horizontally elongate lenticular lenses forming the entrance surface 21 of the Fresnel lens sheet 2 of the prior art rear-projection screen entails the following problems.

As shown in FIG. 10 and FIG. 11, as previously explained, the incident light rays 14 falling on the Fresnel lens sheet 2 are refracted and diffused vertically by the horizontally elongate lenticular lenses forming the entrance surface 21, the vertically diffused light rays fall on the lenticular lens sheet 4', and the vertically diffused light rays are further diffused by the light diffusing material 15 dispersed in the base sheet of the lenticular lens sheet 4'. Accordingly, the width "d" of the light rays on the exit surface 42' of the lenticular lens sheet 4' is greater than that of the incident light rays 14 on the entrance surface 21 of the Fresnel lens sheet 2. Consequently, the width of a scanning line or the size of a picture element is increased on the exit surface 42' to deteriorate the image focusing characteristics.

At this time, if the radius of curvature of the horizontally lenticular lenses forming the entrance surface 21 of the Fresnel lens sheet 2 is reduced to enhance the vertical directional characteristics, the width of a scanning line or the size of a picture element on the exit surface 42' of the lenticular lens sheet 4' is further increased.

Thus, it is impossible to enhance the vertical directional characteristics of the prior art rear-projection screen without deteriorating the image focusing characteristics, brightness and contrast.

A second problem is the reduction of color shift. Color shift is the variation of the color of an image according to the horizontal viewing angle α resulting from change in the color balance of the three primary colors, i.e., red, green and blue, due to slight difference between the respective directional characteristics of the three primary colors when the red, green and blue light rays are diffused horizontally by the lenticular lens sheet 4', details of which will be given later.

As mentioned above, the surfaces of the second vertically elongate lenticular lenses forming the exit surface 42' of the lenticular lens sheet 4' make the incident red, green and blue rays substantially parallel to each other. Such a function of the vertically elongate lenticular lenses reduces color shift to some extent. However, the affect of this function is not necessarily satisfactory.

FIG. 12 is a graph showing the directional characteristics of the lenticular lens sheet 4' of FIG. 4 for red rays and blue rays.

As shown in FIG. 12, the difference in relative brightness (RB) between red rays and blue rays for horizontal viewing angle α=45° is 50% and such a large difference causes color shift. Accordingly, the difference in relative brightness (RB) between red rays and blue rays needs to be reduced greatly.

Thus, as previously explained, there is such a problem that the degree of color shift with the prior art rear-projection screen is not small enough.

A third problem is the minimization of Moiré. As mentioned above, efforts are made in determining the dimensions of the components (e.g. pitch) of the prior art rear-projection screen so that Moireé becomes less. However, a sufficient effect has not been obtained yet. Because horizontal bright lines and horizontal dark lines are formed alternately on the exit surface 22 of the Fresnel lens sheet 2 of the rear-projection screen due to the light focusing characteristics of the horizontally elongate lenticular lenses, the details of which will be given later.

Thus, the prior art rear-projection screen is unable to minimize Moire satisfactorily to a small extent.

SUMMARY OF THE INVENTION

The present invention has been made in view of the foregoing problems in the prior art rear-projection screen and it is therefore an object of the present invention to provide a rear-projection screen capable of focusing an image satisfactorily, of displaying the image in a sufficiently high brightness and high contrast and of minimizing color shift and Moiré to a satisfactorily small extent, and having high vertical directional characteristics.

To achieve the above-described object, according to one aspect of the present invention, a rear-projection screen for a rear-projection image display is of a three-layer laminated structure constructed of a Fresnel lens sheet, a first lenticular lens sheet, and a second lenticular lens sheet. Alternatively, in addition thereto, a semi-transparent colored light absorbing sheet is provided nearest the image observation side, namely the rear-projection screen of the present invention is constructed of a 4-layer laminated structure. Then, a shape, or shapes of a light entrance surface, and/or a light exit surface of the first lenticular lens sheet that a plurality of aspherical horizontally elongated lenticular lens having a longitudinal direction corresponding to the screen horizontal direction are arranged in the screen vertical direction, whereas shapes of a light entrance surfaces and a light exit surface of the second lenticular lens sheet are formed in such a manner that a plurality of aspherical vertically elongated lenticular lenses having a longitudinal direction corresponding to the screen vertical direction are arranged in the screen horizontal direction.

The light rays are diffused in the vertical direction of the screen plane by mainly either the light entrance surface of the first lenticular lens sheet, or the light exit surface thereof, otherwise by the horizontally elongate lenticular lens provided at both of these surfaces. Auxiliarly, such a light ray diffusion is performed by way of a light diffusing material of the first lenticular lens sheet, a light diffusing material of the second lenticular lens sheet, or a light diffusing material of the light absorbing sheet. Furthermore, the light rays are diffused along the horizontal direction of the screen plane by mainly vertically elongate lenticular lens provided at the light entrance surface and the light exit surface of the second lenticular lens.

Moreover, a thickness of the first lenticular lens sheet is made thinner than the thicknesses of the above-described Fresnel lens sheet, first and second lenticular lens sheets, and light absorbing sheet.

To achieve the above-described objects, according to another aspect of the present invention, a rear-projection type image display apparatus comprises the above-identified rear-projection screen, and also is so arranged that the projection lens among the lens group for the projection lenses, which is located nearest the image generating source, has a convex plane positioned at the side of this image generating source, and also a concave plane positioned at the side of the rear-projection screen. Furthermore, the rear-projection type image display apparatus is constructed in such that the image generating source is coupled with the projection lenses, and the conventional contrast improving technique such that the liquid coolant is filled with a space produced between the image generating source and the concave lens, is employed. Alternatively, in addition thereto, a reflection mirror arranged by a base sheet and an optical reflective thin film is positioned in the light projection path from the projection lens to the rear-projection screen. This optical reflective thin film owns surfaces of the base sheet, and is formed on one surface opposite to the projection lens and the rear-projection screen, which is known as the conventional image focus improving technique.

BRIEF DESCRIPTION OF THE DRAWINGS

The above and other objects, features and advantages of the present invention will become more apparent from the following description taken in connection with the accompanying drawings, in which:

FIGS. 58A and 58B are vertical sectional views for representing the Fresnel lens sheet employed in the conventional rear-projection screen and the Fresnel lens sheet employed in the rear-projection screen of FIG. 54;

DESCRIPTION OF THE PREFERRED EMBODIMENTS

Figure 1:
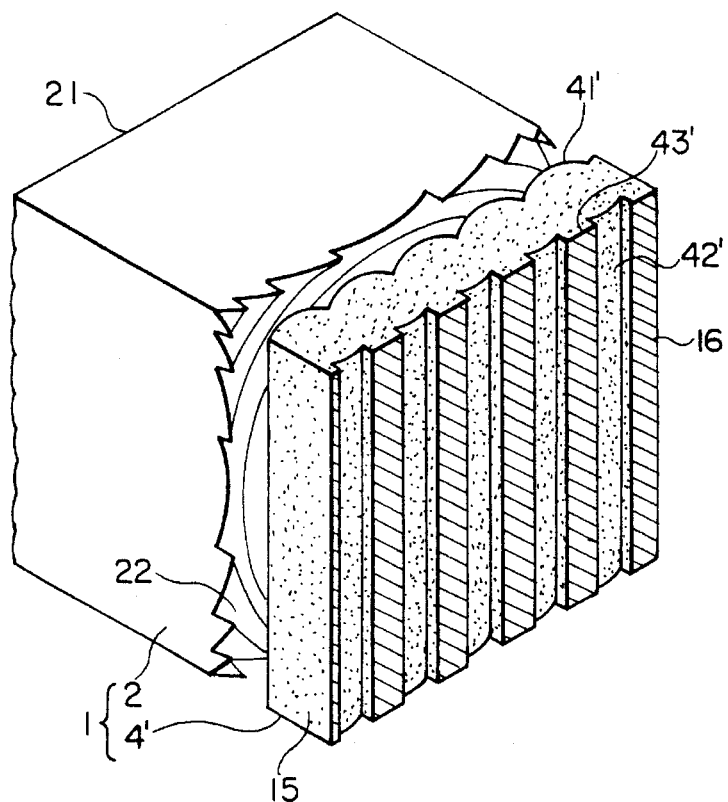
FIG. 1 is a perspective view of an essential portion of a prior art rear-projection screen.
Figure 2:
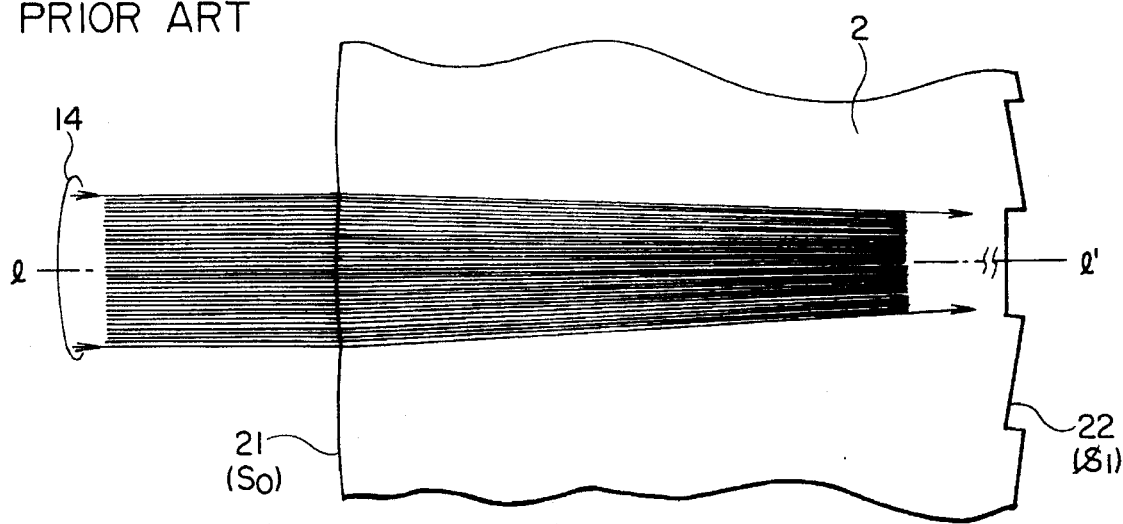
FIG. 2 is a vertical sectional view of a Fresnel lens sheet included in the prior art rear-projection screen.
Figure 3:
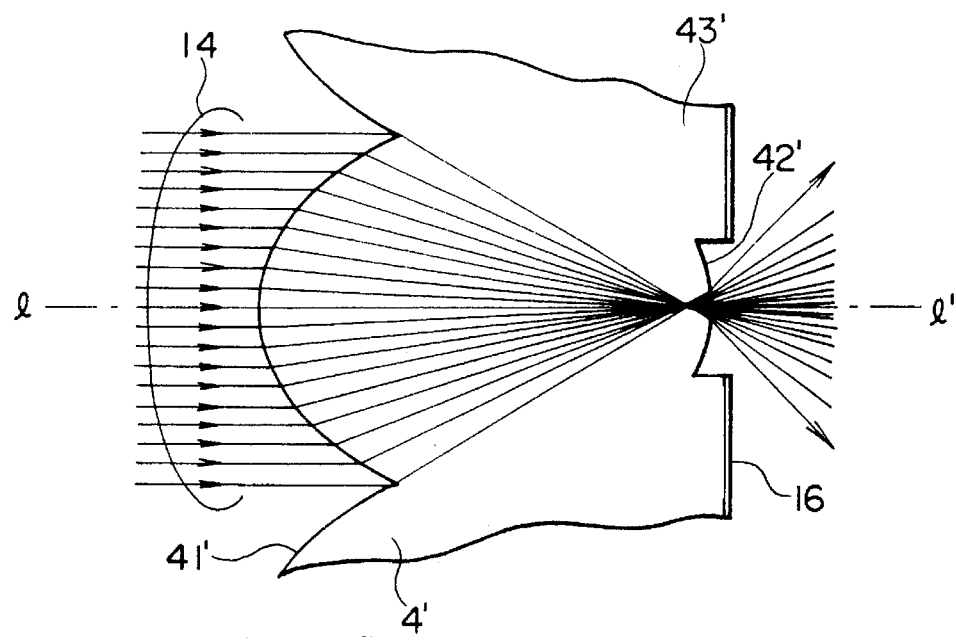
FIG. 3 is a horizontal sectional view of a lenticular lens sheet in the prior art rear-projection screen.
Figure 4:
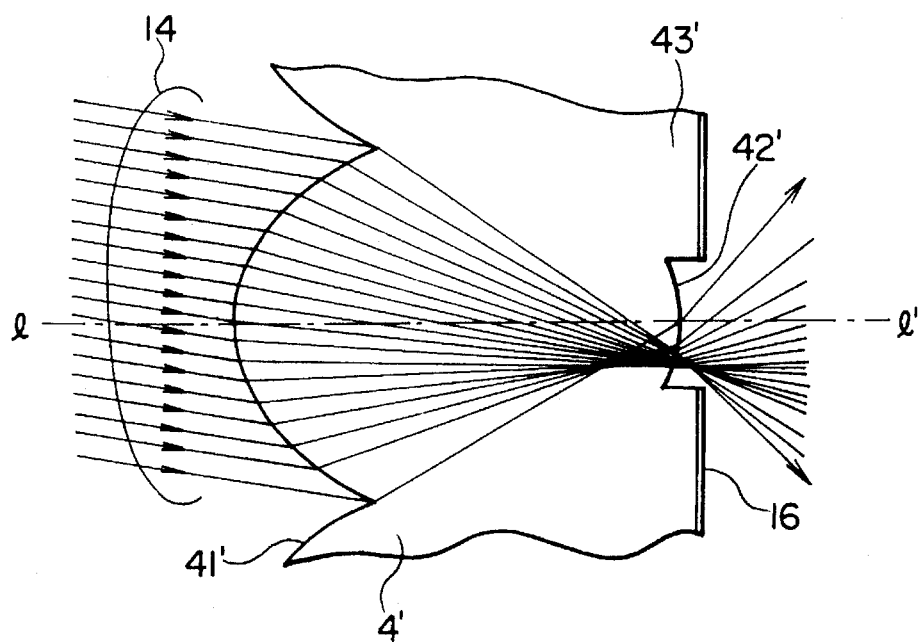
FIG. 4 is a horizontal sectional view of a lenticular lens sheet of the prior art rear-projection screen.
Figure 5A:
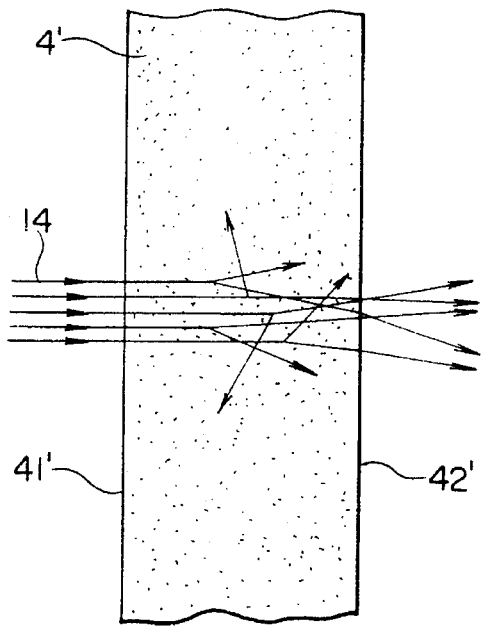
FIGS. 5A and 5B are a vertical sectional view and a horizontal sectional view, respectively, of a lenticular lens sheet included in the prior art rear projection screen.
Figure 5B:
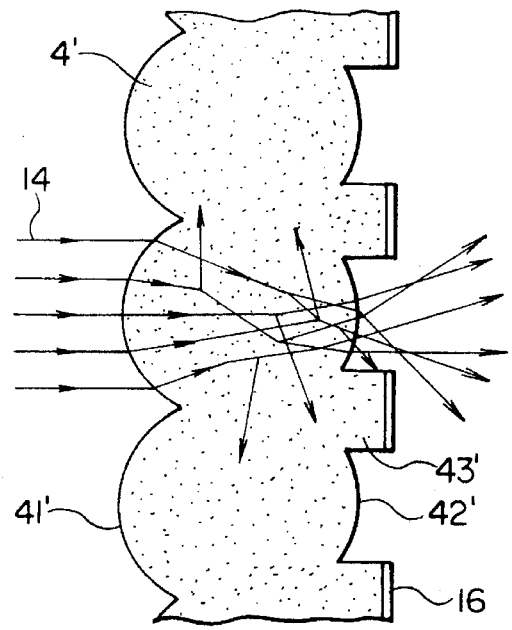
Figure 6:
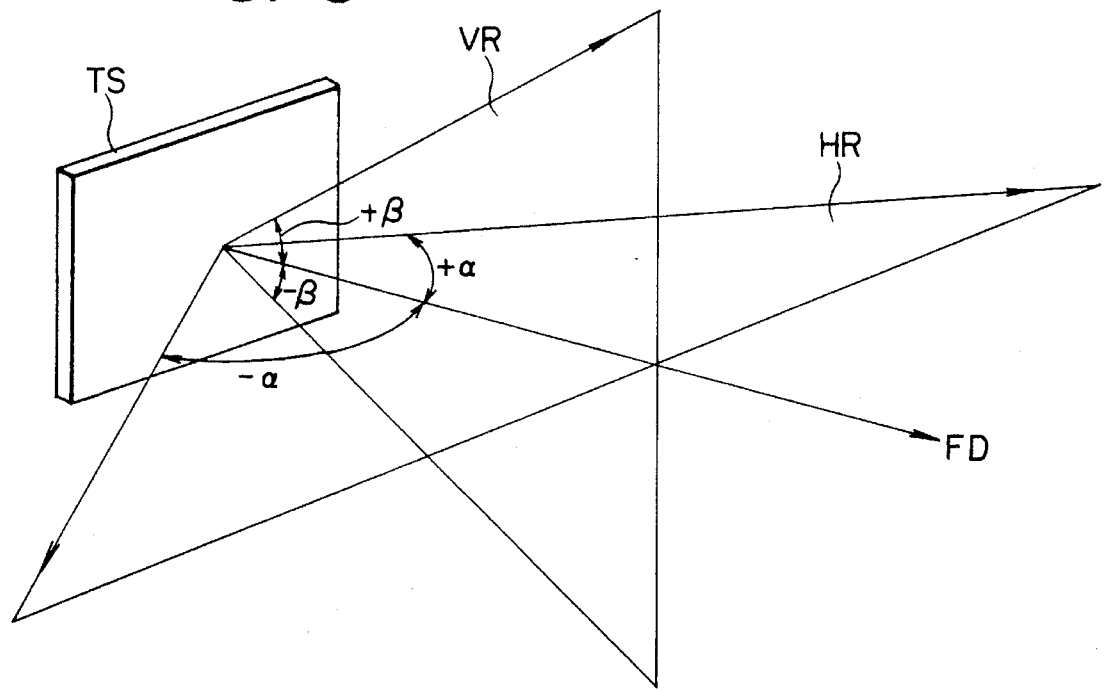
FIG. 6 is a perspective view of assistance in explaining horizontal viewing angle $\alpha$ and vertical viewing angle $\beta$.
Figure 7:
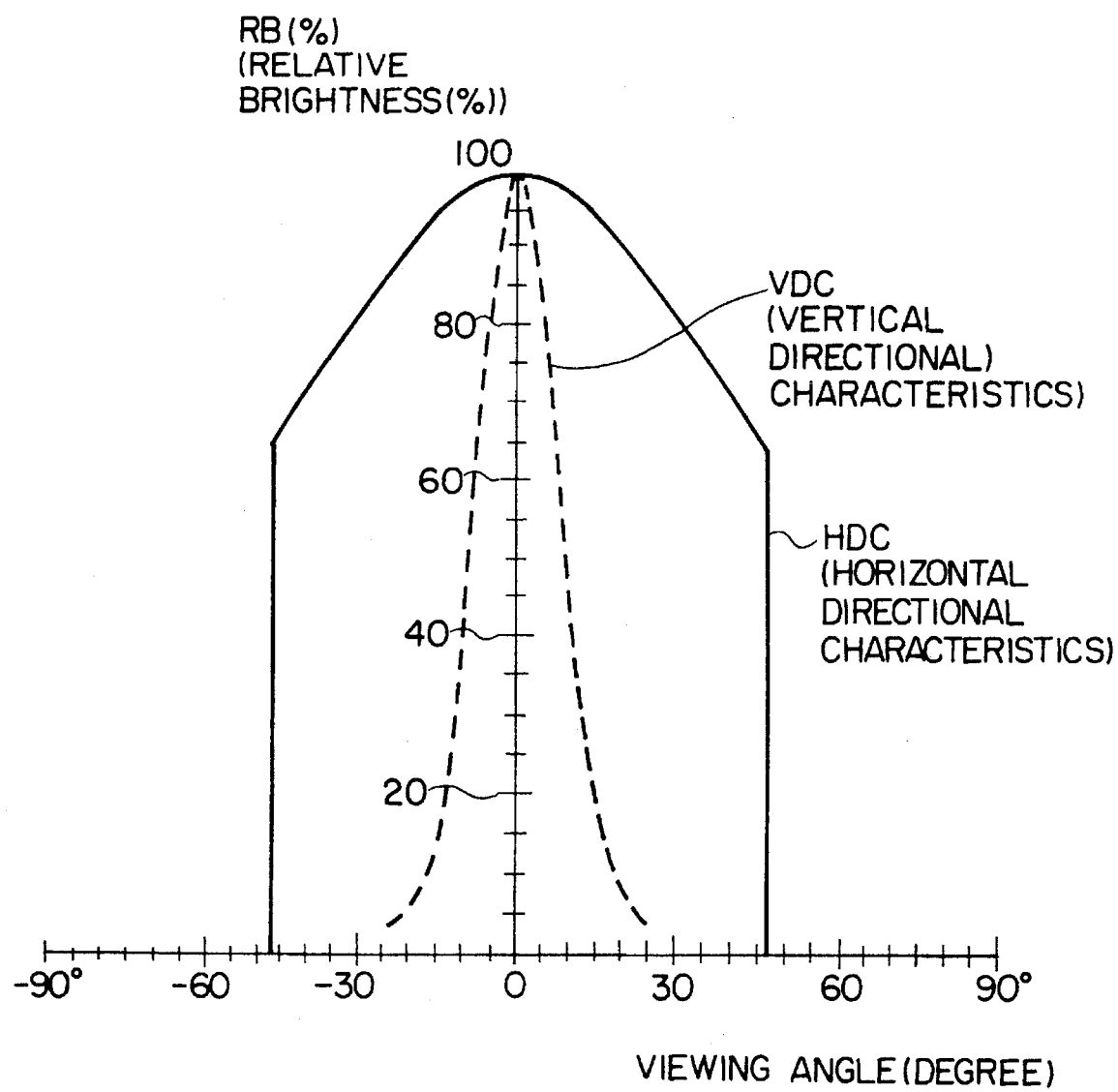
FIG. 7 is a graph showing the horizontal directional characteristics and the vertical directional characteristics of the prior art rear-projection screen.
Figure 8:
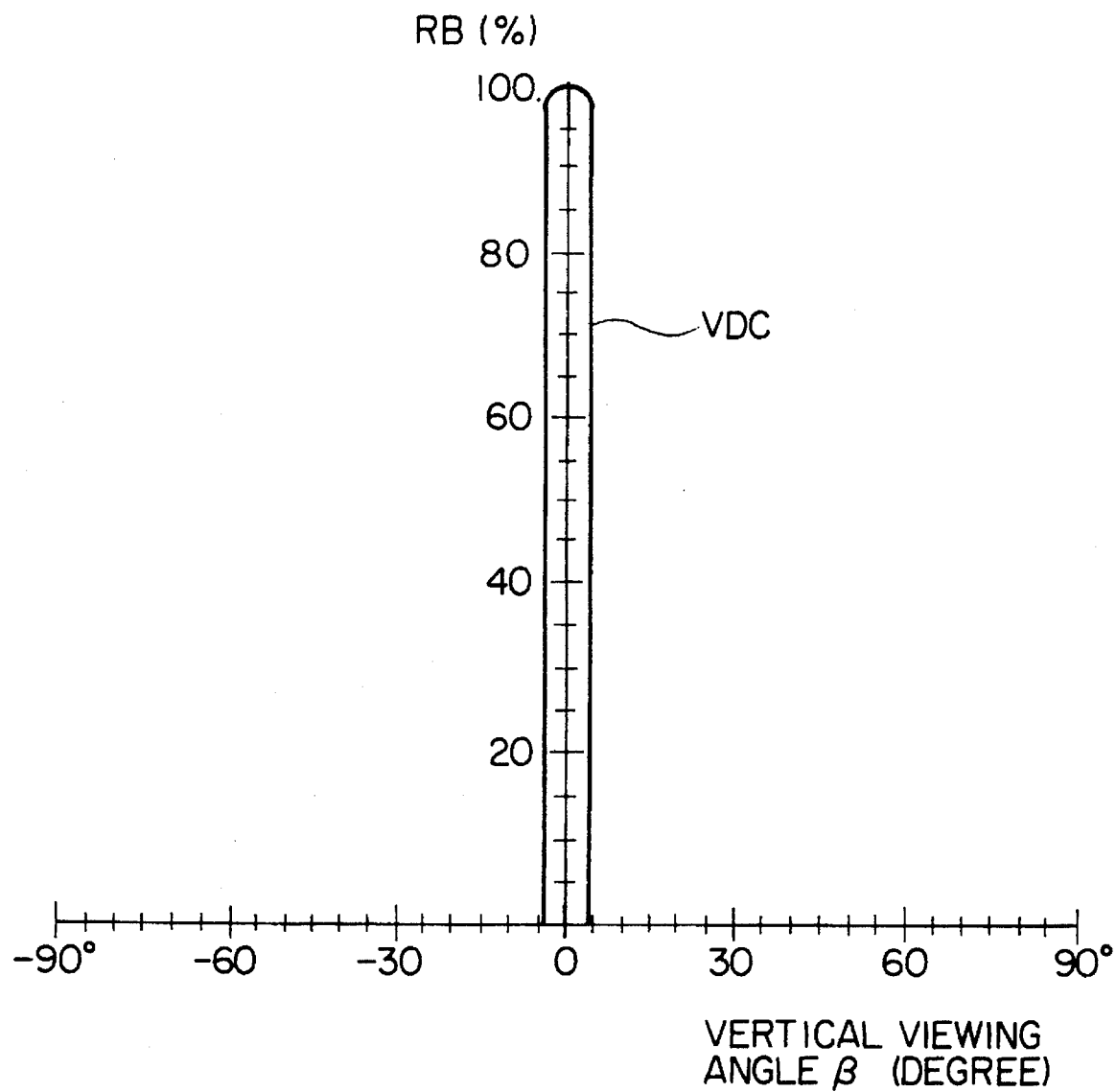
FIG. 8 is a graph showing the vertical directional characteristics of one of the horizontally elongate lenticular lenses of the Fresnel lens sheet of the prior art rear-projection screen.
Figure 9:
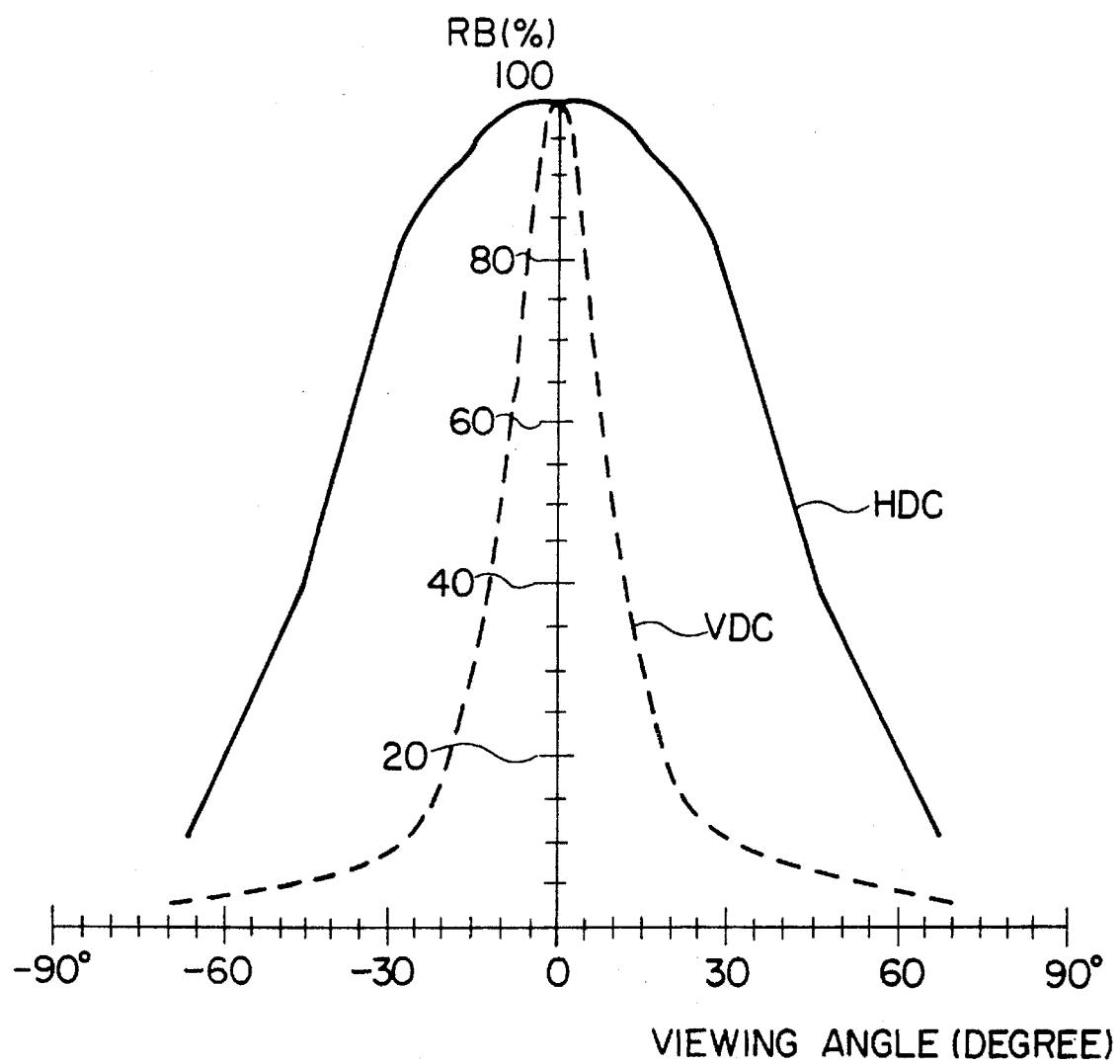
FIG. 9 is a graph showing ideal horizontal directional characteristics and ideal vertical directional characteristics of a rear-projection screen.

In a rear-projection image display provided with the foregoing rear-projection screen, light rays emitted by a video source, such as a projection CRT, travel through a projection lens unit and fall on the rear-projection screen, and are collimated by the Fresnel lens sheet positioned at the side of the image generating source of the rear-projection screen. Thereafter, the resultant light rays are diffused in the vertical direction of the screen plane by the horizontally elongated lenticular lens forming the light entrance surface of the first lenticular lens sheet and/or the horizontally elongate lenticular lens forming the light exit surface thereof, and subsequently are diffused in the horizontal direction of the screen plane by the first vertically elongate lenticular lens forming the light entrance surface of the second lenticular lens sheet and also the light exit surface of the second vertically elongate lenticular lens, and if the rear-projection screen is provided with a light absorbing sheet, the horizontally diffused light rays travel through the light absorbing sheet and emerge from the rear-projection screen toward viewing side.

Since the horizontal diffusion of the light rays is controlled by the shape of the vertically-elongate aspherical lenticular lens arranged at the side of the entrance surface or the exit surface of the lenticular lens sheet, it is possible to enhance the horizontal directional characteristics of the rear-projection screen and to suppress color shift to the least extent.

Since the vertical diffusion of the light rays is mainly controlled by the shape of the horizontally elongate aspherereical lenticular lens provided at the side of either the light entrance surface, or the light exit surface of the first lenticular lens sheet, it is possible to enhance the vertical directional characteristics and to increase the specific vertical viewing angle.

As stated above, according to the present invention, the vertical directional characteristics of the screen can be sufficiently enhanced by the horizontally elongate lenticular lenses of the first lenticular lens sheet, the second lenticular lens sheet or the light absorbing sheet need not contain any light diffusing material at all or needs to contain a light diffusing material in a very small light diffusing material content. Accordingly, a sharp image is displayed on the rear-projection screen. Since stray light rays occur scarcely due to the scatter of the incident light rays by the light diffusing material and the scatter of the ambient light by the light diffusing material occurs scarcely, the image can be displayed in a sufficiently high brightness and high contrast.

On the other hand, when the thickness of the first lenticular lens sheet is made thinnest among the thicknesses of the Fresnel lens sheet, the first lenticular lens sheet and the second lenticular lens sheet, since the horizontally elongate lenticular lens of the first lenticular lens sheet may be mutually positioned adjacent to the vertically elongate lenticular lens of the light entrance surface of the second lenticular lens sheet, the origin of horizontal diffusion of the light rays and the origin of vertical diffusion of the light rays are close to each other and the focusing characteristics are further improved.

Furthermore, if the rear-projection screen is provided with a semitransparent, colored light absorbing sheet on the surface thereof on the viewing side, the image light is subjected once to light absorption, whereby the quantity of the image light projected by the image generating source is reduced in proportion to the transmissivity of the light absorbing sheet. On the other hand, most part of the ambient light, such as illuminating light, goes into the light absorbing sheet and returns at least once and undergoes light absorption at least twice, whereby the quantity of the ambient light is reduced in proportion to the square of the transmissivity of the light absorbing sheet. Thus, the reduction of the ambient light is greater than that of the image light, and hence the contrast of the image exposed to the ambient light is improved.

It should be noted that if no light absorbing sheet is arranged, the second lenticular lens sheet may be made semitransparent and colored. Also in this case, contrast when externally supplied light such as illumination light appears may be increased similar to such a case where the light absorbing sheet is arranged.

If the horizontally elongate lenticular lens provided at either the entrance surface or the exit surface of the first lenticular lens sheet is formed in an optimum shape to reduce the difference in brightness between a portion of having a high relative brightness and a portion having a low relative brightness in vertical brightness distribution on the exit surface to the least possible extent, Moiré resulting from the interference among the horizontally elongate lenticular lenses, the Fresnel lens, and the vertically elongate lenticular lenses can be minimized.

Referring now to FIGS. 13 to 53, a rear-projection type image display apparatus according to a first embodiment of the present invention will be described.

Figure 13:
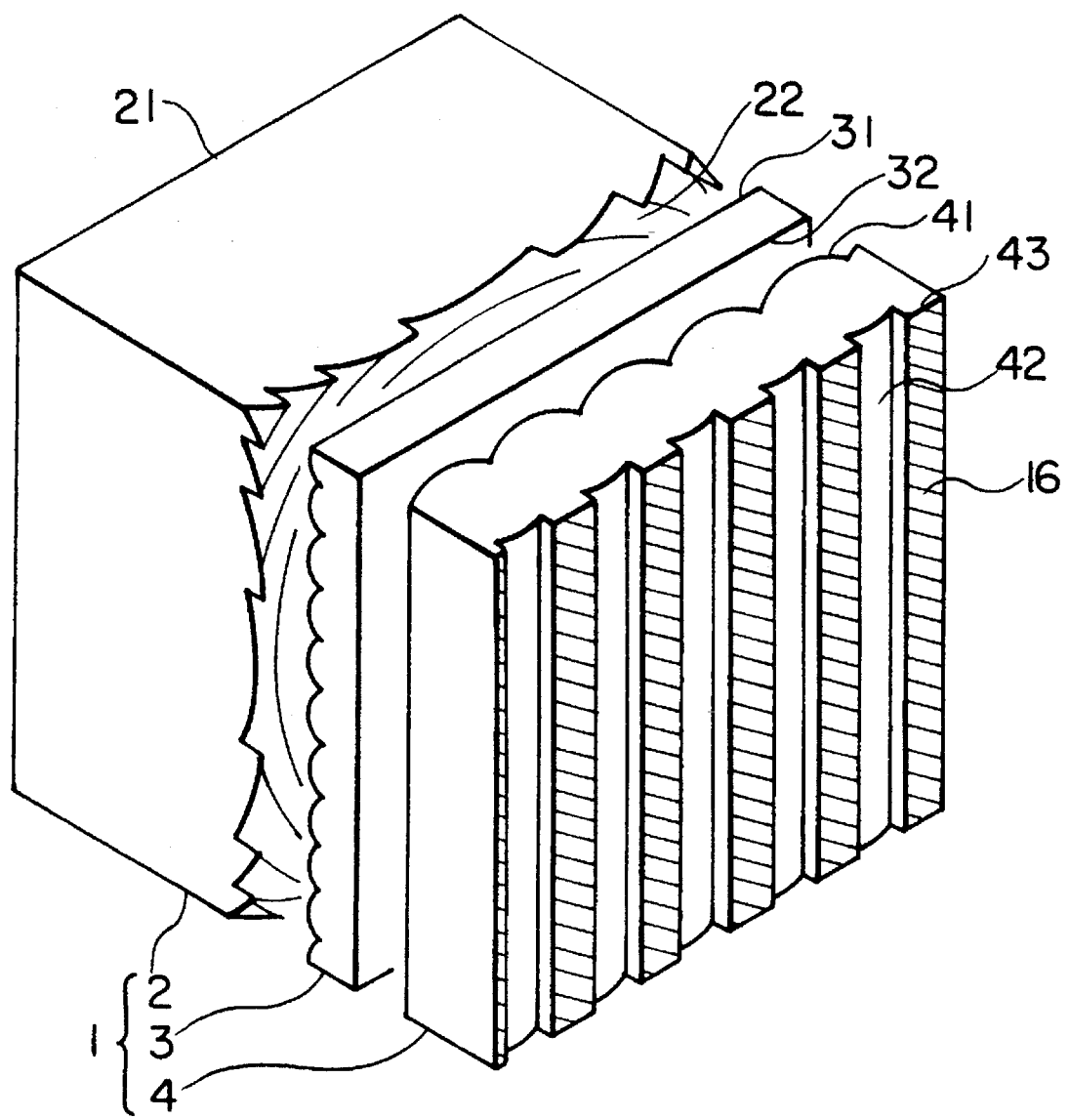
FIG. 13 is a perspective view of an essential portion of a rear-projection screen in a first embodiment according to the present invention.

FIG. 13 is a perspective view for showing a major portion of a rear-projection type screen as the first embodiment of the present invention.

Referring to FIG. 13, a rear-projection screen 1 is arranged by a Fresnel lens sheet 2, a first lenticular lens sheet 3, and a second lenticular lens sheet 4. The Fresnel lens sheet 2 and the first lenticular lens sheet 3 and also the second lenticular lens sheet 4 are fastened together at their ends (not shown). The respective base sheets of the Fresnel lens sheet 2, the first lenticular lens sheet 3 and the second lenticular lens sheet 4 are formed of a substantially transparent, thermoplastic resin.

Referring numeral 21 indicates a light entrance surface of the Fresnel lens sheet 2 and is a plane surface in this embodiment. Reference numeral 22 denotes a light exit surface of the Fresnel lens sheet 2, and has a Fresnel convex lens shape.

A plurality of the horizontally elongate lenticular lenses are arranged in a continuous vertical arrangement to form the entrance surface 31 of the first lenticular lens sheet 3. Reference numeral 32 shows a light exit surface of the first lenticular lens sheet 3 and is a plane surface in this embodiment.

Reference numeral 41 indicates a light entrance surface of the second lenticular lens sheet 4, and has such a shape that a plurality of first vertically elongate lenticular lenses with a longitudinal direction corresponding to the vertical screen direction are continuously arranged along the horizontal screen direction. Reference numeral 42 denotes a light exit surface of the second lenticular lens sheet 4, and has such a shape that a plurality of second vertically elongate lenticular lenses with a longitudinal direction corresponding to the vertical screen direction are continuously arranged along the horizontal screen direction substantially opposite to the light entrance surface 41 of the first vertically elongate lenticular lens. Ridges 43 are formed between the adjacent second vertically elongate lenticular lenses, and the top surfaces of the ridges 43 are coated with light absorbing strips 16 of a limited width, respectively.

This rear-projection screen is different from the prior art rear-projection screen of FIG. 1 as to the following four points. That is to say, as shown in FIG. 13, the light entrance plane 21 of the Fresnel lens sheet 2 becomes plane, the first lenticular lens sheet 3 having a thin sheet thickness is newly added to the constructive elements of this rear-projection screen, the shapes of the first vertically elongate lenticular lenses at the light entrance surface 41 of the second lenticular lens sheet 4 and also of the second vertically elongate lenticular lenses at the light exit surface 42 are different from the shape of the vertically elongate lenticular lens of the lenticular lens sheet 4' in the conventional rear-projection screen, and no fine particle of the light diffusing material is dispersed in the base material of the second lenticular lens sheet 4.

Then, as to the Fresnel lens sheet 2, the first lenticular lens sheet 13, and the second lenticular lens sheet 4 which constitute the rear-projection screen 1 shown in FIG. 13, a detailed description will now be made of the Fresnel lens sheet 2.

The Fresnel convex lens provided at the exit surface 22 of the Fresnel lens sheet 2 collimates red rays, green rays and blue rays of a projected image, which are incident upon the entrance surface 21 so that substantially parallel red rays, substantially parallel green rays and substantially parallel blue rays fall on the first lenticular lens sheet 3, in a similar manner of the Fresnel lens sheet of the conventional rear-projection screen.

Figure 14:
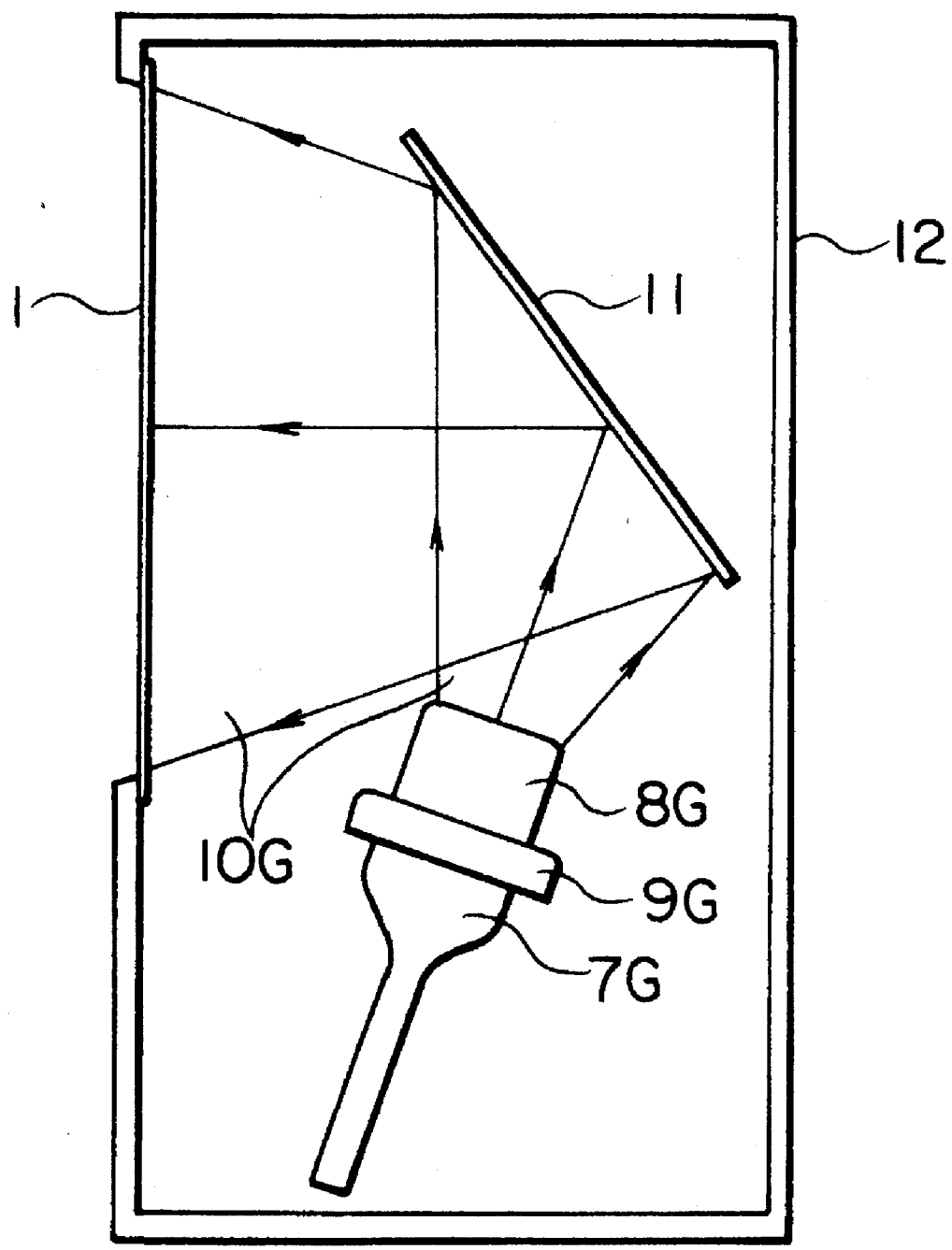
FIG. 14 is a sectional view of an essential portion of a rear-projection image display employing the rear-projection screen of FIG. 13.
Figure 15:
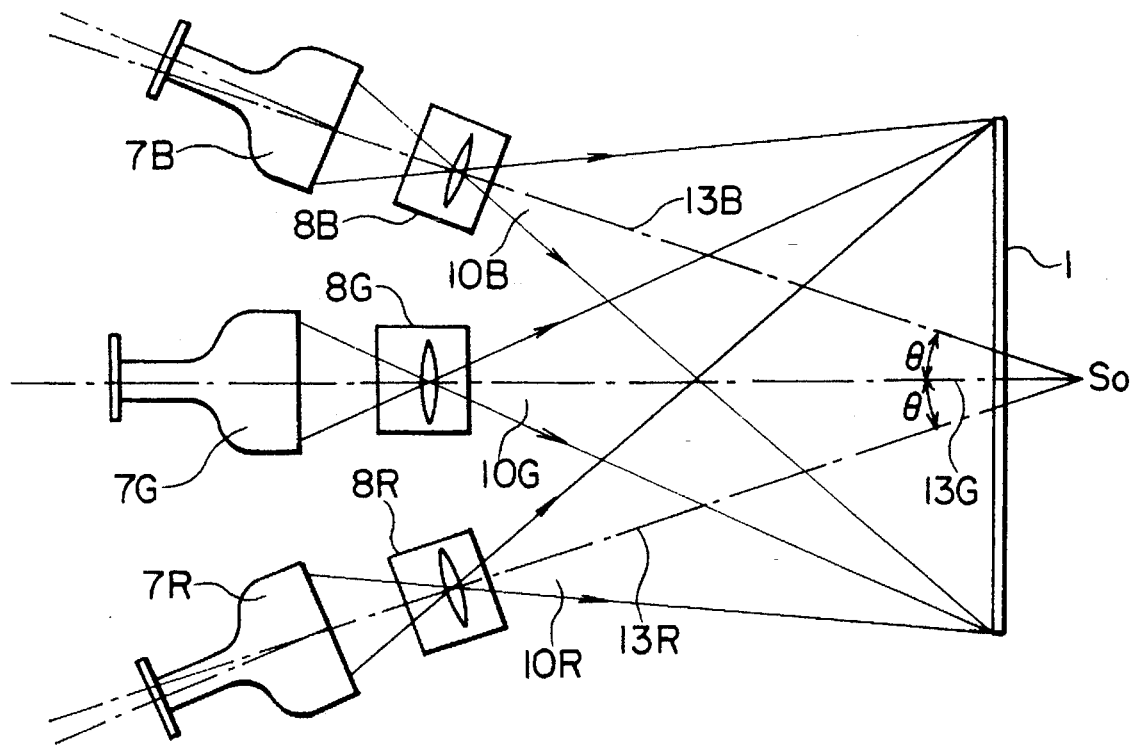
FIG. 15 is a diagrammatic view of a projection optical system included in the rear-projection image display of FIG. 14, developed on a horizontal plane.

FIG. 14 is a sectional view of an essential portion of a rear-projection image display apparatus employing the rear-projection screen of FIG. 13, and FIG. 15 is a schematic horizontal development of a projection optical system included in the rear-projection image display of FIG. 14.

Referring to FIGS. 14 and 15, there are shown the rear-projection screen 1, red, green and blue projection CRTs 7R, 7G and 7B, projection lens units 8R, 8G and 8B through which red rays 10R, green rays 10G and blue rays 10B projected by the red, green and blue projection CRTs travel, respectively, a coupler 9G connecting the projection CRT 7G and the projection lens unit 8G, a reflecting mirror 11, which is omitted in FIG. 14, for reflecting the red rays 10R, the green rays 10G and the blue rays 10B, a console 12 (FIG. 14), the respective optical axes 13R, 13G and 13B of the projection lens units 8R, 8G and 8B. The optical axes 13R, 13G and 13B intersect each other at an angular offset θ at a point $S_0$ near the center of the rear-projection screen 1.

In FIGS. 14 and 15, the projected light rays 10R, 10G and 10B are diverged and fall on the rear-projection screen 1. The light rays of a color, for example, red rays 10R forming each pixel of an image formed on the rear-projection screen 1 are not parallel rays and the red rays 10R fall on the rear-projection screen 1 along directions deviating from the main light rays of the central pixel on the rear-projection screen 1. Light intensity is highest in the direction of travel of the principal ray of each pixel on the rear-projection screen 1. Accordingly, a portion of the image is bright and the rest of portions of the image is very dark for the viewer located at some fixed position apart from the rear-projection image display.

To the contrary, since the Fresnel lens sheet 2 of the rear-projection screen 1 collimates the red rays 10R, the green rays 10G and the blue rays 10B falling on the entrance surface 21 before the red rays 10R, the green rays 10G and the blue rays 10B enter the first lenticular lens sheet 3, there is an advantage that brightness distribution on the rear-projection screen 1 is improved.

As mentioned above, the optical axis 13G of the green projection lens unit 8G intersects the red optical axis 13R and the blue optical axis 13B at the angular offset θ. Accordingly, the respective incident angles of the red, green and blue principal rays for each picture element on the rear-projection screen 1 on the Fresnel lens sheet 2 are different from each other and go out from the Fresnel lens sheet 2 in different directions, respectively. Accordingly, the respective incident angles of the red rays, green rays and blue rays on the lenticular lens sheet 3 are different from each other.

When the red rays, the green rays and the blue rays are diffused horizontally by the second lenticular lens sheet 4, each picture element is brightest when viewed in the direction of travel of the principal ray and hence the balance of the three primary colors, i.e., red, green and blue, changes according to the position of the viewer with respect to the horizontal direction and, consequently, the color of the image changes. This phenomenon is called "color shift".

Subsequently, the first lenticular lens sheet 3 will now be explained.

The horizontally elongated lenticular lenses provided at the entrance surface 31 of the first lenticular lens sheet 3 own such a function to diffuse the incident light rays 14 along the vertical direction of the screen plane in a similar function of the horizontally elongate lenticular lenses at the Fresnel lens sheet of the conventional rear-projection screen.

Figure 16:
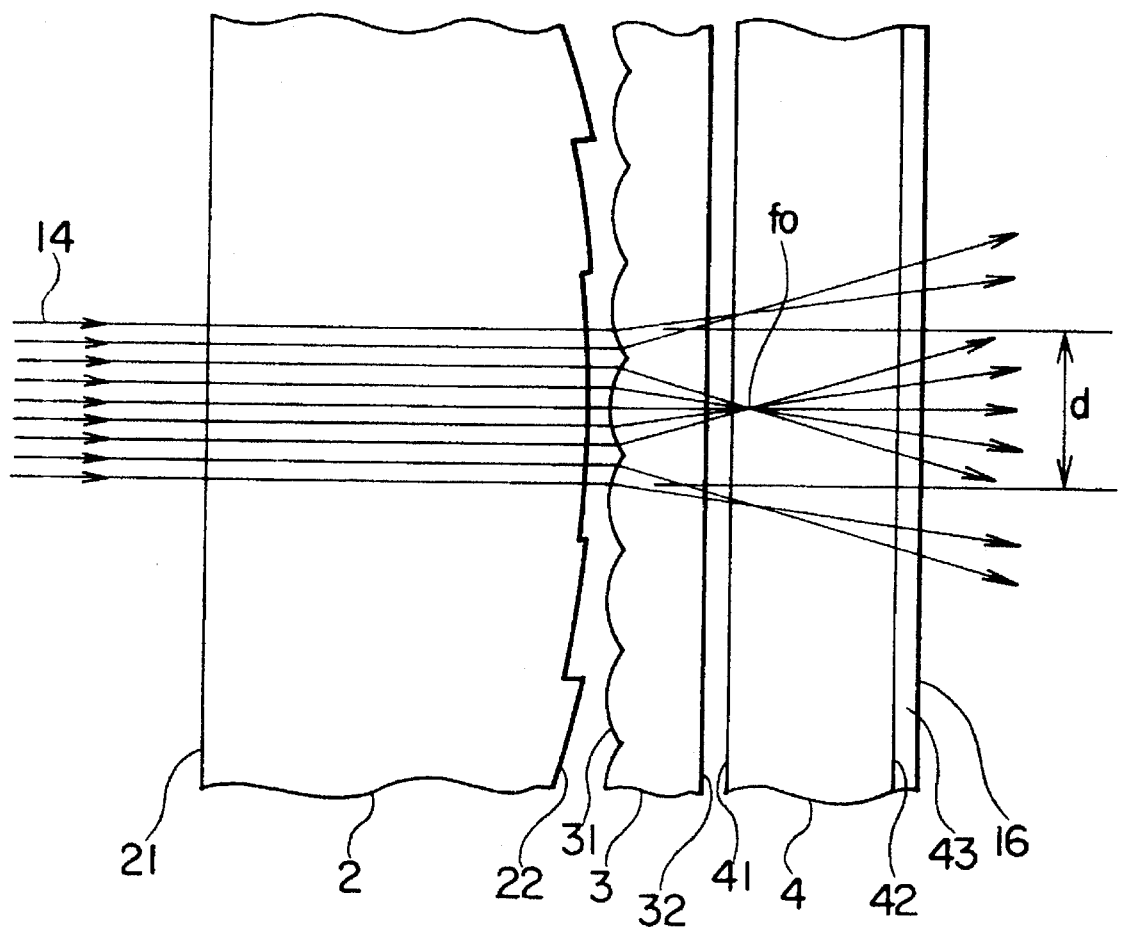
FIG. 16 is a vertical sectional view of the rear-projection screen of FIG. 13.

FIG. 16 is a vertical sectional view of the rear-projection screen of FIG. 13.

FIG. 16, reference numeral 14 denotes incident light rays, in which parts like or corresponding to those shown in FIG. 13 are denoted by the same reference characters and the description thereof will be omitted.

As shown in FIG. 16, the incident light rays 14 for a scanning line or a picture element fall on the horizontally elongate lenticular lenses forming the entrance surface 31 at different positions on the horizontally elongate lenticular lenses at different incident angles, respectively, and the incident light rays 14 are refracted at different angles of refraction, respectively. Consequently, the incident light rays 14 are diffused vertically. If the radius of curvature of the horizontally elongate lenticular lenses is reduced, the respective incident angles of the light rays are increased and the angular range of vertical diffusion of the incident rays 14 is increased, whereby the vertical directional characteristics of the rear-projection screen 1 is enhanced and the specific vertical viewing angle is increased.

The pitch of the horizontally elongate lenticular lenses must be smaller than the pitch of the scanning lines or the pitch of the pixels, and the pitch of the horizontally elongate lenticular lenses must be determined taking into consideration the combined effect of the setbacks of the Fresnel lens and the horizontally elongate lenticular lenses of the first lenticular lens sheet 3 on the occurrence of Moiré.

An occurrence of Moiré resulting from the interference between the scanning lines and the horizontally elongate lenticular lenses is the most significant problem. The intensity of Moiré can be reduced to a practically insignificant level by reducing the pitch of the horizontally elongate lenticular lenses to a value far smaller than the horizontal pitch of the first vertically elongate lenticular lenses and the pitch of the scanning lines, and determining the pitch of the horizontally elongate lenticular lenses so that the ratio between the pitch of the scanning lines and that of the horizontally elongate lenticular lenses is not the simple ratio of integers.

For example, assuming now that the horizontal size and vertical size of the rear-projection screen 1 are 800 mm and 600 mm, respectively, the horizontal pitch of the first vertically elongate lenticular lens is 0.78 mm, the number of scanning lines displayed on the rear-projection screen 1 is 450 and the pitch of the scanning lines is 1.33 mm. Then, only a very indistinct Moiré is formed when the pitch of the setbacks of the Fresnel lens is 0.105 mm and the pitch of the horizontally elongate lenticular lenses is on the order of 0.091 mm.

The prior art rear-projection screen of FIG. 1 diffuses the light rays vertically primarily by particles of the light diffusing material 15 dispersed in the base sheet of the lenticular lens sheet 4' and has directional characteristics covering a relatively wide angular range.

As mentioned above, to the contrary, since the base sheet of second the lenticular lens sheet 4 of the rear-projection screen 1 of the present invention does not contain any particles of the light diffusing material, the rear-projection screen 1 has vertical directional characteristics covering a relatively narrow angular range and no image can be seen on the rear-projection screen 1 from a position outside a relatively narrow angular range of view if the shape of the horizontally elongate lenticular lenses is that of a simple cylinder or a simple elliptic cylinder. Accordingly, it is preferable that the horizontally elongate lenticular lenses have an aspheric shape which will provide the rear-projection screen with directional characteristics covering a relatively wide angular range. At this time, since the difference in the brightnesses caused by the horizontally elongate lenticular lens arrays is visually reduced by such a directional characteristic when the single body of the first lenticular lens sheet 3 is observed from one direction, the above-described Moiré phenomenon is not further conspicuously.

It should be noted that the horizontally elongate lenticular lens provided at the light entrance surface 31 of this first lenticular lens sheet 3 may be substituted by the horizontally elongate lenticular lens provided at the light entrance surface 21 of the Fresnel lens sheet 2 employed in the conventional rear-projection screen 1 shown in FIG. 1. In the Fresnel lens sheet 2 of the conventional rear-projection screen 1, if the radius of curvature of the horizontally elongate lenticular lens is made small in order to enhance the directional characteristics of the vertical screen direction, as previously explained, the focusing characteristics are deteriorated.

To the contrary, even if the radius of curvature of the horizontally elongate lenticular lenses in the first embodiment is reduced to enhance the vertical directional characteristics, the focusing characteristics are not deteriorated because of the following reasons.

Namely, the thickness of the first lenticular lens sheet 3 is made thinner than the thicknesses of the Fresnel lens sheet 2 and the second lenticular lens sheet 4, and also the horizontally elongate lenticular lenses provided at the light entrance surface 31 of the first lenticular lens sheet 3 is arranged very close to the vertically elongate lenticular lenses provided at the light entrance surface 41 of the second lenticular lens sheet 4. In other words, since the origin of horizontal divergence of the incident light rays 14 and the origin of vertical divergence of the incident light rays 14 in the rear-projection screen are close to each other, the focusing characteristics are not deteriorated.

Figure 10:
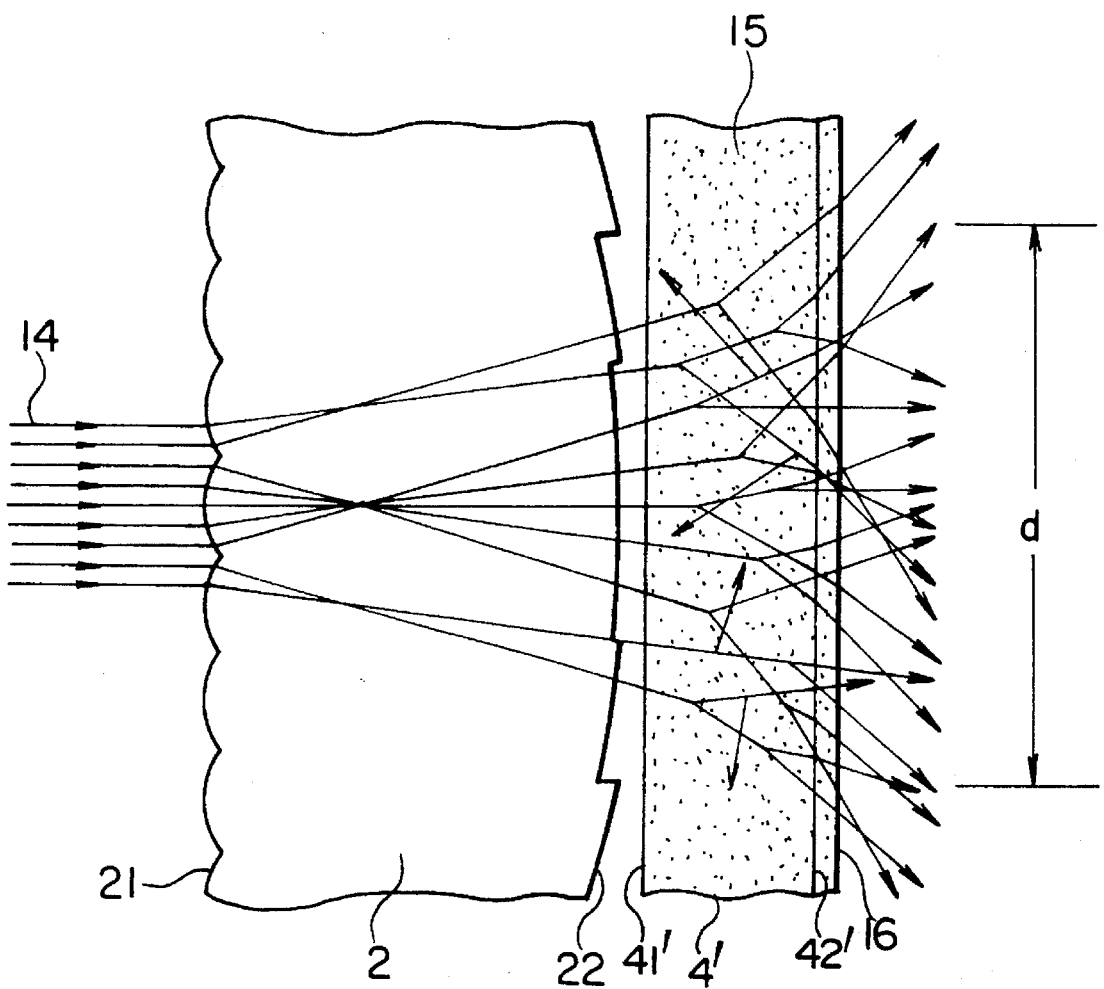
FIG. 10 is a vertical sectional view of the rear-projection screen of FIG. 1.
Figure 11:
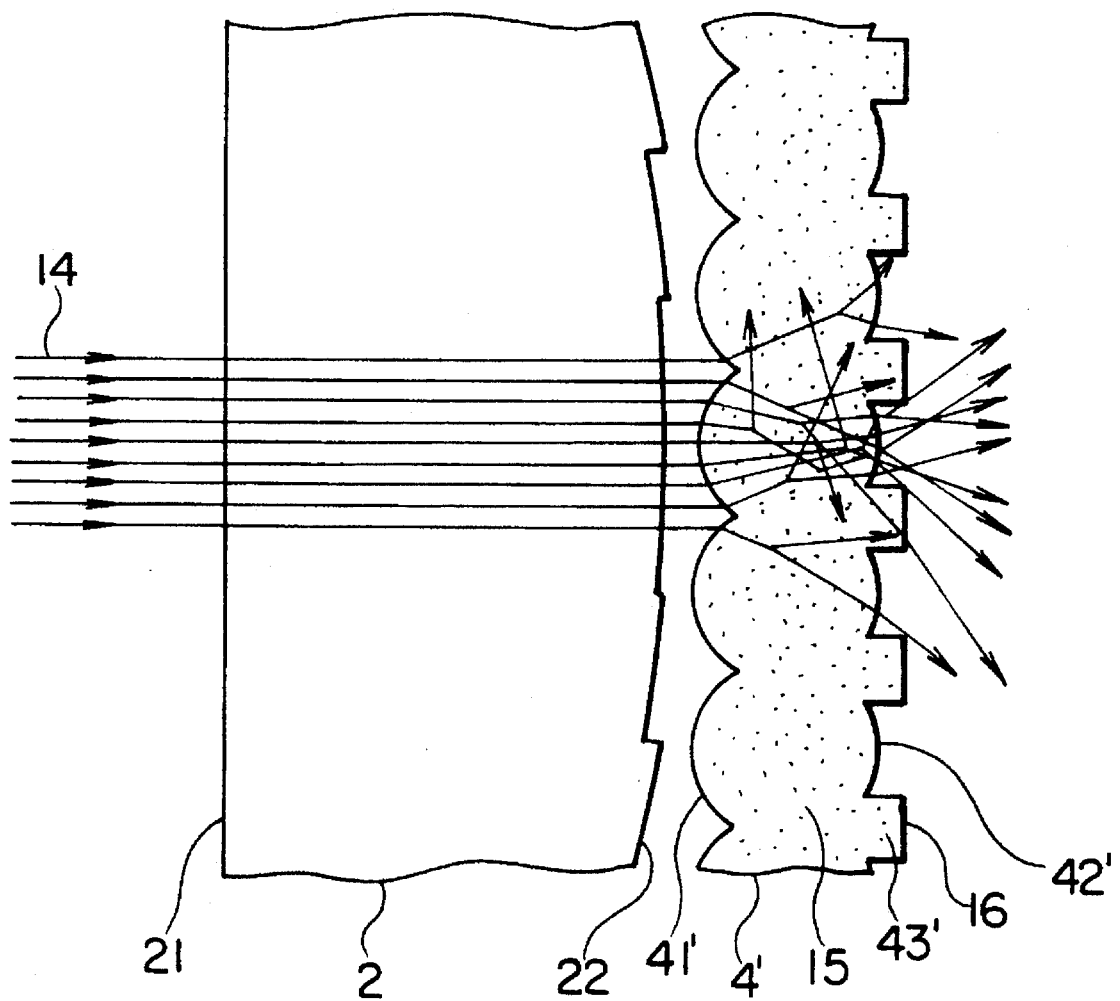
FIG. 11 is a horizontal sectional view of the rear-projection screen of FIG. 1.
Figure 12:
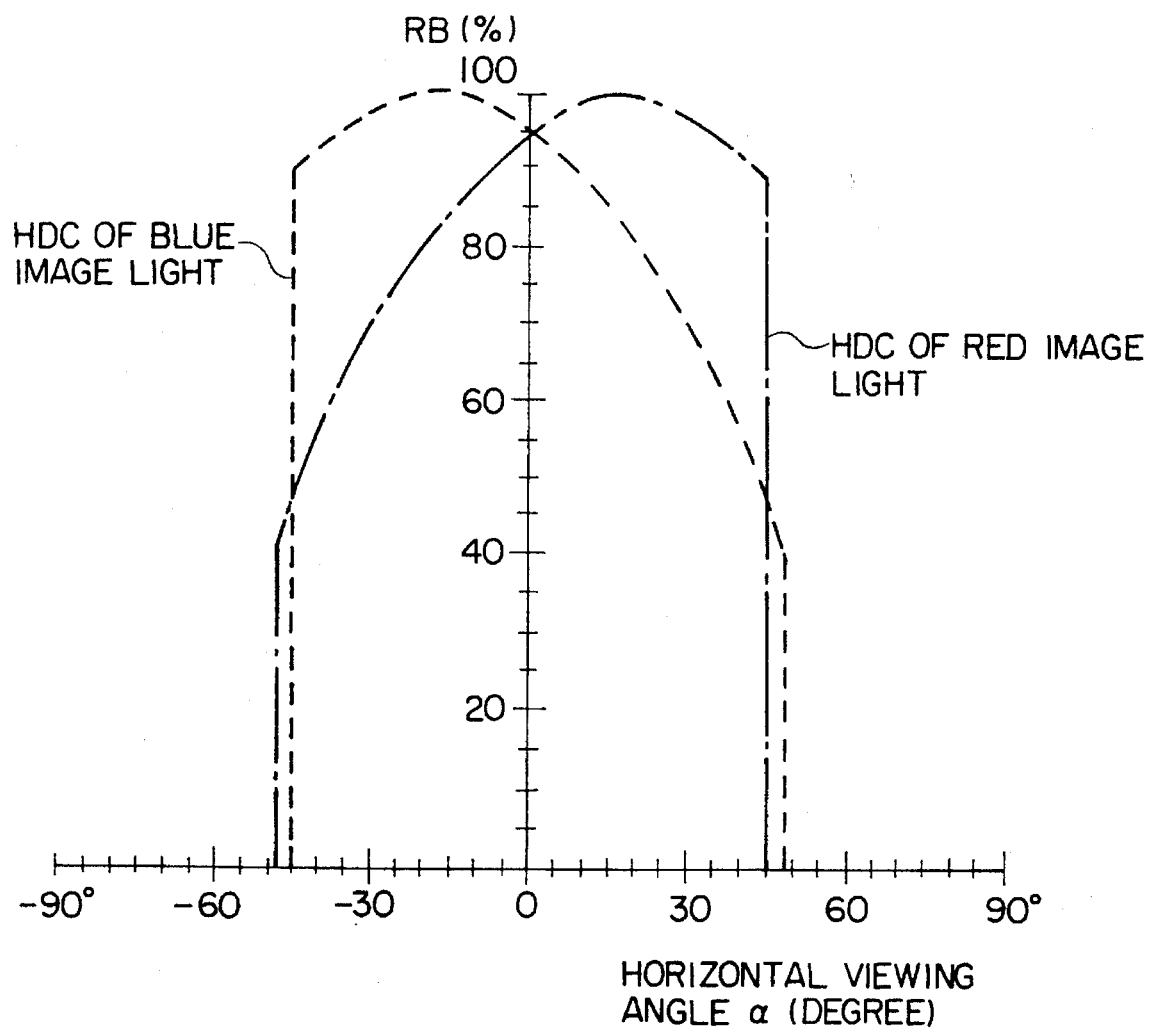
FIG. 12 is a graph showing the horizontal directional characteristics of the prior art rear-projection screen for red rays and blue rays.

Concretely speaking, as shown in FIG. 16, after the incident light rays 14 have passed through the Fresnel lens 2, the light rays 14 are refracted by the shapes of the horizontally elongate lenticular lenses provided at the light entrance surface 31 of the first lenticular lens sheet 3, and then, once are converged at the focal point "$f_0$". After the converged light rays are diverged and diffused along the vertical screen direction, the diffused light rays are not diffused along the vertical screen direction. Since after the light rays have been emitted from the light exit surface 32 of the first lenticular lens sheet 3, these light rays are immediately diffused along the horizontal screen direction at the vertically elongate lenticular lens provided at the light entrance surface 41 of the second lenticular lens sheet 4, the vertical width "d" of the incident light rays 14 on the display surface of the rear-projection screen 1 is approximately equal to the vertical width of the light rays on the exit surface 22 of the Fresnel lens sheet 2 and hence this vertical width "d" is smaller than the vertical width "d" (FIG. 10) of the light rays on the display surface of the prior art rear-projection screen. Then, there is no blurring phenomenon in an image displayed on the rear-projection screen.

Figure 17:
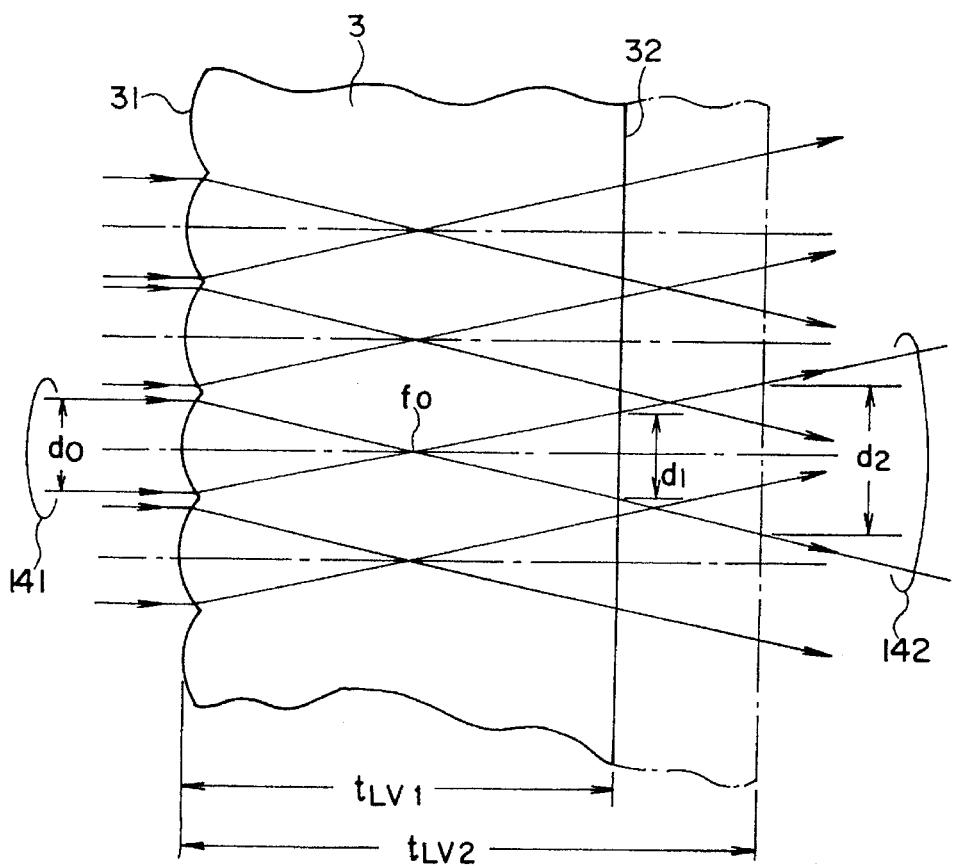
FIG. 17 is a vertical sectional view of a first lenticular lens sheet included in the rear-projection screen of FIG. 13.

FIG. 17 is a vertical sectional view of the first lenticular lens sheet 3. In FIG. 17, when sheet thickness of the first lenticular lens sheet 3 are selected to be "$t_{LV1}$" and "$t_{LV2}$", widths of outgoing light rays 142 appearing on the light exit surface 32 with respect to incoming (incident) light rays 141 to the light entrance surface 31 of the first lenticular lens 3 are "$d_1$" and "$d_2$", respectively. The thinner the sheet thicknesses of the first lenticular lens sheet 3 becomes, the narrower the width of the outgoing light ray becomes. At this time, the width of the light ray along the vertical screen direction at the starting point of light diffusion along the horizontal screen direction becomes narrow, and therefore there is a merit that better focusing characteristics can be obtained.

It should be noted in this embodiment that since the thickness of the first lenticular lens sheet 3 is thinner than the respective thicknesses of the Fresnel lens sheet 2 and the second lenticular lens sheet 4, a mechanical strength of this first lenticular lens sheet 3 per se becomes weak. However, there is no practical problem if the following measures are taken. That is, the thickness of the Fresnel lens sheet 2 and the second lenticular lens sheet 4 are made sufficiently thicker and also the first lenticular lens sheet 3 is sandwiched by the Fresnel lens sheet 2 and the second lenticular lens sheet 4 so as to be held therebetween. Otherwise, bending rigidity of the Fresnel lens sheet 2 as well as the second lenticular lens sheet 4 is sufficiently made greater than that of the first lenticular lens sheet 3.

Even if such a specific structure is made, there are some possibilities that floats are produced among these sheets and thus these sheets are not in close contact with each other when the rear-projection screen 1 is actually employed in the rear-projection type image display apparatus. Then, to prevent such a float, camber is given to either the Fresnel lens sheet 2 or the second lenticular lens sheet 4, otherwise both of these sheets in such a manner that the central portions of the sheets are mutually positioned adjacent to each other, rather than the peripheral portions thereof. Under such a circumstance, these sheets 2, 3 and 4 are mounted on the rear-projection type image display apparatus. Alternatively, these sheets are mounted on the rear-projection the image display apparatus under such conditions that tension is given to the peripheral portions of these sheets so as to cause a tensile force.

The second lenticular lens sheet 4 will be now described hereinafter.

Referring to FIG. 13, the first vertically elongate lenticular lenses provided at the entrance surface 41 of the second lenticular lens sheet 4 diffuse horizontally the light rays traveled through the first lenticular lens sheet 3 for each picture element so that diffused light rays emerge from the exit surface 42 of the lenticular lens sheet 4.

Each of the first vertically elongate lenticular lenses forming the entrance surface 31 of the lenticular lens sheet 4' of the prior art rear-projection screen disclosed in JP-A No. 58-59436 has the shape of a portion of an elliptic cylinder. The elliptic cross section of the elliptic cylinder has a major axis extending in the direction of thickness of the lenticular lens sheet 4', one focus point positioned within the base sheet of the lenticular lens sheet 4', the other focus point positioned near the exit surface 42', and an eccentricity "e" approximately equal to the reciprocal of the refractive index "n" of the base sheet of the lenticular lens sheet 4'.

The prior art rear-projection screen 1 of FIG. 1 diffuses the light rays horizontally primarily by the vertically elongate lenticular lenses forming the entrance surface 41' and secondarily by the particles of the light diffusing material 15 dispersed in the base sheet of the lenticular lens sheet 4'. Thus, the prior art rear-projection screen has directional characteristics covering a relatively wide angular range.

To the contrary, since any particles of the light diffusing material 15 are not dispersed in the base sheet of the second lenticular lens 4 of the rear-projection screen 1 in the first embodiment according to the present invention, the rear-projection screen 1 has horizontal directional characteristics covering a relatively narrow angular range and no image can be seen from a position outside a relatively narrow angular range due, if the shape of the first vertically elongate lenticular lenses is the same as that of the vertically elongate lenticular lens of the prior art lenticular lens sheet 4'. Accordingly, in the first embodiment, the shape of the first vertically elongate lenticular lenses must be designed so that the rear-projection screen has directional characteristics covering a relatively wide angular range even though the base sheet of the second lenticular lens sheet 4 does not contain any light diffusing material 15.

On the other hand, the second vertically elongate lenticular lenses provided at the exit surface 42 of the second lenticular lens sheet 4 has a shape substantially resembling the mirror image of the shape of the first vertically elongate lenticular lenses provided at the entrance surface 41. The second vertically elongate lenticular lenses make the directional characteristics for the red rays, the green rays and the blue rays substantially parallel to each other, which reduces the above-explained color shift effectively.

In this embodiment, as will be discussed later, the shapes of first vertically elongate lenticular lenses are designed so that the light rays incident on the second lenticular lens sheet 4 pass only the central portions of the second vertically elongate lenticular lenses at the exit surface 42 and do not pass portions of the second vertically elongate lenticular lenses around the boundaries of the adjacent second vertically elongate lenticular lenses surfaces. The ridges 43 having limited widths are formed around the boundaries of the adjacent second vertically elongate lenticular lens and the upper surfaces of the ridges 43 are coated with the light absorbing strips 16, respectively.

Each light absorbing strip 16 absorbs part of the ambient light, such as illuminating light, falling thereon to enhance the contrast of the image displayed on the rear-projection screen when the rear-projection screen is exposed to the ambient light.

On the other hand, as previously described, according to this embodiment, since the directional characteristics along the vertical screen direction can be sufficiently expanded by the horizontally elongate lenticular lens provided at the light entrance surface 31 of the first lenticular lens sheet 3, no light diffusing material is dispersed as the fine particles in the base sheet of the second lenticular lens sheet 4, that is different from such a case of the lenticular lens sheet 4' of the conventional rear-projection screen.

As a consequence, as stated above, since after the light rays incident upon the Fresnel lens sheet 2 are refracted by means of the shape of the horizontally elongate lenticular lens provided at the light entrance surface 31 of the first lenticular lens 3 and they are diffused along the vertical direction of the screen (namely, vertical screen direction), the diffused light rays are not diffused by the light diffusing material along the vertical screen direction while passing through the second lenticular lens sheet 4, there is no blurring phenomenon in the image displayed on the rear-projection screen and thus good focusing characteristics can be obtained.

Also, since the light rays incident upon the light entrance surface 41 of the second lenticular lens sheet 4 are not diffused by the light diffusing material 15 but also strayed before reach the light exit surface 42, both of the brightness and contrast characteristics of the image displayed on the rear-projection screen according to the first embodiment can be improved, as compared with those of the conventional rear-projection screen. Furthermore, since the externally applied light rays incident upon the light exit surface 42 of the second lenticular lens sheet 4 are not scattered by the light diffusing material 15, the contrast characteristic of the image can be considerably improved, as compared with that of the conventional rear-projection screen.

Next, designed examples about the horizontally elongate lenticular lenses of the first lenticular lens sheet 3 and also the vertically elongate lenticular lenses of the second lenticular lens sheet 4 will now be more concretely explained. Before describing such designed examples, a coordinate system used to define aspherical shapes of the respective lenticular lenses is determined as follows.

Figure 18:
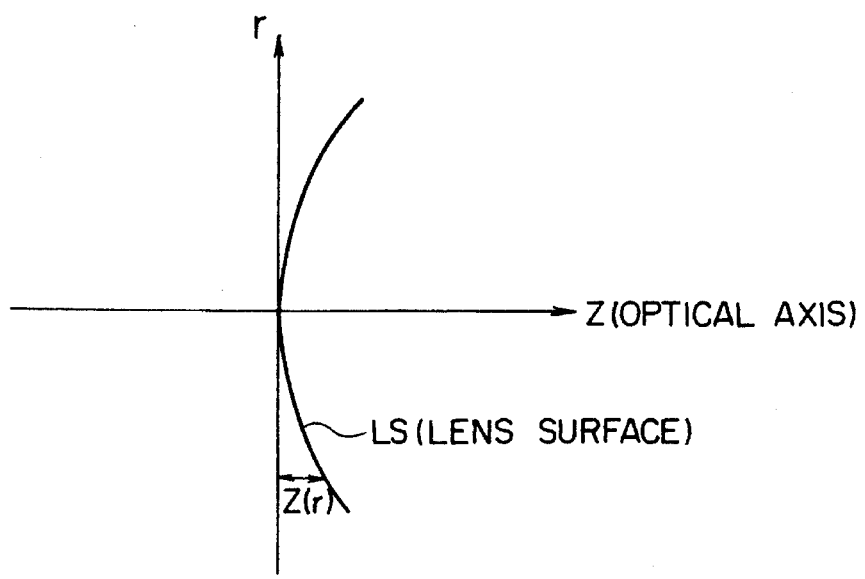
FIG. 18 is a diagram of a coordinate system for defining the aspheric shape of each of the lenticular lenses of a rear-projection screen.

FIG. 18 shows a coordinate system for defining the aspheric shape of each lenticular lens, in which the axis Z-axis corresponds to the optical axis of the lenticular lens, the direction of travel of the light rays is measured to the right on the Z-axis, the r-axis is perpendicular to the Z-axis, and "r" is the distance along the r-axis from the Z-axis. The height of the surface of the lenticular lens is defined as a function Z(r) of r represented by an equation (1).

$$Z(r) = (r^2/RD)/(1 + \sqrt{1 - (1 + CC) \times r^2/RD^2}) + AE \cdot r^4 + AF \cdot r^6 + AG \cdot r^8 + AH \cdot r^{10} \quad (1)$$

(Both of "Z(r)" and "r" shall be used in the unit "mm".) where RD is the radius of curvature, and CC, AE, AF, AG and AG are aspheric factors. Although the equation (1) includes terms up to the tenth order term of "r", the equation (1) may include 2nth order terms of r, where "n" is equal to 6 or above. The equation (1) including terms up to 2nth order term of "r" higher than the tenth order term of "r" also defines a lens surface symmetrical with respect to the Z-axis. In such a case, lens surfaces positioned symmetrically with respect to the optical axis can be obtained.

Examples of the horizontally elongate lenticular lenses for the first lenticular lens sheet 3 will be described hereinafter.

A technical means for increasing the vertical viewing angle β will be described with reference to FIG. 19.

Figure 19:
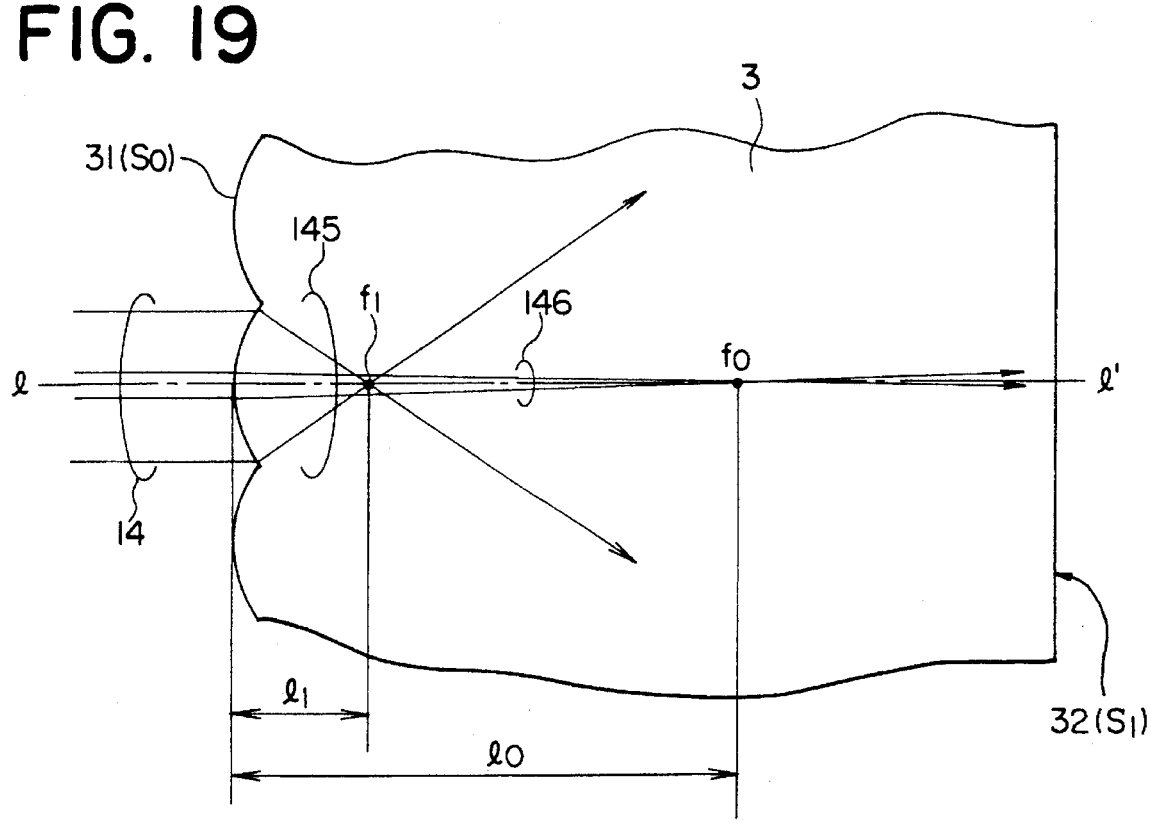
FIG. 19 is a fragmentary sectional view of assistance in explaining the diffusing function of the horizontally elongate lenticular lens of the rear-projection screen of FIG. 13.

FIG. 19 is an explanatory diagram for explaining the function to diffuse the incident light rays 14 along the vertical screen direction due to the lens effects caused by the first horizontally elongate lenticular lens provided at the light entrance surface 31 of the first lenticular lens sheet 3.

As shown in FIG. 19, the incident light rays 14 fall on the lens surface $S_0$ forming the entrance surface 31, converge on foci $f_0$ and $f_1$, and then travel toward the lens surface $S_1$ forming the exit surface 32 diverging from the foci $f_0$ and $f_1$. Thus, the entire incident light rays 14 are diffused.

To realize such a diffusing function, a central portion of the lens surface $S_0$ nearer to the optical axis 1-1' is formed in a gently convex shape convex toward the video source so that the portion has a weak refracting power, and a peripheral portion of the lens surface $S_0$ farther from the optical axis 1-1' is formed in a sharply convex shape so that the other portion has a strong condensing power.

Thus, the lens surface $S_0$ is formed so that the refractive power of the horizontally elongate lenticular lens increases with distance from the optical axis 1-1'; that is, the focal length $l_0$ of the central portion of the horizontally elongate lenticular lens is far longer than the focal length $l_1$ of the peripheral portion of the horizontally elongate lenticular lens.

As a consequence, the stronger the refraction force at the lens surface $S_0$ provided at the light entrance surface 31 becomes, the farther the distance separated from the optical axis 1-1' becomes. The light rays 145 which pass through this strong refracting lens surface are refracted strongly, as compared with the light rays 146 passing near the optical axis 1-1' and refracted thereon. Thus, broader vertical directional characteristics can be realized.

Figure 20:
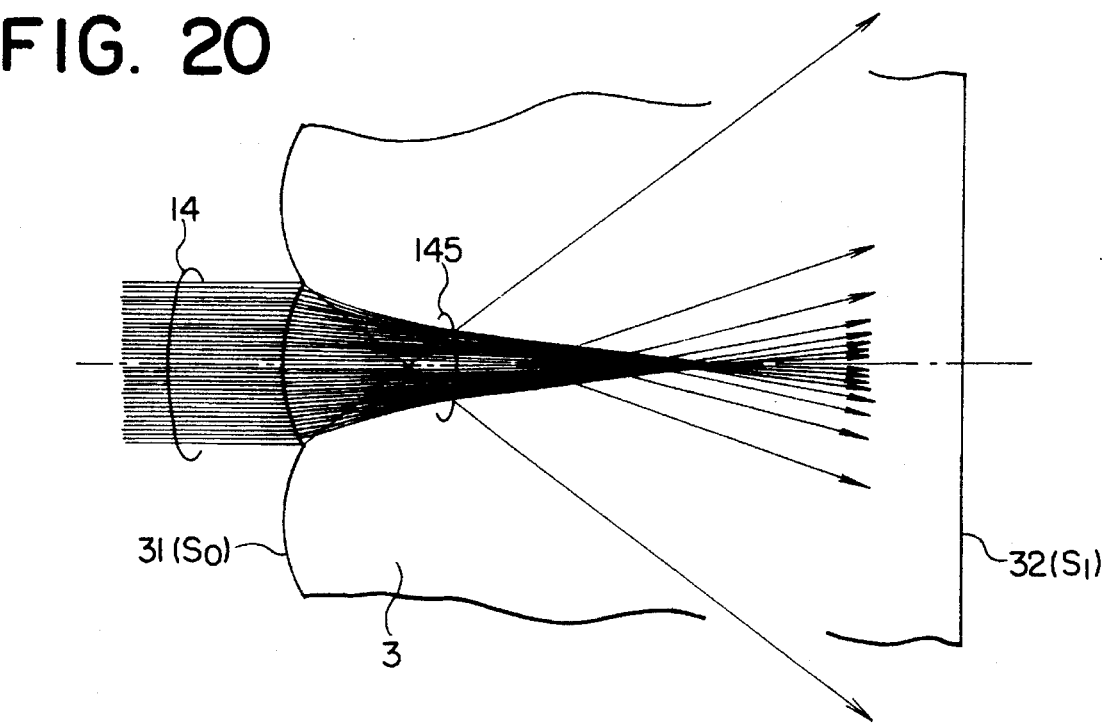
FIG. 20 is a fragmentary sectional view of assistance in explaining a horizontally elongate lenticular lens of a structure specified in Table 1 and the vertical diffusion of light rays.

Table 1 represents a designed sample of the horizontally elongate lenticular lens provided at the optical entrance surface 31 of the first lenticular lens sheet 3 with respect to the radius of curvature, the aspherical coefficient, the surface distance, index of refraction, and effective radius defined in the equation (1). The reason why the radius of curvature of the light exit surface 32 becomes "∞" is such that the light exit surface 32 is plane. FIG. 20 is a schematic, vertical sectional view of a horizontally elongate lenticular lens represented by the design data shown in Table 1.

TABLE 1

| Lens surface | | Light entrance surface $S_0$ | Light exit surface $S_1$ |
|---|---|---|---|
| Radius of curvature RD | | 0.105 | ∞ |
| Aspherical coefficient | CC | 5.82 | 0.0 |
| | AE | 0.0 | 0.0 |
| | AF | 0.0 | 0.0 |
| | AG | 0.0 | 0.0 |
| | AH | 0.0 | 0.0 |
| Effective radius P/2 | | 0.04 | — |
| Spacing t | | 0.5 | |
| Refractive index | | 1.570 | |

As shown in Table 1 and FIG. 20, the lens surface $S_0$ forming the entrance surface 31 is convex toward the image generating source and has a radius of curvature of 0.105 mm, a spacing (surface interval) "t", i.e., the distance between the lens surfaces $S_0$ and $S_1$ along the optical axis, of 0.5 mm and a refractive index of 1.570.

When the center of curvature of the lens surface is behind the lens surface with respect to the direction of travel of the light rays, the radius of curvature is represented by a positive value.

The effective radius P/2 of 0.04 mm means that $0 \leq r \leq 0.04$ mm for the function Z(r) expressed by the equation (1).

Figure 21:
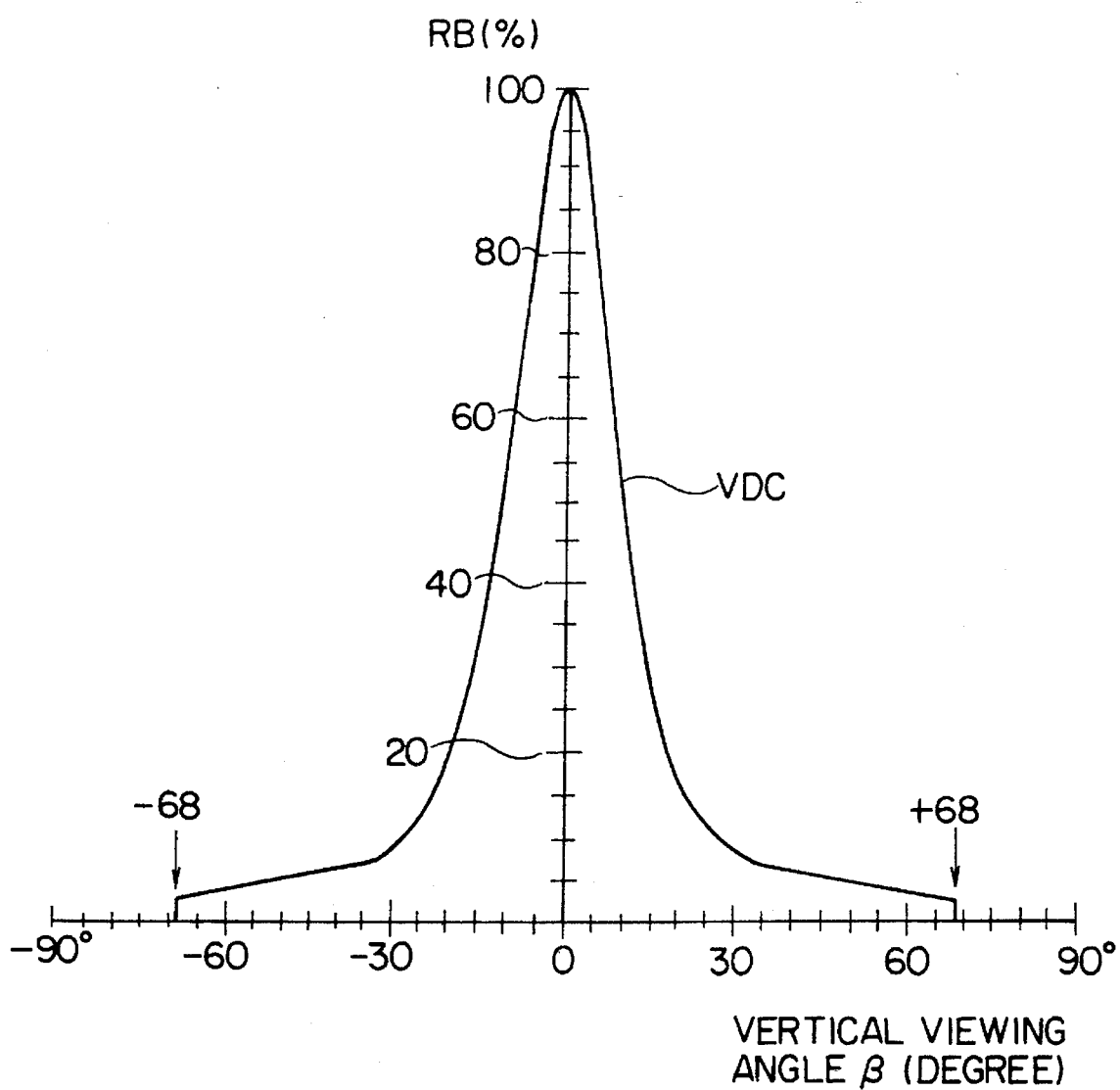
FIG. 21 is a graph showing the vertical directional characteristics of the lenticular lens of a structure specified in Table 1.

FIG. 21 shows the vertical directional characteristics of the rear-projection screen employing the horizontally elongate lenticular lens of Table 1.

As shown in FIG. 21, the vertical angular range of visibility is ±68°, and the specific vertical viewing angle is ±10°, which are a sufficiently wide vertical angular range of visibility and a sufficiently large specific vertical viewing angle.

Figure 22:
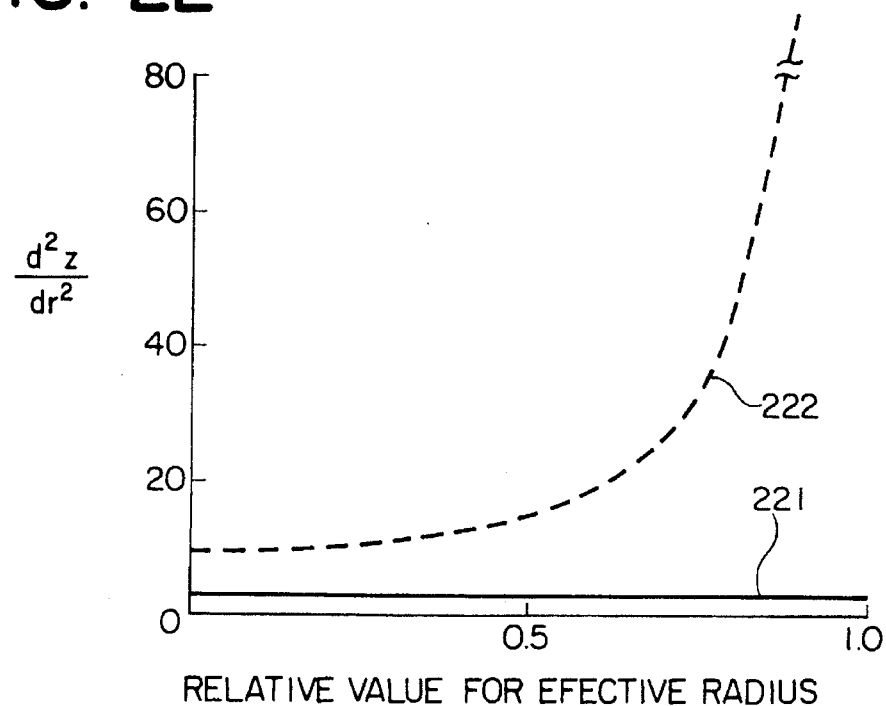
FIG. 22 is a graph comparatively showing the dependence of the performance of the rear-projection screen of the present invention and the prior art rear-projection screen on the shape of horizontally elongate lenticular lenses.

FIG. 22 is a graph comparatively showing the variations in lens effects related to the shape of the horizontally elongate lenticular lenses forming the entrance surface of the first lenticular lens sheet 3 of the rear-projection screen in the first embodiment and related to those of the Fresnel lens of the prior art rear-projection screen.

Referring to FIG. 22, the second differential of the function Z(r) of the equation (1) with respect to r is measured on the ordinate and the distance from the optical axis relative to effective radius, which will be referred to as "relative distance", is measured on the abscissa. In FIG. 22, a solid line 221 represents the characteristics of the horizontally elongate lenticular lens of the prior art rear-projection screen, and a broken line 222 represents the characteristics of the horizontally elongate lenticular lens corresponding to the lens shape specified in Table 1 of the rear-projection screen in the first embodiment.

As mentioned above, the variations in the lens effects in the radial direction can be understood from the increased/decreased values of the second differential. As indicated by the broken line 222, the values of the second differential for the horizontally elongate lenticular lens of the rear-projection screen in the first embodiment increases with the distance from the optical axis 1-1', which corresponds to an increase in the refractive power with the distance from the optical axis 1-1'. On the other hand, as indicted by the solid line 221, the values of the second differential for the horizontally elongate lenticular lens of the prior art rear-projection screen remains substantially constant regardless of the increase in the distance from the optical axis 1-1'. As a result, the lens effect of the conventional lenticular lens is not changed.

Examples of the vertically elongate lenticular lenses of the second lenticular lens sheet 4 will be described hereinafter with reference to FIGS. 23 and 24 in terms of technical means for increasing the horizontal viewing angle α.

Figure 23:
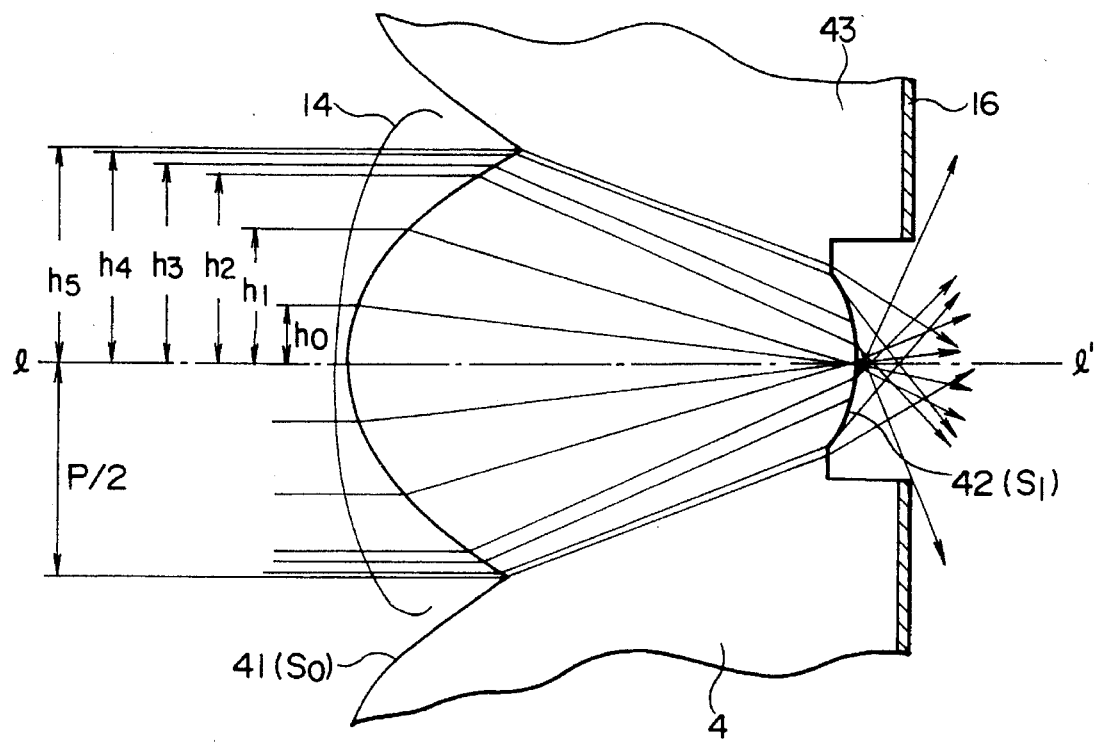
FIG. 23 is a diagrammatic view of assistance in explaining the diffusing function of vertically elongate lenticular lens of the rear-projection screen of FIG. 13.
Figure 24:
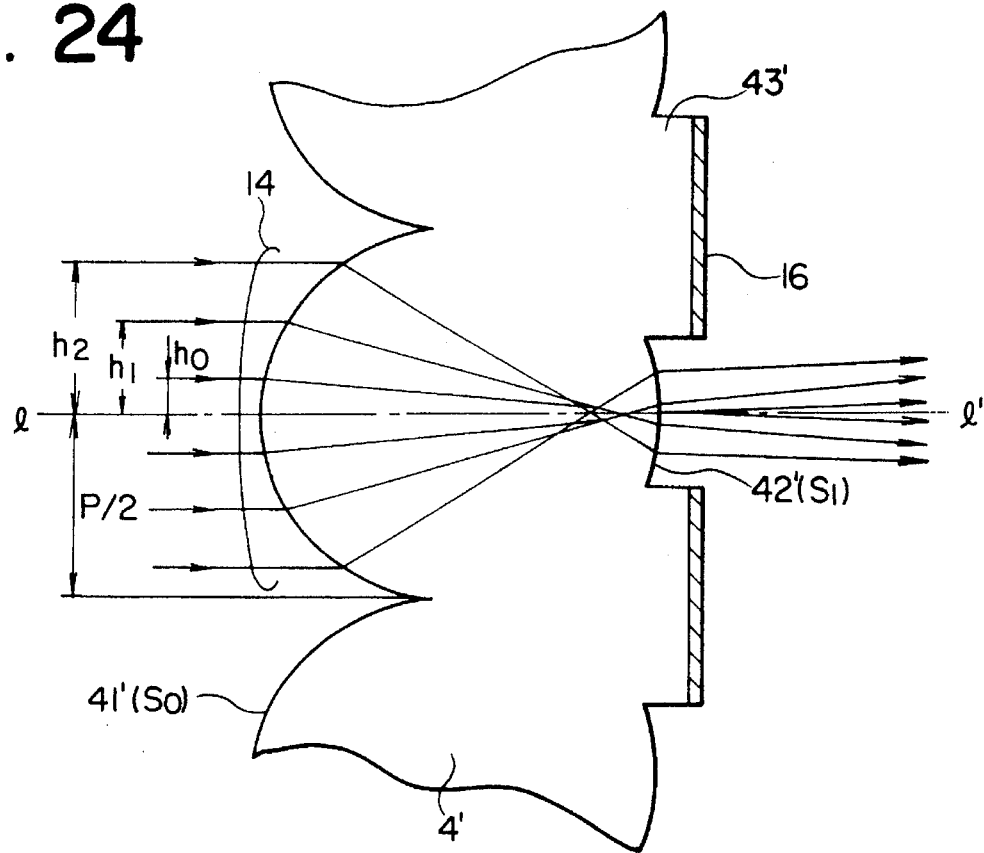
FIG. 24 is a diagrammatic view of assistance in explaining the diffusing function of the vertically elongate lenticular lens of an ordinary rear-projection screen.

FIG. 23 is a horizontal sectional view of the second lenticular lens sheet 4 of FIG. 13 and FIG. 24 is a horizontal sectional view of a prior art lenticular lens sheet 4'.

As represented in FIG. 24, when the first vertically elongate lenticular lens forming the entrance surface 41' of the lenticular lens sheet 4' has the shape of a portion of a circular cylinder, a mode of refracting a paraxial light ray falling at a point at a distance $h_0$ from the optical axis 1-1' on the entrance surface 41' and a mode of refracting a peripheral light ray falling at a point at a distance $h_2$ from the optical axis 1-1' on the entrance surface 41' are different from each other, and the paraxial light ray falling at the point at the distance $h_0$ from the optical axis 1-1' on the entrance surface 41' come to a focus at different positions near the light exit surface 42' on the optical axis 1-1', respectively. That is, the point where the light ray falling at the position at the distance $h_2$ from the optical axis 1-1' comes to a focus is nearer to the entrance surface 31 than the point where the paraxial light ray falling at the point at the distance $h_0$ from the optical axis 1-1' comes to a focus.

Such a phenomenon is called, in general "longitudinal, spherical aberration". Vertical, spherical aberration in which a point where a light ray initially farther from the optical axis 1-1' comes to a focus is nearer to the entrance surface 41' than a point where a light ray initially nearer to the optical axis 1-1' comes to a focus will be referred to as "positive, longitudinal, spherical aberration", and vertical spherical aberration in which a point where a light ray initially farther from the optical axis 1-1' comes to a focus is farther from the entrance surface 41' than a point where a light ray initially nearer to the optical axis 1-1' comes to a focus will be referred to as "negative, longitudinal, spherical aberration".

In the rear-projection screen in the first embodiment, the entrance surface 41 has the shape shown in FIG. 23, which causes negative, longitudinal, spherical aberration and makes the light rays initially near from the optical axis 1-1' come to a focus at a position near the exit surface 42. Furthermore, the shape of the light exit surface 42 becomes convex at the image observing side.

When the entrance surface 41 and the exit surface 42 are formed respectively in such shapes, the light rays initially remote from the optical axis 1-1' fall on the exit surface 42 at incident angles nearly equal to the critical angle and hence the light rays are refracted at large angles of refraction on the exit surface 42. Accordingly, the horizontal viewing angle α of the rear-projection screen in the first embodiment is far greater than that of the prior art rear-projection screen.

Technical means for suppressing color shift will be described hereinafter with reference to FIG. 25.

Figure 25:
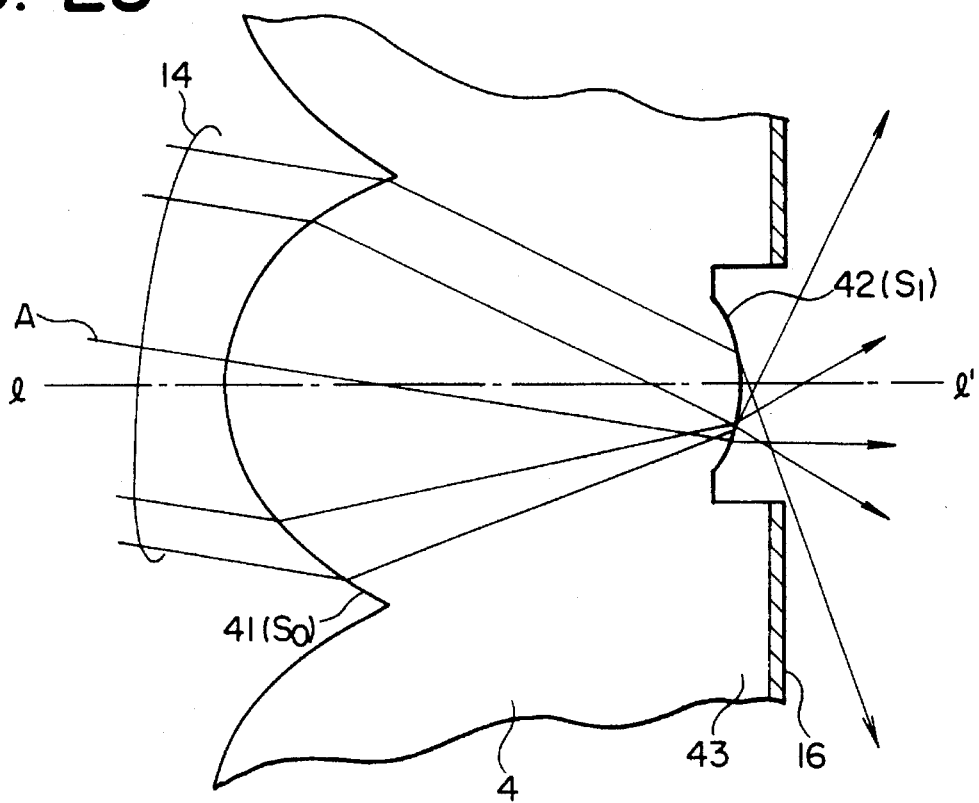
FIG. 25 is a diagrammatic view of assistance in explaining the diffusing function of the vertically elongate lenticular lens sheet of a rear-projection screen of FIG. 13.

Referring to FIG. 25, as mentioned above, the red rays and the blue rays fall on the entrance surface 41 of the second lenticular lens sheet 4 obliquely as incident light rays. Accordingly, it is necessary that the light rays "A" falling at positions near the optical axis 1-1' travel substantially parallel to the optical axis 1-1' after being refracted on the exit surface 42 to suppress color shift.

The entrance surface 41 and the exit surface 42 of the second lenticular lens sheet 4 of the rear-projection screen in the first embodiment are formed in shapes which make the light rays A travel substantially in parallel to the optical axis 1-1' after refraction on the exit surface 42.

Design data of such entrance surfaces 41 and such exit surfaces 42 for enhancing a horizontal viewing angle α and for suppressing a color shift are shown in Tables 2 and 3.

TABLE 2

| Lens surface | | Light entrance surface $S_0$ | Light exit surface $S_1$ |
|---|---|---|---|
| Radius of curvature RD | | 0.28845 | −0.20961 |
| Aspherical coefficient | CC | −0.954 | −0.400 |
| | AE | 5.2 | −0.156 |
| | AF | −75.0 | 9.045 |
| | AG | 1211.0 | 12000.0 |
| | AH | −5653.0 | 1200000.0 |
| Effective radius P/2 | | 0.365 | 0.159 |
| Spacing t | | 0.88 | |
| Refractive index | | 1.493 | |

TABLE 3

| Lens surface | | Light entrance surface $S_0$ | Light exit surface $S_1$ |
|---|---|---|---|
| Radius of curvature RD | | 0.28885 | −0.2100 |
| Aspherical coefficient | CC | −0.954 | −3.669 |
| | AE | 5.2 | −0.156 |
| | AF | −75.0 | 9.044 |
| | AG | 1211.0 | 1843.0 |

TABLE 3-continued

| Lens surface | Light entrance surface $S_0$ | Light exit surface $S_1$ |
|---|---|---|
| AH | −5653.0 | 230640 |
| Effective radius P/2 | 0.365 | 0.159 |
| Spacing t | 0.88 | |
| Refractive index | 1.49 | |

Figure 26:
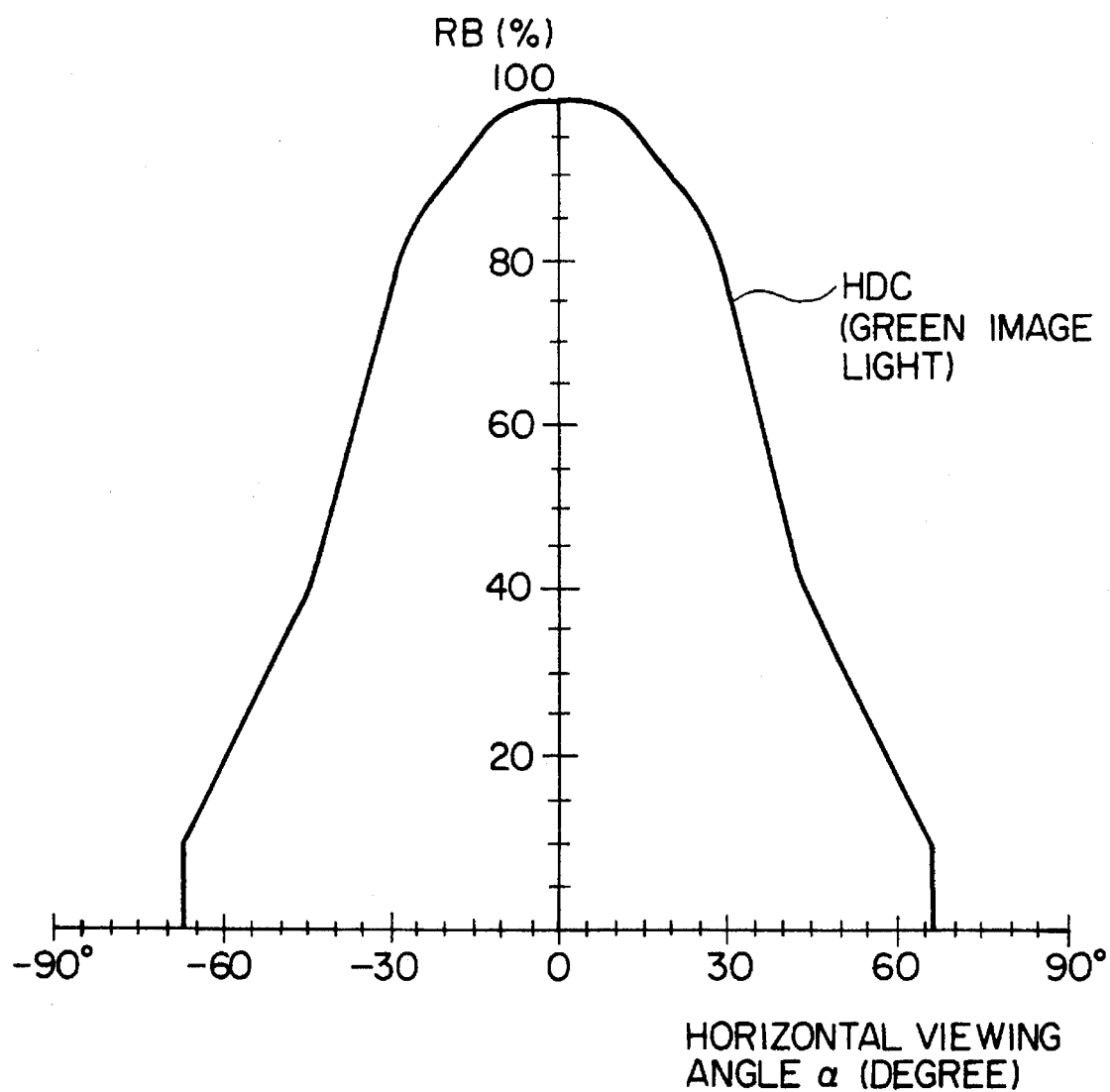
FIG. 26 is a graph showing the horizontal directional characteristics of a second lenticular lens sheet 4 of a structure specified in Table 2.
Figure 27:
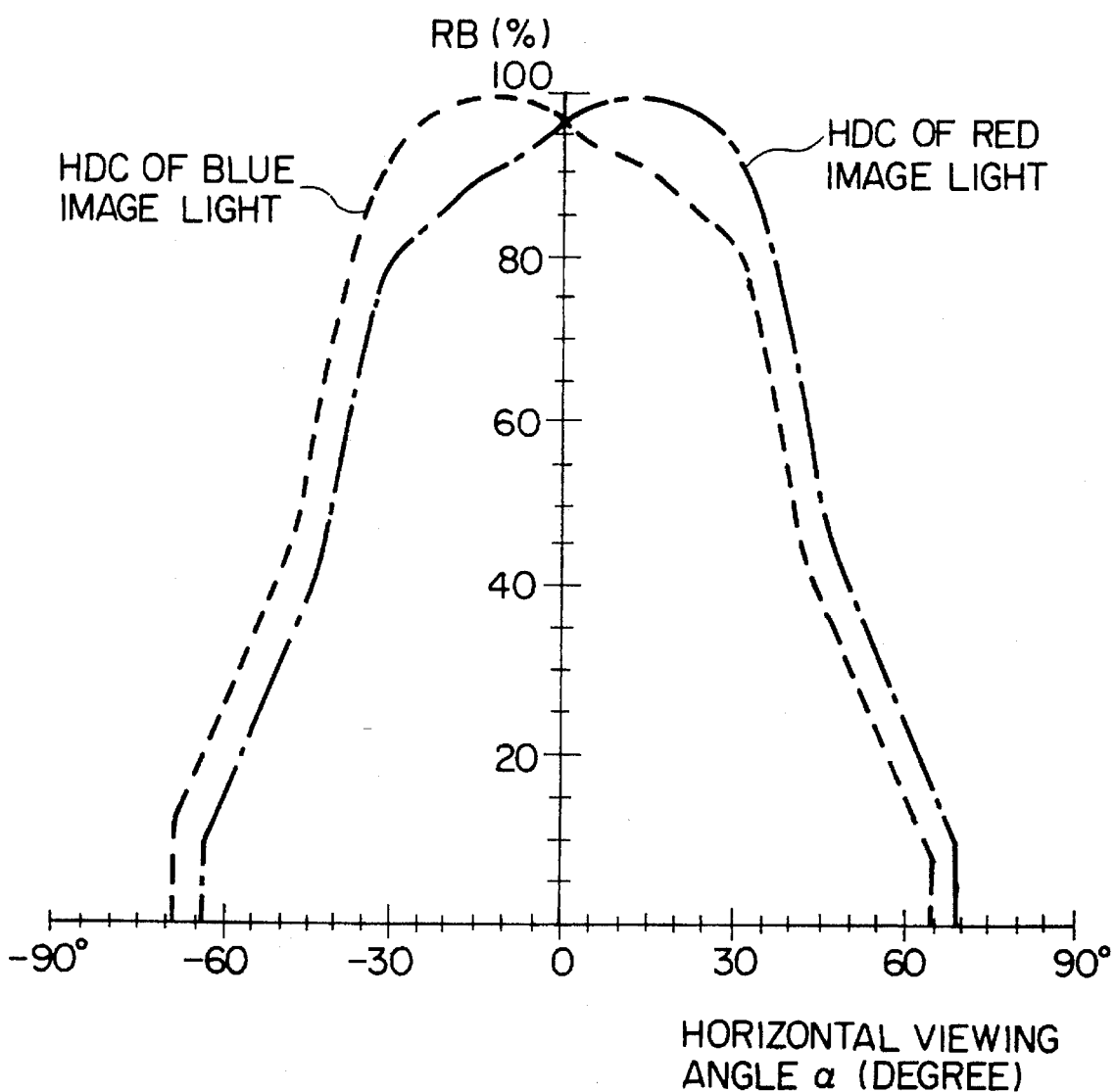
FIG. 27 is a graph showing the horizontal directional characteristics of the second lenticular lens sheet 4 of a structure specified in Table 2 for red rays and blue rays.

FIG. 26 is a graph showing the horizontal directional characteristics of a second lenticular lens sheet 4 having the entrance surface 41 and the exit surface 42 of the design data specified in Table 2, and FIG. 27 is a graph showing the horizontal directional characteristics of the second lenticular lens sheet 4 having the entrance surface 41 and the exit surface 42 of the design data specified in Table 2 for red rays or blue rays.

As is obvious from FIG. 26, a range for the horizontal angular α of visibility is ±67°, which is far greater than the horizontal viewing angle of the prior art rear-projection screen. As is obvious from FIG. 27, the degree of color shift is half the degree of color shift on the prior art rear-projection screen.

Figure 28:
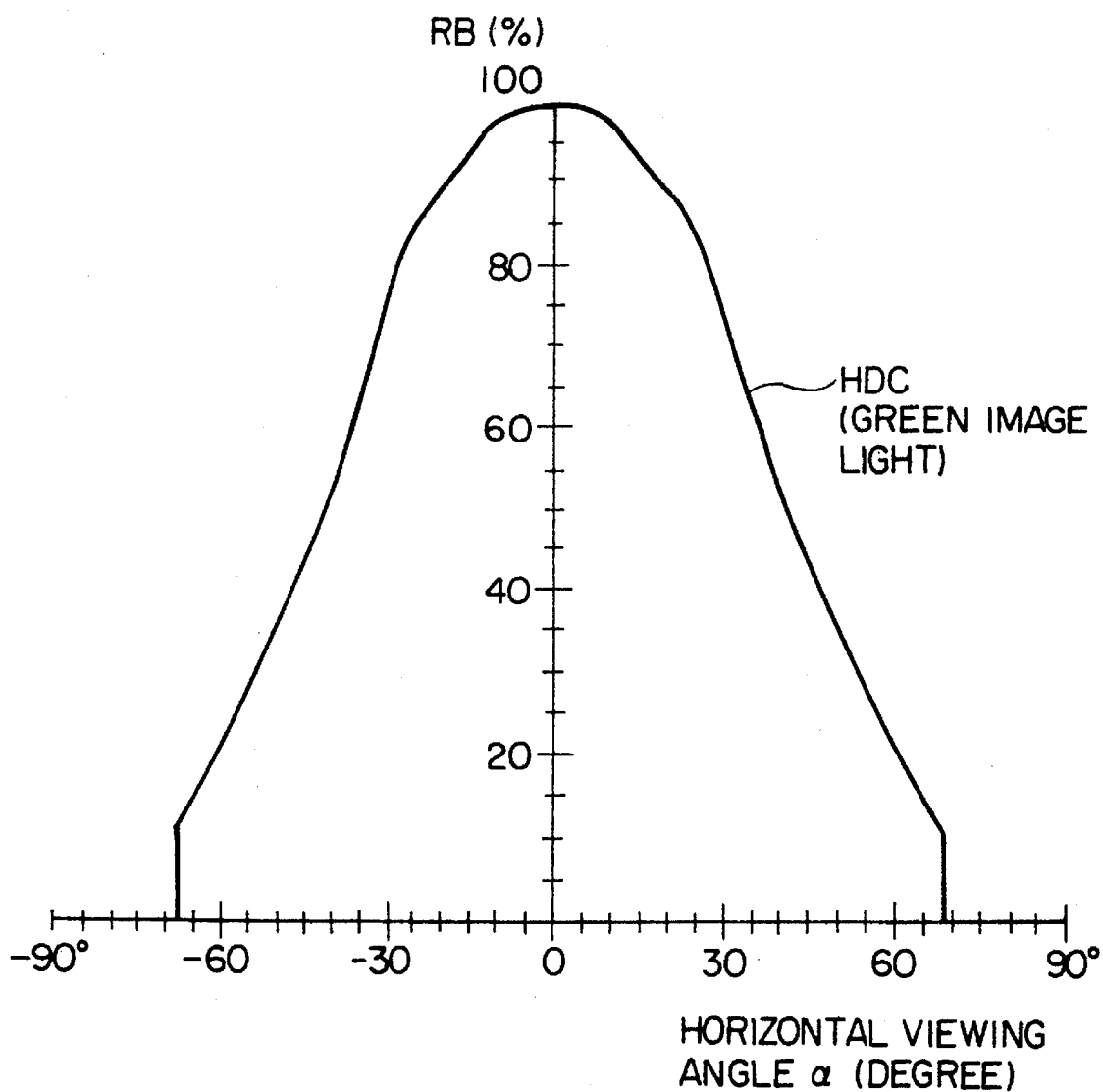
FIG. 28 is a graph showing the horizontal directional characteristics of the second lenticular lens sheet 4 of a structure specified in Table 3.
Figure 29:
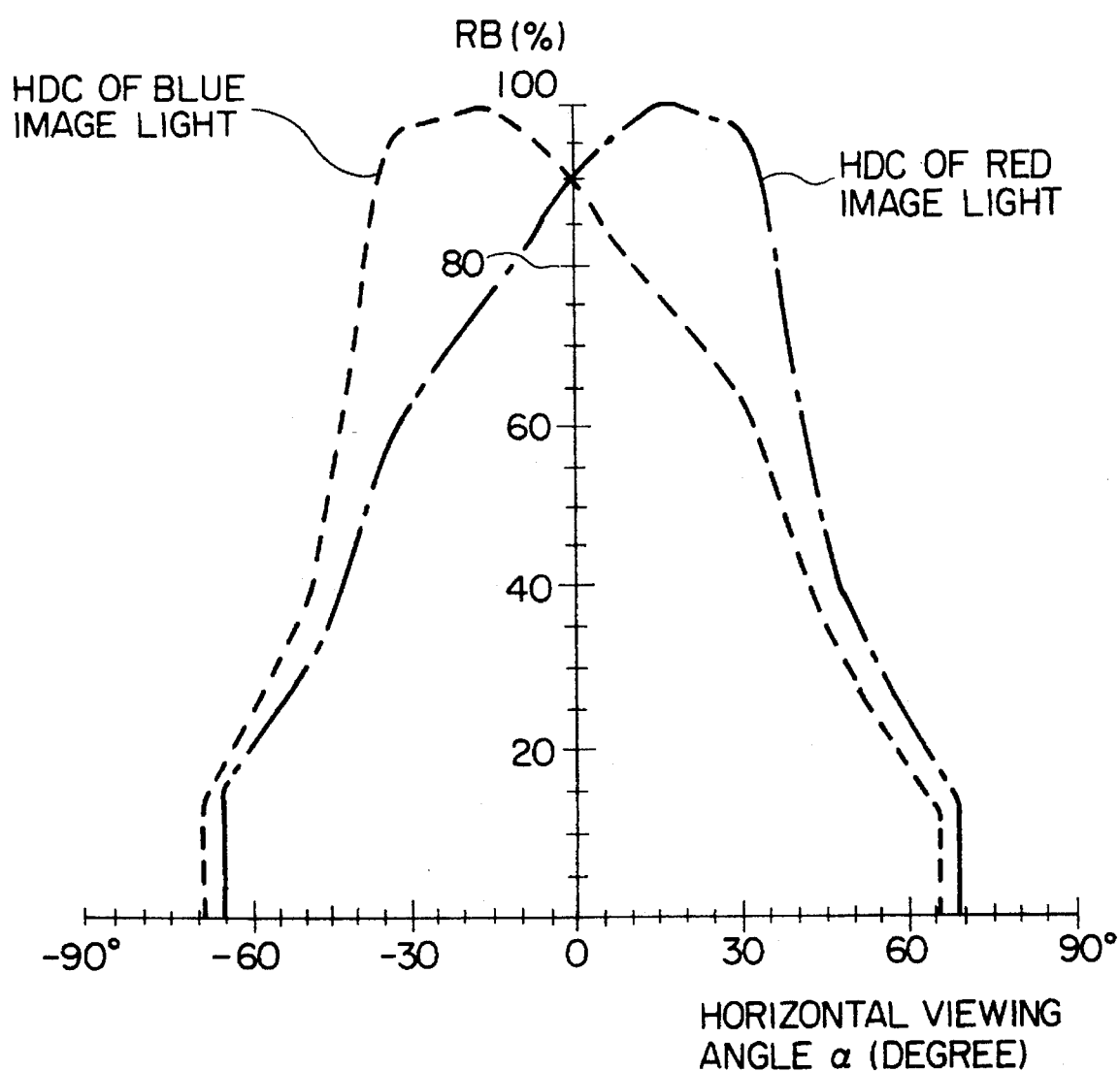
FIG. 29 is a graph showing the horizontal directional characteristic of the second lenticular lens sheet 4 of a structure specified in Table 3 for red rays and blue rays.

FIG. 28 is a graph showing the horizontal directional characteristics of a second lenticular lens sheet 4 having the entrance surface 41 and the exit surface 42 of the design data specified in Table 3, and FIG. 29 is a graph showing the horizontal directional characteristics of the second lenticular lens sheet 4 having the entrance surface 41 and the exit surface 42 of the design data specified in Table 3 for red rays or blue rays.

As shown in FIGS. 28 and 29, the rear-projection screen in the first embodiment is equivalent to or somewhat superior to the prior art rear-projection screen in the degree of color shift, and the horizontal angular range of visibility of ±68° of the rear-projection screen in the first embodiment is far greater than that of the prior art rear-projection screen.

Figure 30:
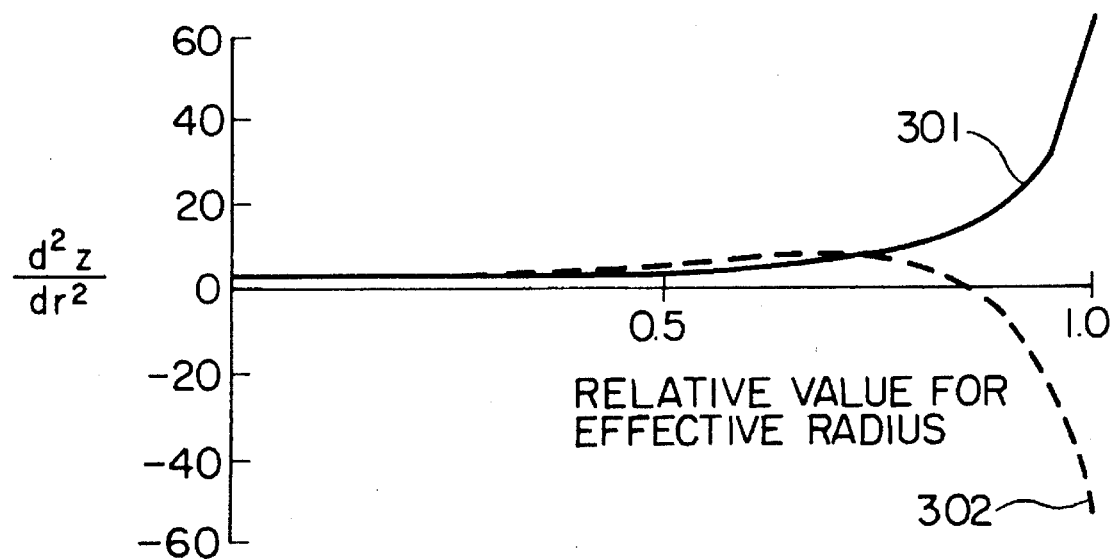
FIG. 30 is a graph comparatively showing the dependence of the performance of a rear-projection screen of the present invention and a prior art rear-projection screen on the shape of the first vertically elongate lenticular lens.

FIG. 30 is a graph comparatively showing the lens effect related to the shape of the light entrance surface of the second lenticular lens sheet 4 of the rear-projection screen in the first embodiment employing the second lenticular lens sheet of the design data specified in Table 2 and the prior art rear-projection screen on the shape of the entrance surface.

In FIG. 30 ordinate represents the second differential of the function Z(r) represented by the equation (1) defining the shape of the entrance surface 41 of the second lenticular lens sheet 4 whereas abscissa indicates a relative distance from the optical axis, i.e., the distance from the optical axis normalized by the effective radius P/2. Then, a solid line 301 indicates characteristics of the prior art rear-projection screen, and a broken line 302 shows characteristics of the rear-projection screen in the first embodiment having the entrance surface of the design data specified in Table 2, respectively.

The refracting effect of the entrance surface at points at a distance from the optical axis can be understood from the increased/decreased values of the second derivative. As is obvious from the broken line 302, the value of the second differential for the entrance surface of the rear-projection screen in the first embodiment becomes negative at positions at distances from the optical axis 1-1' greater than a certain value. And the refracting effect decreases with the distance from the optical axis 1-1'. On the other hand, as is obvious from the solid line 301 the second differential of the equation (1) for the prior art rear-projection screen increases and the refracting effect increases with the distance from the optical axis 1-1'.

Figure 31:
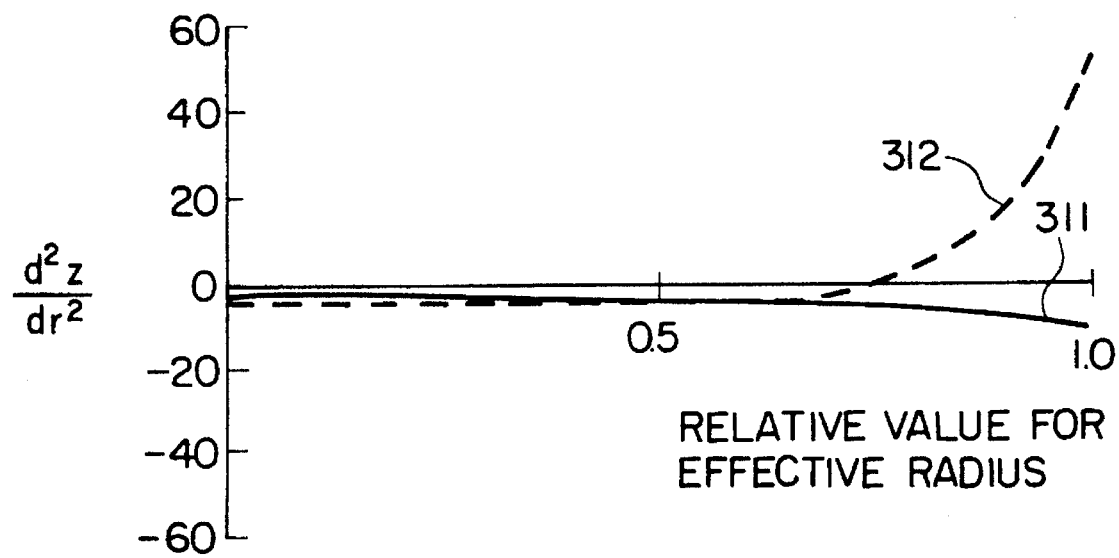
FIG. 31 is a graph comparatively showing the dependence of the performance of a rear-projection screen of the present invention and a prior art rear-projection screen on the shape of the second vertically elongate lenticular lens.

FIG. 31 is a graph comparatively showing the dependence of the refracting effect of the rear-projection screen in the first embodiment employing the second lenticular lens sheet 4 of the design specified in Table 2 and the prior art rear-projection screen on the shape of the exit surface, which is convex toward the viewing side, of the lenticular lens sheet, in which the second differential of the equation (1) is measured on the ordinate and the relative distance is measured on the abscissa, and a solid line 311 and a broken line 312 are for the prior art rear-projection screen and the rear-projection screen in the first embodiment, respectively.

The second differential for the exit surface of the rear-projection screen in the first embodiment increases with the distance from the optical axis l-l' from negative values to positive values as indicated by the broken line 312 and hence the refracting effect, i.e., focusing effect, of the exit surface decreases. On the other hand, the second differential for the exit surface of the prior art rear-projection screen remains substantially constant at a negative value regardless of the distance from the optical axis l-l' as indicated by the solid line 311 and hence the refracting effect remains constant.

As is apparent from the foregoing description, the rear-projection screen according to the first embodiment comprises the second lenticular lens sheet 4 having the base sheet not containing any light diffusing material 15, and the first lenticular lens sheet 3 of a smallest possible thickness to exhibit improved focusing performance, to display an image in improved brightness and contrast, to enhance the vertical directional characteristics and to suppress color shift.

In this first embodiment, the first lenticular lens sheet shown in FIG. 13 is so arranged that a plurality of horizontally elongate lenticular lenses are arranged at the light entrance surface 31. However, the present invention is not limited to this example where the horizontally elongate lenticular lenses are arranged at the light entrance surface 31. Various modifications will now be explained.

Figure 32:
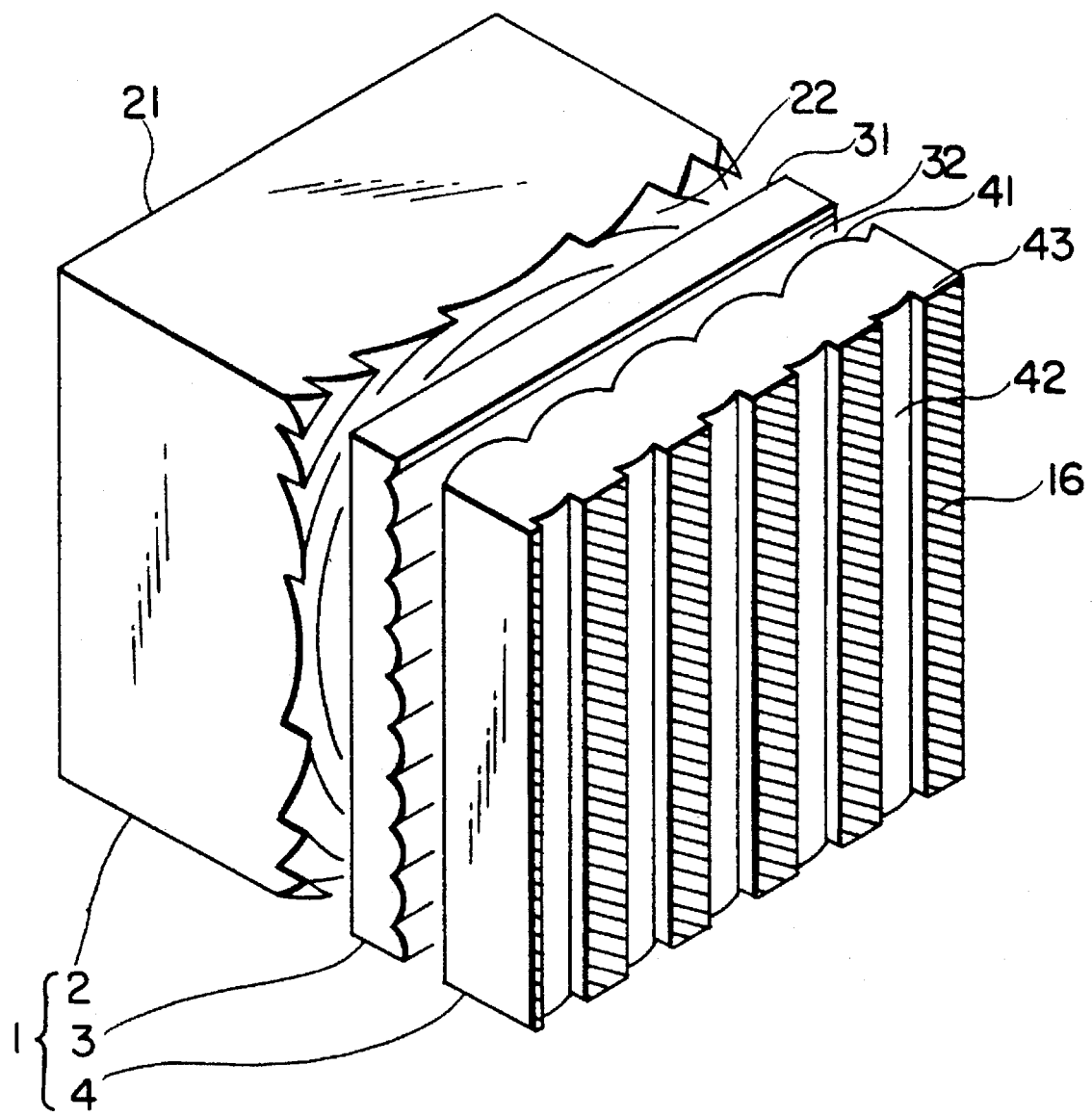
FIG. 32 is a perspective view of a major portion of a rear-projection screen as a modification of the first embodiment according to the present invention.
Figure 33:
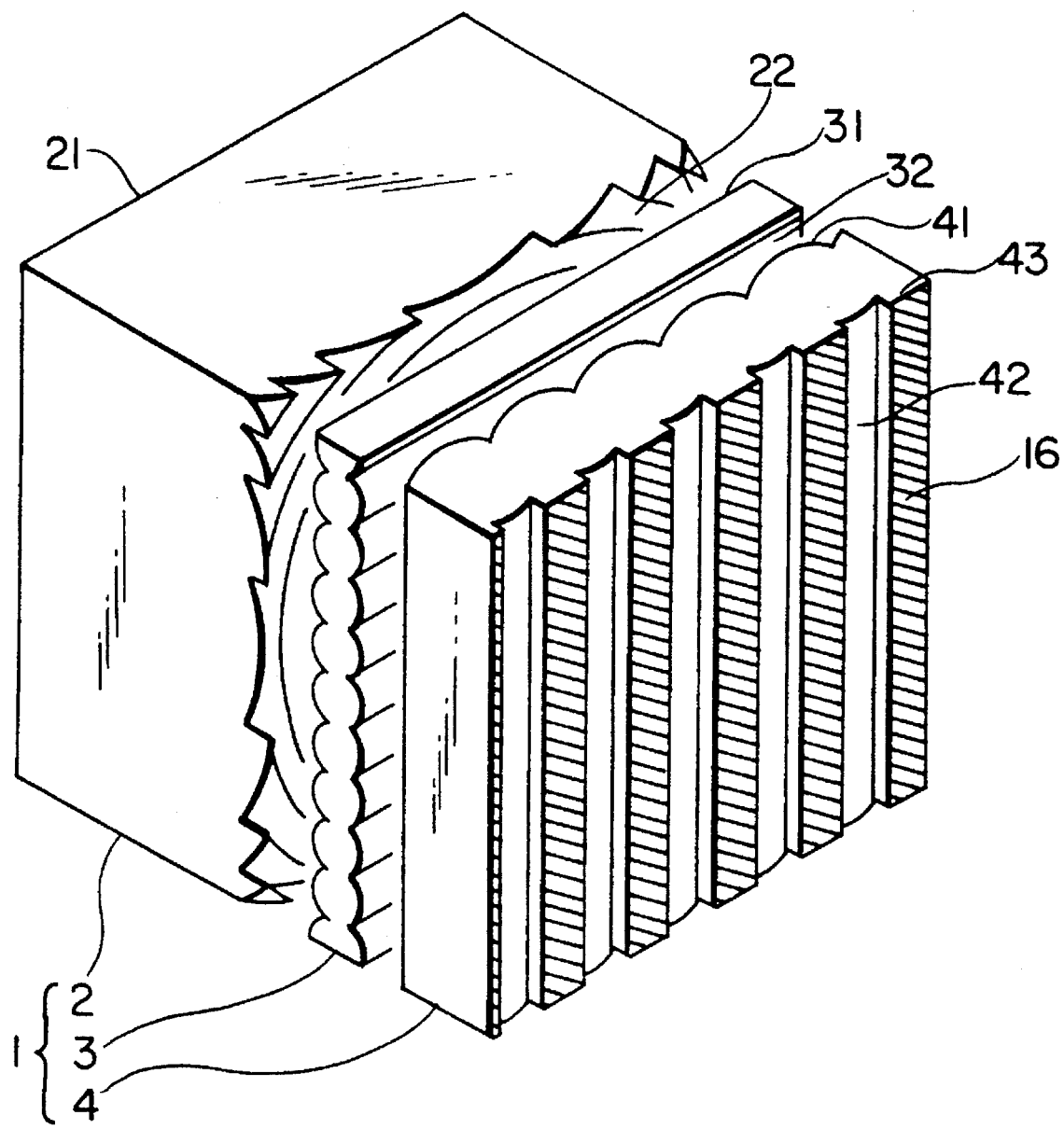
FIG. 33 is a perspective view of a major portion of a rear-projection screen as another modification of the first embodiment according to the present invention.

FIGS. 32 and 33 are perspective views for showing major portions of the rear-projection screen 1 in which the first lenticular lens sheet 3 with other constructions is employed as the first lenticular lens sheet 3 of the rear-projection screen 1.

In the first lenticular lens sheet 3 shown in FIG. 32, it is so constructed that a plurality of horizontally elongate lenticular lenses are arranged at the light exit surface 32. This first lenticular lens sheet 3 with such an arrangement has a similar effect to that of the first lenticular lens sheet 3 shown in FIG. 13.

On the other hand, in the first lenticular lens sheet 3 shown in FIG. 33, it is so constructed that a plurality of horizontally elongate lenticular lenses are arranged at both of the light entrance surface 31 and the light exit surface 32. Even when this first lenticular lens sheet has such a construction, there is a similar advantage to that of the first lenticular lens sheet 3 shown in FIG. 13. Furthermore, since there are provided the horizontally elongate lenticular lenses on both of the light entrance surface 31 and the light exit surface 32, the directional characteristics along the vertical screen direction can be enhanced.

Also, although a plurality of lenticular lenses with convex directed to the image generating source side are arranged as the horizontally elongate lenticular lenses at the light entrance surface 31 of the first lenticular lens sheet 3 shown in FIG. 13, the present invention is not limited thereto. A detailed description will now be made of modifications.

Figure 34:
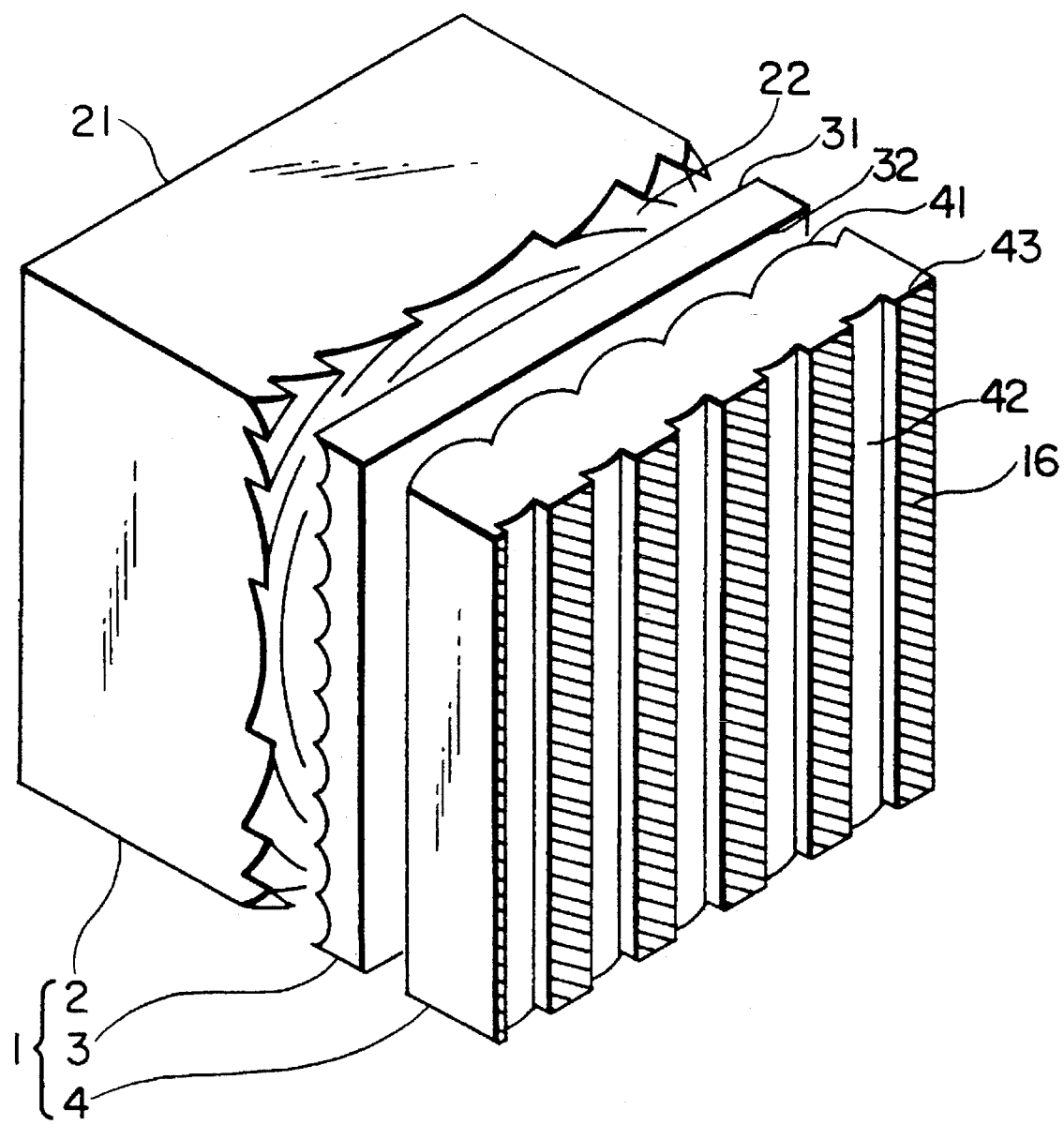
FIG. 34 is a perspective view of a major portion of a rear-projection screen as a further modification of the first embodiment according to the present invention.
Figure 35:
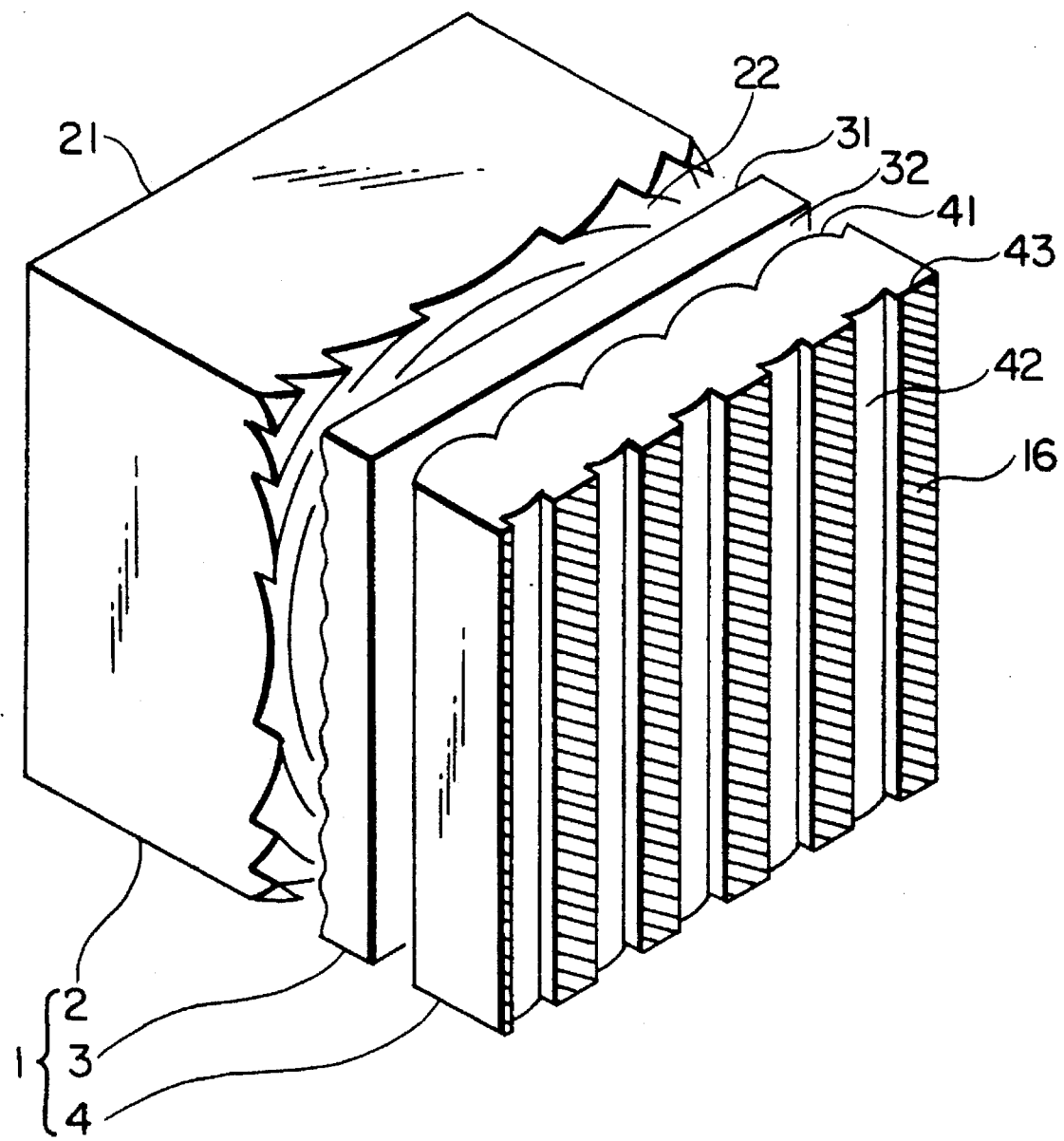
FIG. 35 is a perspective view of a major portion of a rear-projection screen as a still further modification of the first embodiment according to the present invention.

FIGS. 34 and 35 are perspective view for showing a major portion of the rear-projection screen 1 in which horizontally elongate lenticular lenses with other shapes are arranged as a horizontal elongate lenticular lens at the light entrance surface 31 of the first lenticular lens sheet 3 of the rear-projection screen 1.

At the light entrance surface 31 of the first lenticular lens sheet 3 shown in FIG. 34, a plurality of lenticular lenses with a concave directed to the image generating source side are arranged as the horizontally elongate lenticular lens. Even when the horizontally elongate lenticular lens with such a concave is employed, there is a similar merit to that of the horizontally elongate lenticular lens having the shape shown in FIG. 13.

On the other hand, at the light entrance surface 31 of the first lenticular lens sheet 3 shown in FIG. 35, both of plural lenticular lenses with a convex directed to the image generating source side and plural lenticular lenses with a concave directed to the image generating source side are alternately arranged as the horizontally elongate lenticular lens.

Figure 36:
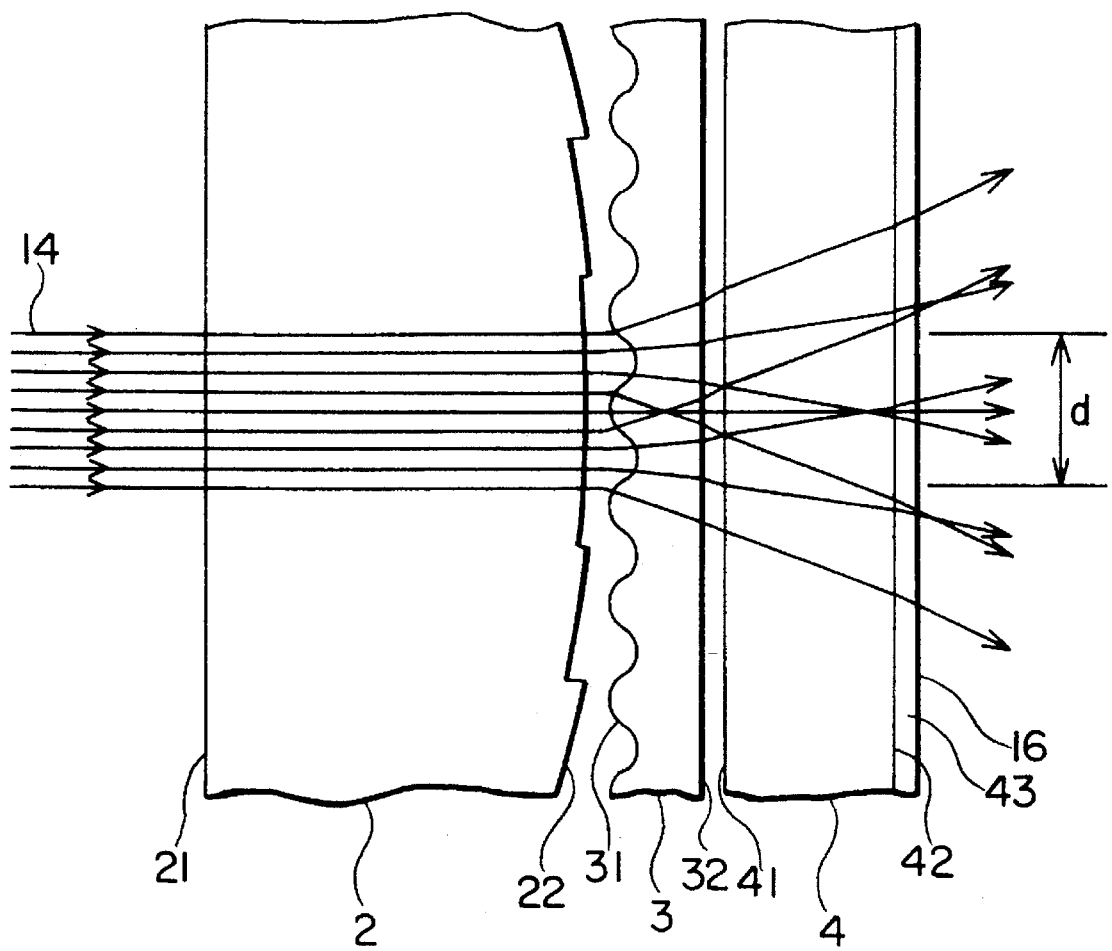
FIG. 36 is a fragmentary, vertical sectional view of the rear-projection screen of FIG. 35.

FIG. 36 is a vertical sectional view of the rear-projection screen 1 shown in FIG. 35. Reference numeral 14 indicates incident light rays.

As shown in FIG. 36, after the incident light rays 14 incident upon the Fresnel lens sheet 2 is refracted by way of the shape of the horizontally elongate lenticular lenses provided at the light entrance surface 31 of the first lenticular lens sheet 3 and then diffused along the vertical screen direction, since the refracted light rays are not diffused along the vertical screen direction, a width "d" of outgoing light rays along the vertical screen direction as viewed at the image observation side with regard to the incident light rays 14, may be recognized as another width of light rays appearing at the light exit surface 22 of the Fresnel lens sheet 2, which is similar to that of the above-described rear-projection screen shown in FIG. 16. As a result, there is an advantage that better focusing characteristics can be achieved.

In addition to the improved focusing characteristics, there are similar advantages to those of the horizontally elongate lenticular lenses with the shape shown in FIG. 13 in such a horizontally elongate lenticular lens with a shape shown in FIG. 35.

Moreover, the horizontally elongate lenticular lens with the shape shown in FIG. 35 has the following advantages. That is, when the radius of curvature of the horizontally elongate lenticular lens is made small to enhance the directional characteristic along the vertical screen direction, the lens planes are not intersected with each other at an acute angle as the shapes of the boundary portions among the adjoining lenticular lenses. As a result, when the horizontally elongate lenticular lens is manufactured by means of a mold, the shapes of the above-described boundary portions thereof can be substantially completely reproduced, which provides a good forming of a rear-projection screen.

Figures 37A, 37B, 37C:
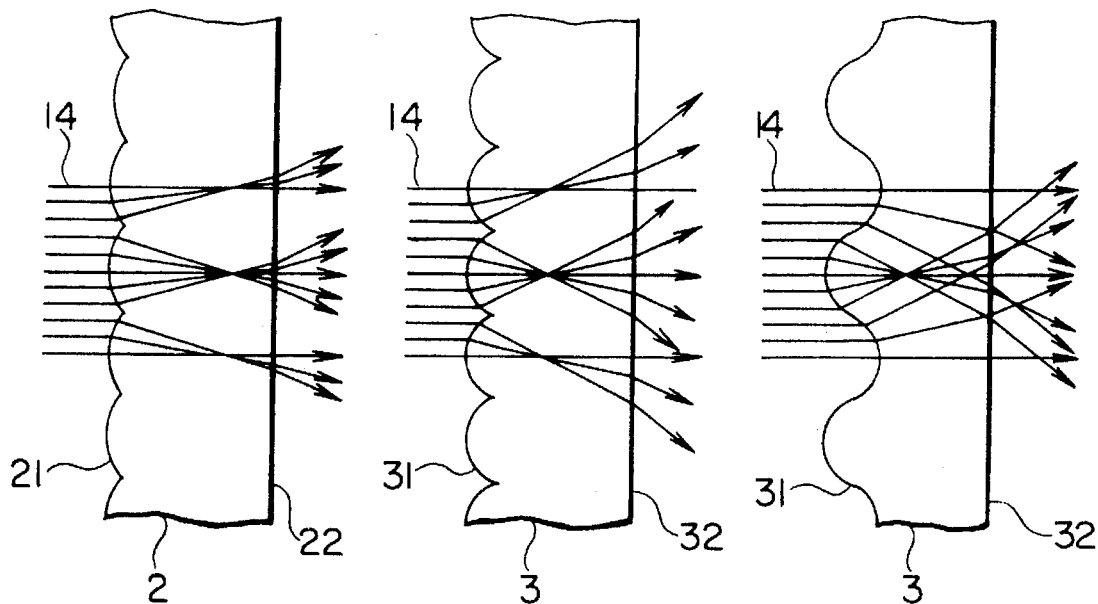
FIGS. 37A, 37B and 37C are vertical sectional views of a Fresnel lens sheet included in a prior art rear-projection screen, the first lenticular lens sheet included in the rear-projection screen of FIG. 13, and the first lenticular lens sheet included in the rear-projection screen of FIG. 35, respectively.

FIGS. 37A, 37B and 37C are vertical sectional views of the Fresnel lens sheet 2 of the prior art rear-projection screen of FIG. 1, the first lenticular lens sheet 2 of the rear-projection screen 1 of FIG. 13 according to the first embodiment and the first lenticular lens sheet 3 of the rear-projection screen of FIG. 35, according to a modification of the first embodiment, respectively. In FIG. 37A, the convex Fresnel lenses forming the exit surfaces of those Fresnel lens sheets 2 are omitted for simplicity.

As shown in FIG. 37A, the entrance surface 21 of the Fresnel lens sheet 2 of the prior art rear-projection screen 1 is formed by vertically arranging the horizontally elongate lenticular lenses convex toward the image generating source, and the shape of the surface of the horizontally elongate lenticular lenses has a relatively large radius of curvature, similar to a plane. As shown in FIG. 37B, the entrance surface 31 of the first lenticular lens sheet 3 of the rear-projection screen 1 in the first embodiment is formed by vertically arranging the horizontally elongate lenticular lenses convex toward the image generating source, and the shape of the surface of the horizontally elongate lenticular lenses has a relatively small radius of curvature. Therefore, the surfaces of the adjacent horizontally elongate lenticular lenses intersect each other at an acute angle. Since the horizontally elongate lenticular lenses are arranged at a very small pitch in the range of 0.08 to 0.1 mm, portions of a molding die for molding the Fresnel lens sheet 2 having such horizontally elongate lenticular lenses, corresponding to the boundaries between the adjacent horizontally elongate lenticular lenses are liable to be rounded or deformed and, consequently, the molding die is unable to mold accurately portions of the Fresnel lens sheet 2 corresponding to the boundaries between the adjacent horizontally elongate lenticular lenses.

To the contrary, as shown in FIG. 37C, the entrance surface of the horizontally elongate lens of the rear-projection screen 1 of the first embodiment is formed by alternately arranging the horizontally elongate convex lenticular lenses and the horizontally elongate concave lenticular lenses. Accordingly, the respective surfaces of the adjacent horizontally elongate convex and concave lenticular lenses do not intersect each other at an acute angle and the entrance surface of the horizontally elongate lens has a continuously varying wavy shape. Accordingly, the entrance surface of the horizontally elongate lens can be easily and accurately formed by molding.

Moreover, if the radius of curvature of the horizontally elongate lenticular lenses of the rear-projection screen 1 of the modification in the first embodiment is equal to that of the horizontally elongate lenticular lenses of the rear-projection screen 1 in the first embodiment, the vertical directional characteristics of the rear-projection screen 1 of the modification in the first embodiment is substantially equivalent to those of the rear-projection screen 1 in the first embodiment.

Figure 38:
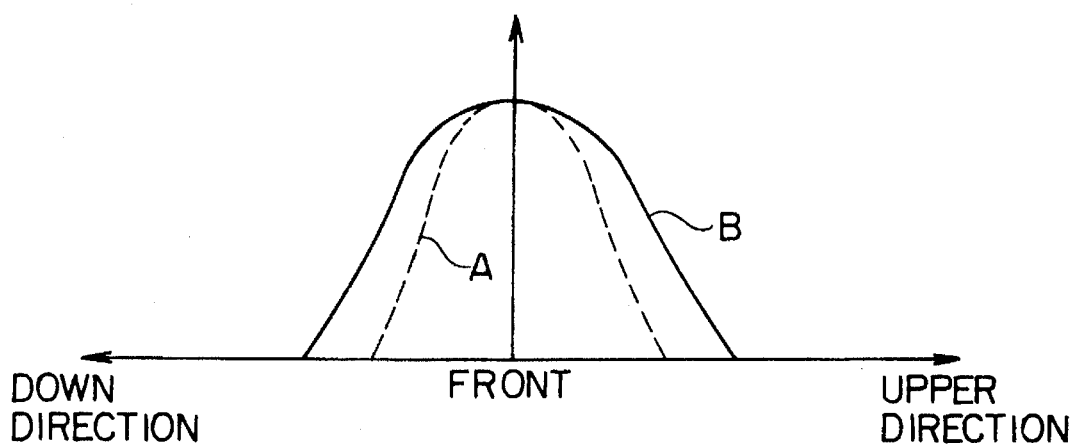
FIG. 38 is a graph showing the vertical directional characteristics of a rear-projection screen employing the horizontally elongate lenticular lens of FIG. 37.

FIG. 38 is a graph comparatively showing the respective vertical directional characteristics of the prior art rear-projection screen 1, the rear-projection screen 1 in the first embodiment and the rear-projection screen 1 in the modification of the first embodiment, in which vertical viewing angle is measured on the abscissa and relative brightness is measured on the ordinate.

In FIG. 38, a curve A represents the vertical directional characteristics of the prior art rear-projection screen employing the horizontal elongate lenticular lens of FIG. 37A, and a curve B represents the vertical directional characteristics of the rear-projection screen in the first embodiment employing the horizontal elongate lenticular lens of FIG. 37B and those of the rear-projection screen in the modification of the first embodiment, employing the horizontal lenticular lens of FIG. 37C. The curve A show such a directional characteristics that the light diffusing material is eliminated from the base sheet of the lenticular lens sheet 4'.

That is, the rear-projection screen according to the modification of the first embodiment employing the horizontally elongate lenticular lens of FIG. 37C, similarly to the rear-projection screen employing the horizontally elongate lenticular lens of FIG. 37B, has vertical directional characteristics covering a wide range of vertical viewing angle, as indicated by the curve B of FIG. 38.

In determining the pitch of the horizontally elongate lenticular lenses of the first lenticular lens sheet 3 of the modification of the first embodiment so as to reduce the degree of Moiré, the pitch must be twice the distance between the highest point of the horizontally elongate convex lenticular lens and the lowest point of the adjacent horizontally elongate concave lenticular lens.

Then, designed data about a modification of the first lenticular lens sheet 3 according to the first embodiment is shown in Table 4.

Table 4 indicates designed data about the horizontally elongate lenticular lens provided at the light entrance surface 31 of the first lenticular lens sheet 3 in a similar form to that of Table 1. It should be noted that the horizontally elongate lenticular lens at the light entrance surface 31 represents the radius of curvature, the aspherical coefficient and the effective radius in the equation (1) with regard to the concave lenticular lens having the concave directed to the image displaying source side and the convex lenticular lens having the convex directed to the image displaying source side. The light exit surface 32 is a plane.

Figure 39:
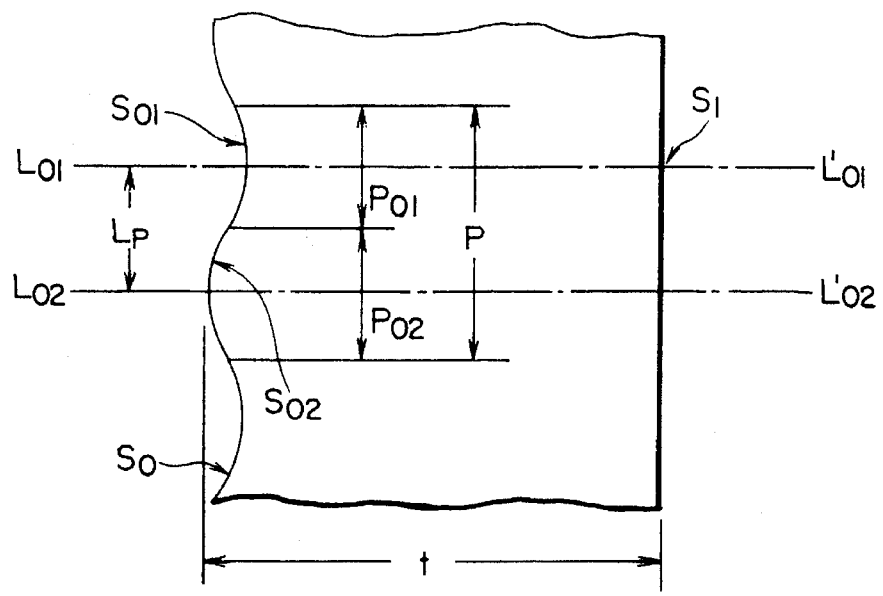
FIG. 39 is a sectional view of a horizontally elongate lenticular lens of a structure specified in Table 4.

FIG. 39 is a schematic vertical sectional view of the horizontally elongate lenticular lenses of the design data specified in Table 4. As shown in Table 4, the lens surface "$S_0$" of the entrance surface 31 is constructed of the surfaces $S_{01}$ of the horizontally elongate concave lenticular lenses and the surfaces $S_{02}$ of the horizontally elongate convex lenticular lenses. The radii of curvature for the lens surface $S_{01}$ and the lens surface $S_{02}$ are −0.065625 mm and 0.065625 mm respectively. A distance (surface interval) "t" on the optical axis from the lens surface $S_{02}$ to the lens surface 32 is equal to 0.5 mm, and an index of refraction of a medium present between these lens surfaces is 1.517.

Since the respective effective radii (P/2) of the surfaces $S_{01}$ and $S_{02}$ are 0.025, hence $0 \leq r \leq 0.025$ mm for $Z=Z(r)$ represented by the equation (1) for each of the surfaces $S_{01}$ and $S_{02}$.

Figure 40:
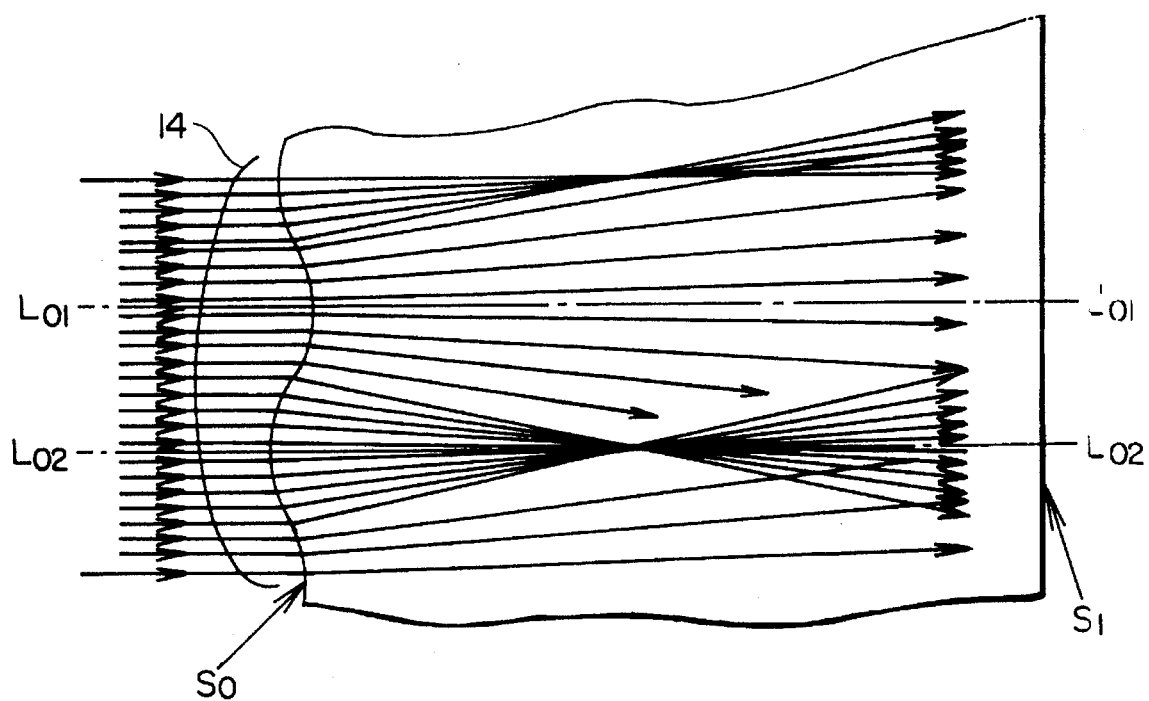
FIG. 40 is a sectional view for schematically representing light ray diffusion of a horizontally elongate lenticular lens shown in Table 4, as a design example, along the vertical direction of the screen plane.

FIG. 40 is a diagram for representing diffusion of the incident light rays 14 along the vertical screen direction in the designed sample of the horizontally, elongate lenticular lens in Table 4.

TABLE 4

| Lens surface | | Light entrance surface $S_0$ | | Light exit surface $S_1$ |
| --- | --- | --- | --- | --- |
| | | $S_{01}$ | $S_{02}$ | |
| Radius of curvature RD | | −0.065625 | 0.065625 | ∞ |
| Aspherical coefficient | CC | 5.82 | 5.82 | 0 |
| | AE | 0 | 0 | 0 |
| | AF | 0 | 0 | 0 |
| | AG | 0 | 0 | 0 |
| | AH | 0 | 0 | 0 |
| Effective radius P/2 | | 0.025 | 0.025 | — |
| Spacing t | | — | 0.5 | |
| Refractive index | | | 1.517 | |

In this embodiment, the directional characteristics along the vertical screen direction are equal to those shown in FIG. 21, similar to the designs sample of Table 1 for the first embodiment.

Although one of the horizontally elongate convex lenticular lens convex provided at the light entrance surface 31 of the first lenticular lens sheet 3 and the horizontally elongate concave lenticular lens concave toward he image generating source is the mirror image of the other as shown in FIG. 39, these horizontally elongate convex and concave lenticular lenses may be formed respectively in different shapes.

Figure 41A:
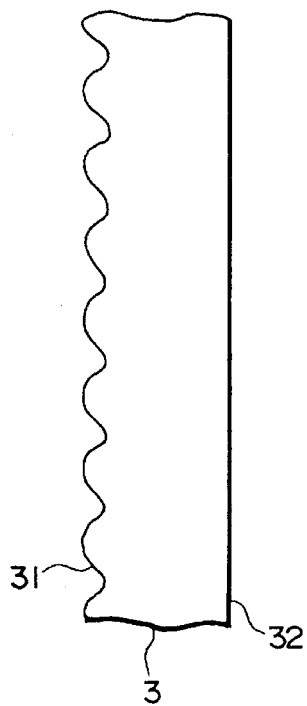
FIGS. 41A and 41B are a sectional view for representing a shape of another horizontally elongate lenticular lens according to the modification of the first embodiment.
Figure 41B:
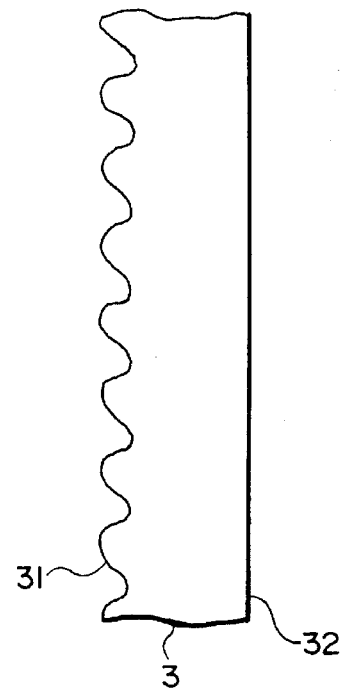

FIGS. 41A and 41B are vertical sectional views of the first lenticular lens sheet 3 in modification employed in the rear-projection screen of FIG. 35.

Convex, horizontally elongate lenticular lenses of FIG. 41A and the concave, horizontally elongate lenticular lenses of FIG. 41A differ from each other in radius of curvature. Convex, horizontally elongate lenticular lenses and the concave, horizontally elongate lenticular lenses are vertically asymmetrical in case of FIG. 41B. The vertical directional characteristics of a rear-projection screen of FIG. 41B are asymmetrical.

Table 5 shows the design data of the horizontal elongate lenticular lens shown in FIG. 41A, in the similar form to that of Table 4.

TABLE 5

| Lens surface | Light entrance surface $S_0$ | | Light exit surface $S_1$ |
|---|---|---|---|
| | $S_{01}$ | $S_{02}$ | |
| Radius of curvature RD | −0.02625 | 0.105 | ∞ |
| Aspherical CC | 5.82 | 5.82 | 0 |
| coefficient AE | 0 | 0 | 0 |
| AF | 0 | 0 | 0 |
| AG | 0 | 0 | 0 |
| AH | 0 | 0 | 0 |
| Effective radius P/2 | 0.010 | 0.040 | — |
| Spacing t | — | | 0.5 |
| Refractive index | | 1.517 | |

The first lenticular lens sheet 3 of the design data specified in Table 5 differs from the first lenticular lens sheet 3 of the design data specified in Table 4 in that the effective radius of the surface $S_{01}$ of the concave horizontally elongate lenticular lenses is smaller than that of the surface $S_{02}$ of the horizontally elongate convex lenticular lenses. The rear-projection screen employing the first lenticular lens sheet of the design data specified in Table 5 has vertical direction characteristics as shown in FIG. 21 similar to those of the rear-projection screen employing the first lenticular lens sheet of the design data specified in Table 1.

Tables 6, 7 and 8 show further designed examples of the horizontally elongate lenticular lens provided at the light entrance surface 31 of the first lenticular lens sheet 3 in a similar form to that of Table 4. In any of these designed examples, since the aspherical surface coeffients in the equation (1) are zero, these coefficients are omitted from these tables.

TABLE 6

| Lens surface | Light entrance surface $S_0$ | | Light exit surface $S_1$ |
|---|---|---|---|
| | $S_{01}$ | $S_{02}$ | |
| Radius of curvature RD | −0.028 | 0.028 | ∞ |
| Effective radius P/2 | 0.025 | 0.025 | — |
| Spacing t | — | | 0.5 |
| Refractive index | | 1.517 | |

TABLE 7

| Lens surface | Light entrance surface $S_0$ | | Light exit surface $S_1$ |
|---|---|---|---|
| | $S_{01}$ | $S_{02}$ | |
| Radius of curvature RD | −0.005 | 0.050 | ∞ |
| Effective radius P/2 | 0.001 | 0.049 | — |
| Spacing t | — | | 0.5 |
| Refractive index | | 1.517 | |

TABLE 8

| Lens surface | Light entrance surface $S_0$ | | Light exit surface $S_1$ |
|---|---|---|---|
| | $S_{01}$ | $S_{02}$ | |
| Radius of curvature RD | −0.010 | 0.050 | ∞ |
| Effective radius P/2 | 0.005 | 0.045 | — |
| Spacing t | — | | 0.5 |
| Refractive index | | 1.517 | |

Figure 42:
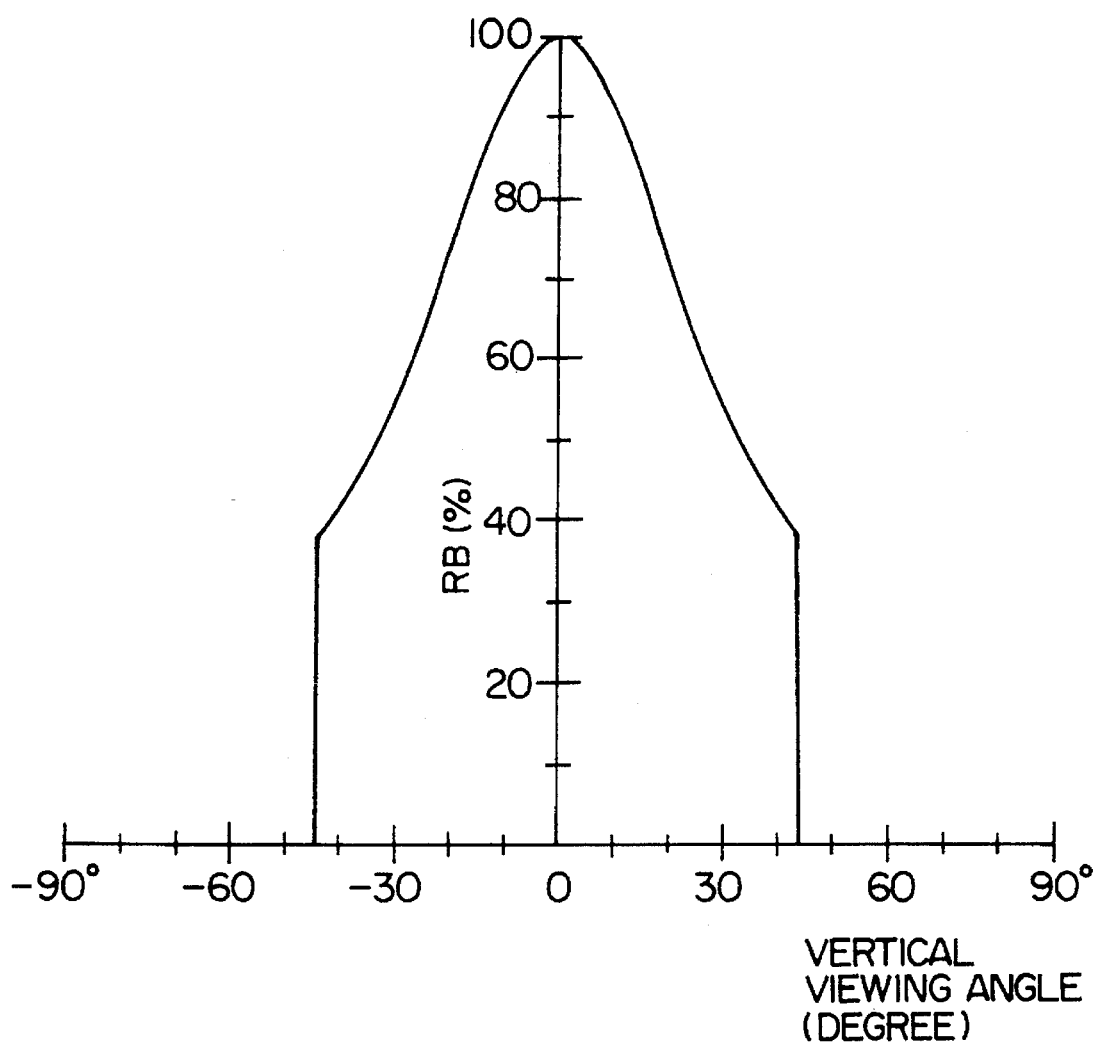
FIG. 42 is a characteristic diagram for showing directional characteristic of a horizontally elongate lenticular lens as a design example in a Table 6 along the a vertical direction of the screen plane.
Figure 43:
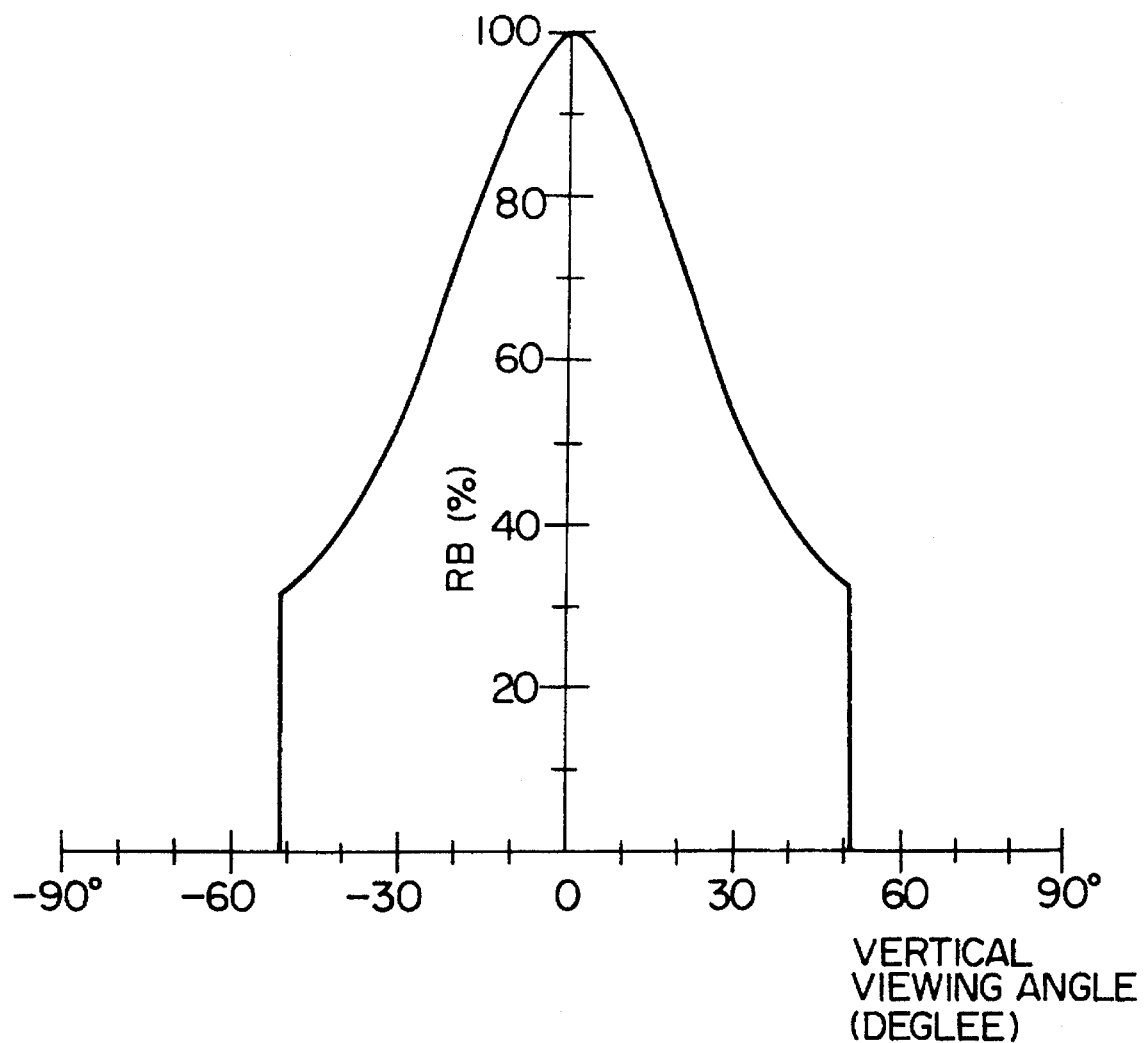
FIG. 43 is a graph showing the vertical directional characteristics of a horizontally elongate lenticular lens, as a design example, in Table 7.
Figure 44:
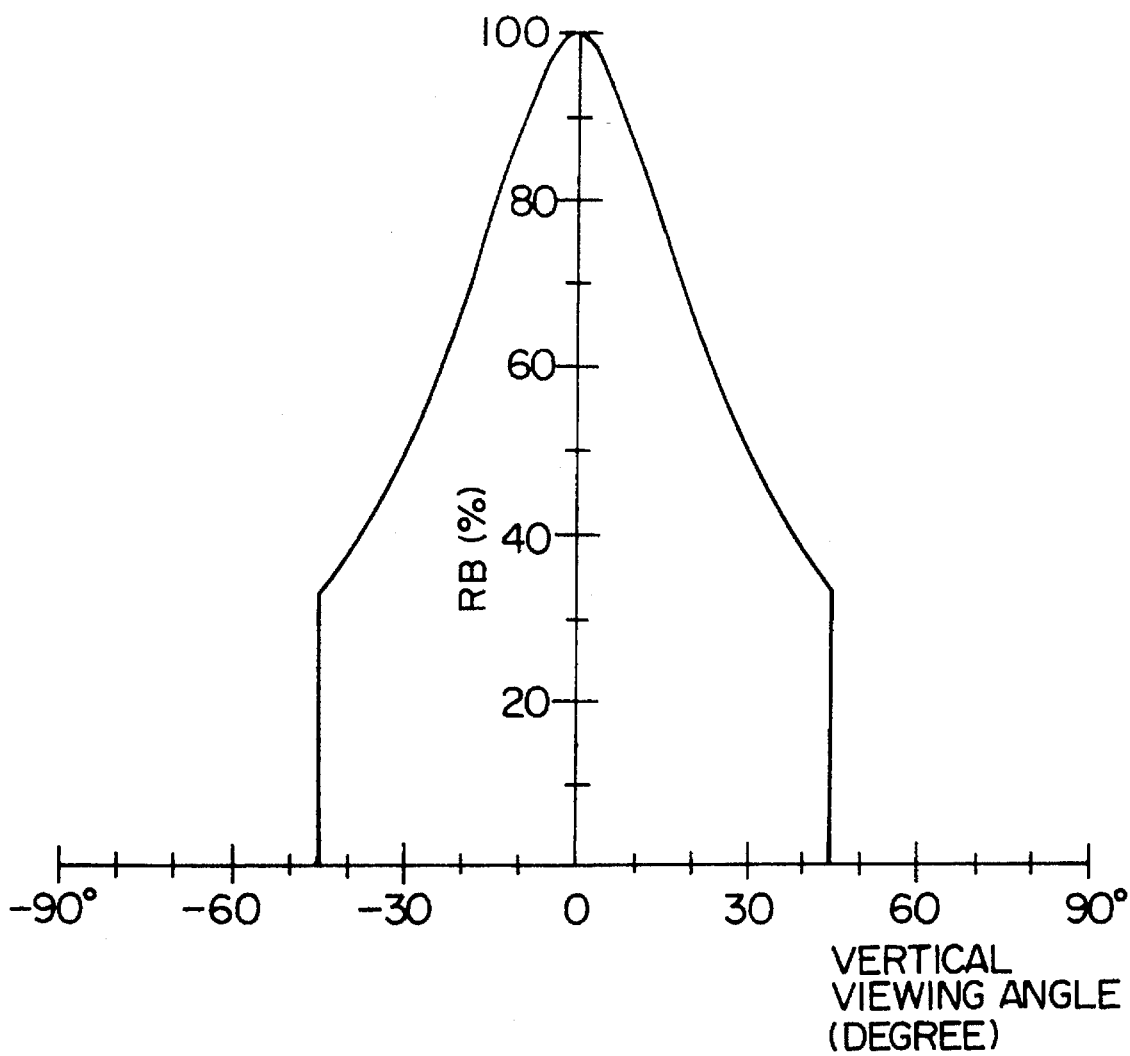
FIG. 44 is a graph showing the vertical directional characteristics of a horizontally elongate lenticular lens, as a design example, in Table 8.

FIGS. 42, 43 and 44 show vertical directional characteristics of the designed examples of the horizontally elongate lenticular lenses shown in Table 6, Table 7 and Table 8.

When these vertical directional characteristics of the designed examples are compared with those of the horizontally elongate lenticular lenses specified in Table 4, although the directional characteristics have narrower angles, there is no practical problem.

Table 9 represents a still further designed sample of the horizontally elongate lenticular lens provided at the light entrance surface 31 of the first lenticular lens sheet 3 in a similar form to that of Table 4. In this designed example, since the aspherical surface coefficients in equation (1) are zero, these coefficients are omitted from the table. In this designed example, two sorts of different lens shapes are combined as the concave lenticular lens having the concave directed to the image displaying source side and also the convex lenticular lens having the convex directed to the image displaying source side.

TABLE 9

| Lens surface | Light entrance surface $S_0$ | | | | Light exit surface $S_1$ |
|---|---|---|---|---|---|
| | $S_{01}$ | $S_{02}$ | $S_{03}$ | $S_{04}$ | |
| Radius of curvature | −0.028 | 0.028 | −0.010 | 0.050 | ∞ |
| Effective radius P/2 | 0.0125 | 0.0125 | 0.0025 | 0.0225 | — |
| Spacing t | — | — | — | | 0.5 |
| Refractive index | | | 1.517 | | |

Figure 45:
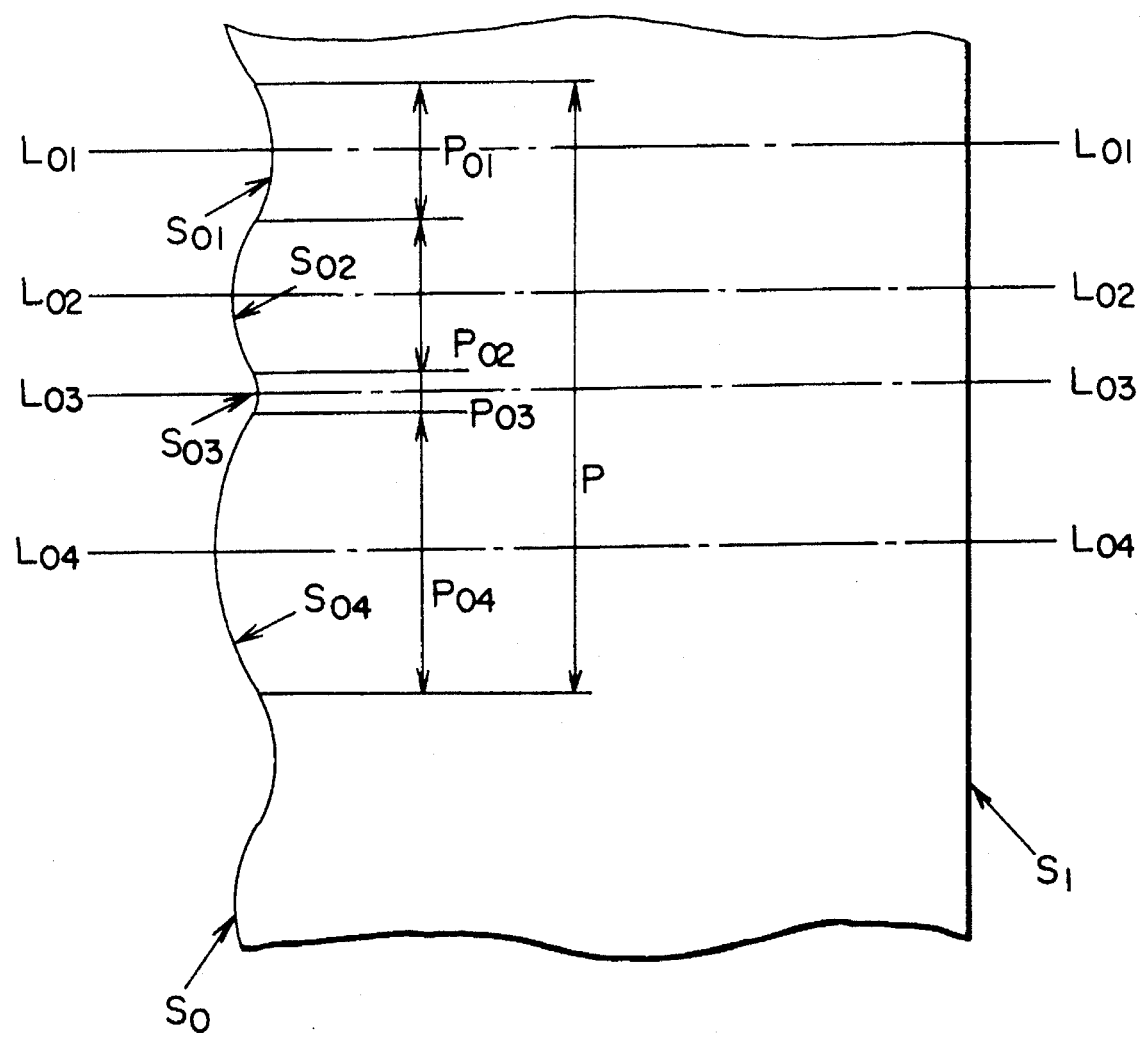
FIG. 45 is a sectional view for showing a shape of a horizontally elongate lenticular lens, as a design example, in Table 9.

FIG. 45 is a sectional view for schematically showing a designed example of the horizontally elongate lenticular lens defined in Table 9.

Figure 46:
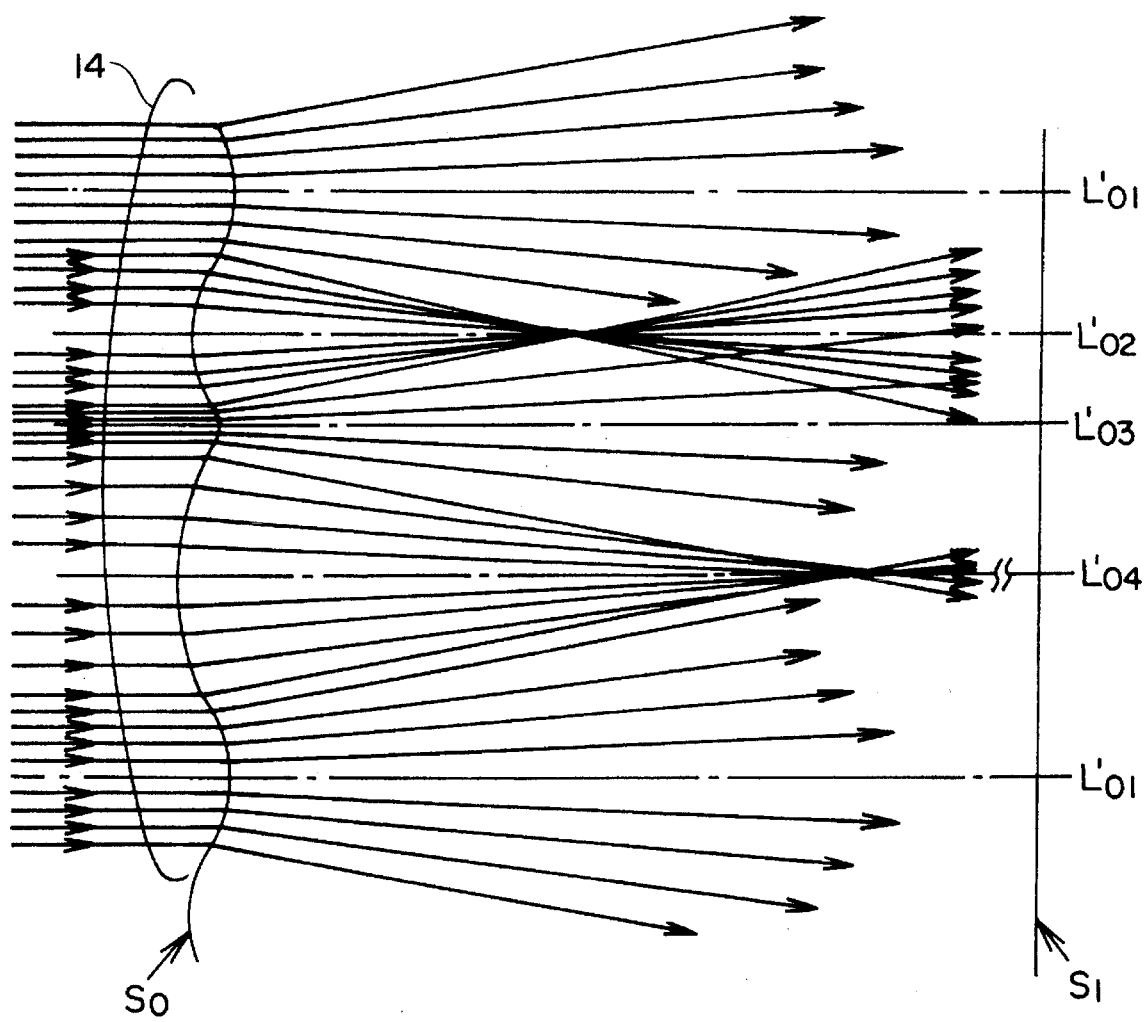
FIG. 46 is a sectional view for schematically representing light ray diffusion of a horizontally elongate lenticular lens, as a design example, in Table 9 along the vertical direction of the screen plane.

FIG. 46 is a diagram for representing diffusion of the incident light rays 14 along the vertical screen direction in the designed example of the horizontally elongate lenticular lens defined in Table 9.

Also in this designed example, vertical directional characteristics similar to those of the design example of the horizontally elongate lenticular lens defined in Table 4 can be obtained.

Table 10 represents a further designed example of the horizontally elongate lenticular lens provided at the light entrance surface 31 of the first lenticular lens sheet 3 in a similar form to that of Table 1. In the designed example of Table 10, since it is expressed by a single equation in the equation (1) under such a condition that the convex lenticular lens surfaces with the convex directed to the image displaying source side are continued with the concave lenticular lens surfaces with the concave directed to the image displaying source side, a radius of curvature and an aspherical surface coefficient and the like with respect to the light entrance surface $S_0$ are wholly displayed.

TABLE 10

| Lens surface | | Light entrance surface $S_0$ | Light exit surface $S_1$ |
|---|---|---|---|
| Radius of curvature RD | | 0.048516 | ∞ |
| Aspherical coefficient | CC | −0.2487 | 0 |
| | AE | 2747.72 | 0 |
| | AF | −86764.6 | 0 |
| | AG | $-2.24694 \times 10^8$ | 0 |
| | AH | $-1.07607 \times 10^{11}$ | 0 |
| Effective radius P/2 | | 0.05 | — |
| Spacing t | | 0.5 | |
| Refractive index | | 1.517 | |

Figure 47:
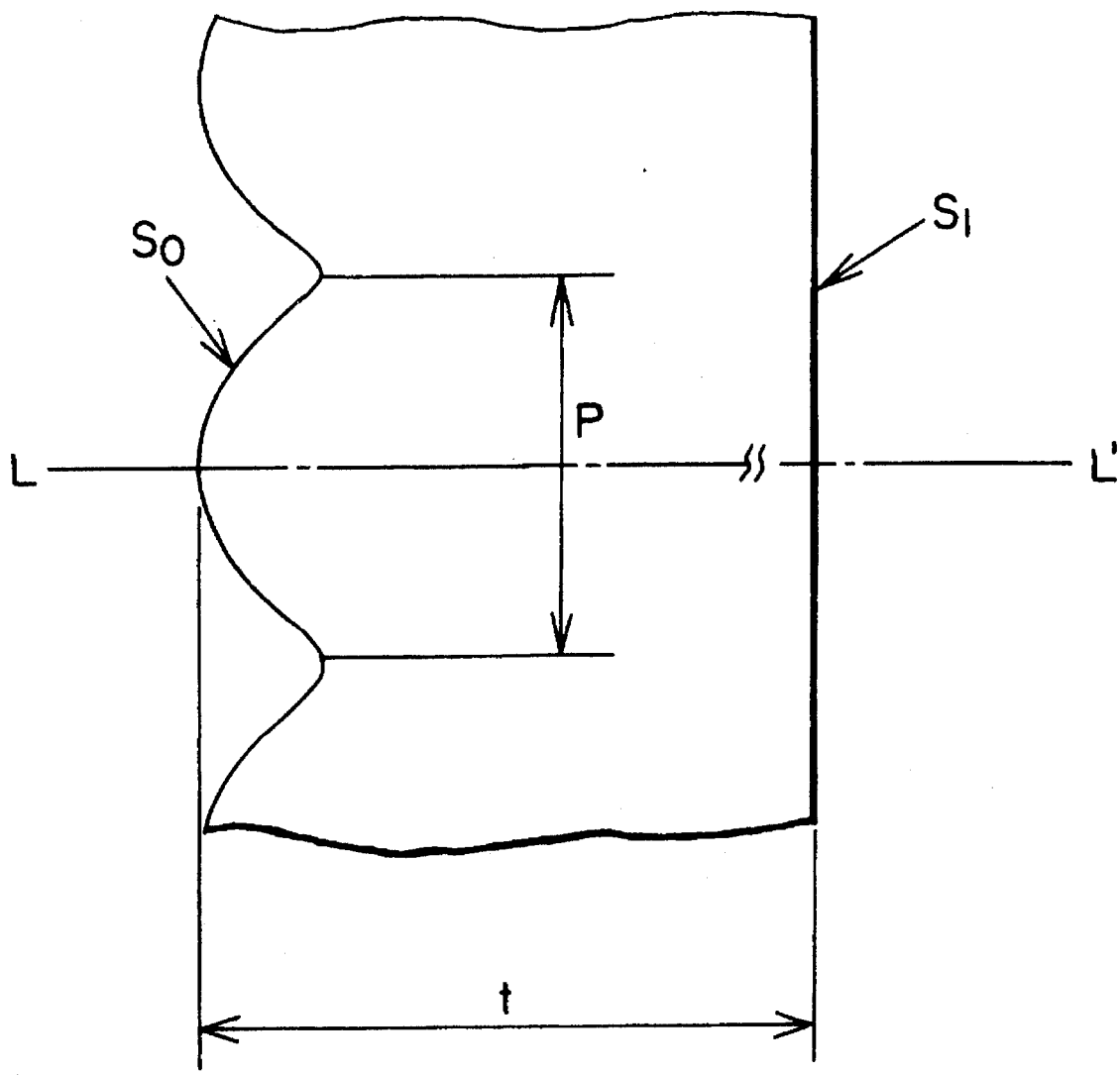
FIG. 47 is a sectional view for showing a shape of a horizontally alongate lenticular lens, as a design example, in Table 10.

FIG. 47 is a sectional view for schematically showing a shape of the horizontally elongate lenticular lens as specified in Table 10.

Figure 48:
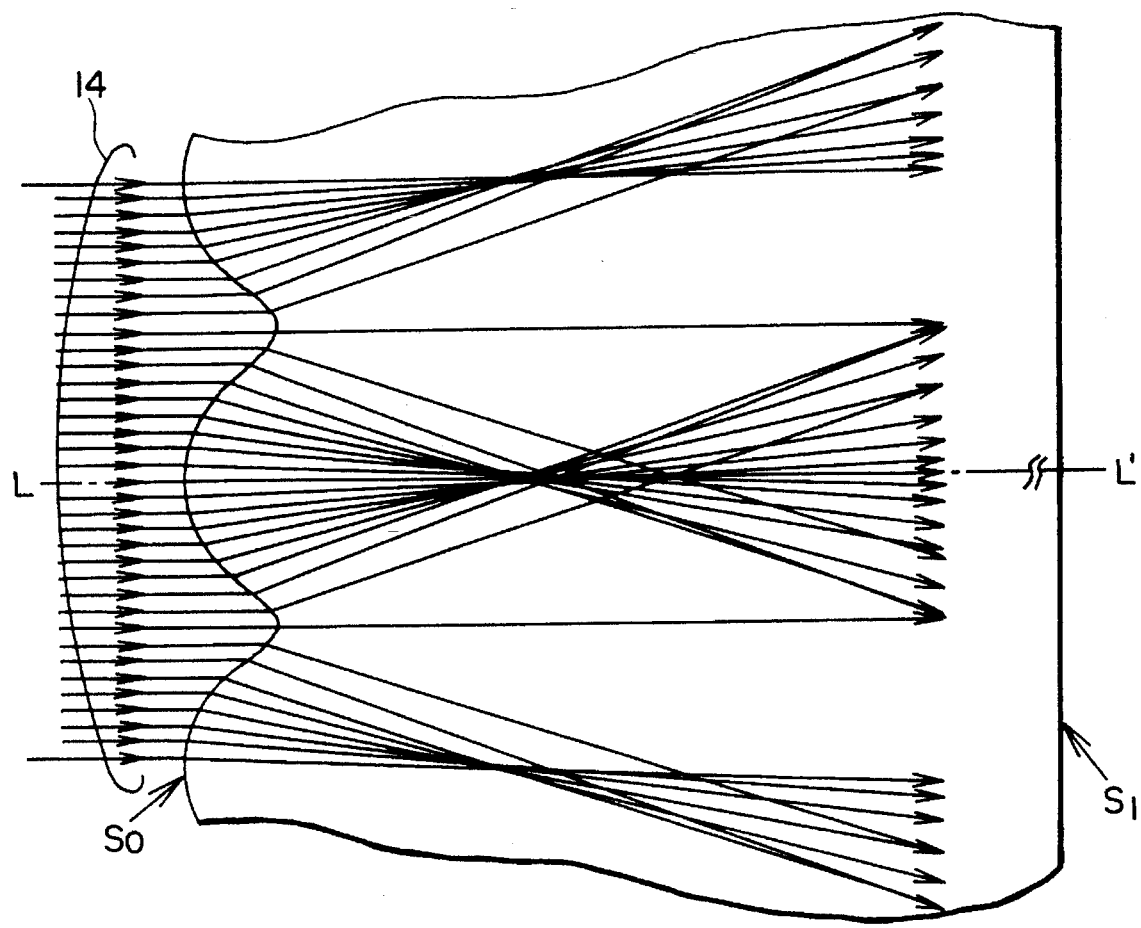
FIG. 48 is a sectional view for graphically representing light ray diffusion of a horizontally elongate lenticular lens, as a design example, in the Table 10 along the vertical direction of the screen plane.

FIG. 48 is a diagram for showing diffusion of the incident light rays 14 along the vertical screen direction in the designed example of the horizontally elongate lenticular lens specified in Table 10.

Also, in this designed example, a similar directional characteristic along the vertical screen direction to that of the designed example of the horizontally elongate lenticular lens in Table 4 can be achieved.

As is apparent from the foregoing description, the rear-projection screen in the modification of the rear-projection screen in the first embodiment has improved focusing characteristics and enhanced vertical directional characteristics, and is capable of displaying an image in high brightness and high contrast and of being easily formed by molding.

A rear-projection screen in a second embodiment according to the present invention will be described hereinafter with reference to FIG. 49.

Figure 49:
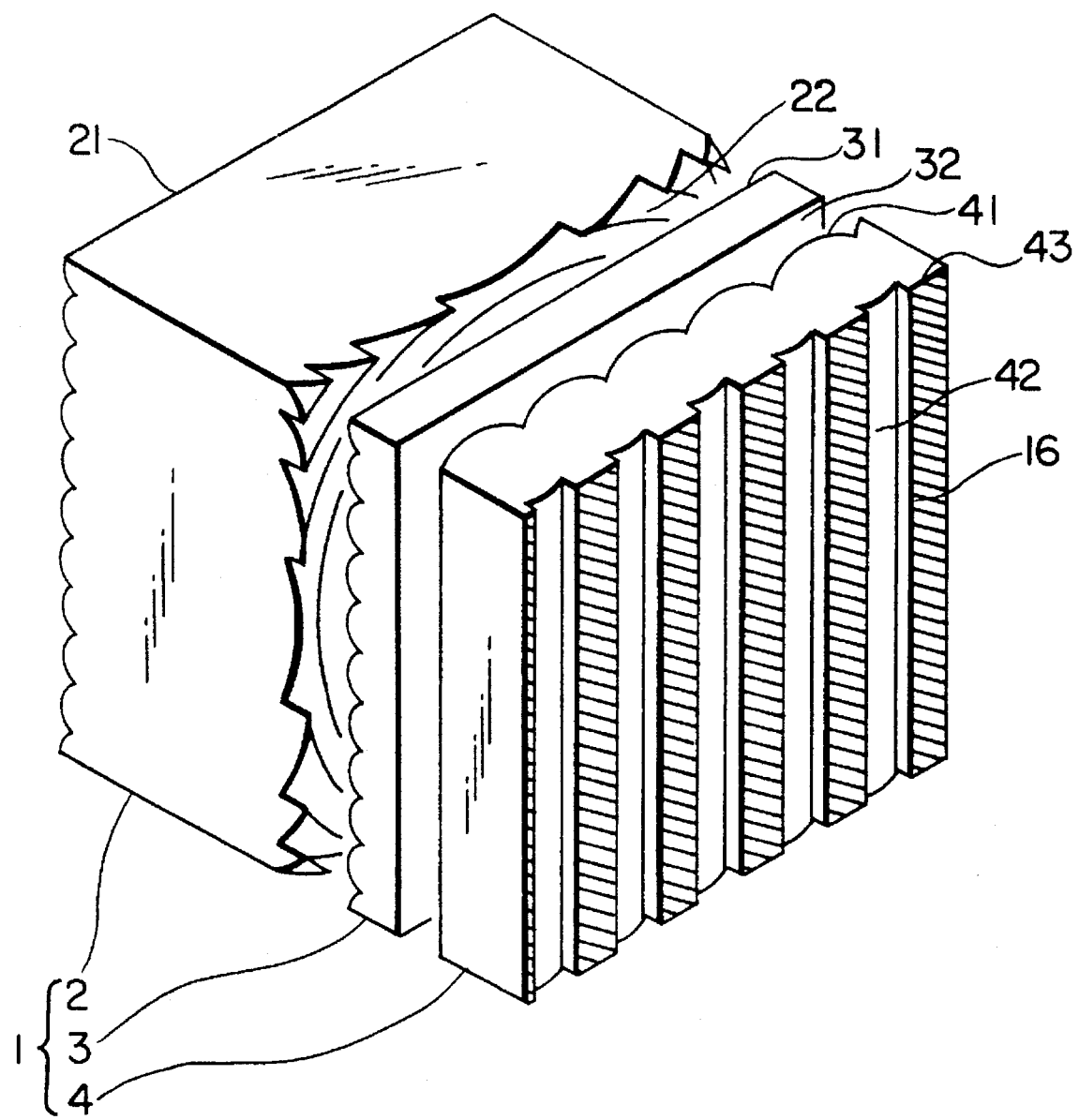
FIG. 49 is a perspective view for representing a major portion of a rear projection screen according to a second embodiment of the present invention.

FIG. 49 is a perspective view of an essential portion of the rear-projection screen as the second embodiment, in which parts like or corresponding to those of the rear-projection screen of FIG. 13 are denoted by the same reference characters and the description thereof will be omitted.

A difference between the second embodiment and the first embodiment shown in FIG. 13 is as follows: In the first embodiment as shown in FIG. 13, the shape of the light entrance surface 31 of the first lenticular lens sheet 3 is formed in such a manner that a plurality of horizontally elongate lenticular lenses having the longitudinal direction corresponding to the horizontal screen direction are arranged along the vertical screen direction. To the contrary, in this second embodiment, as indicated in FIG. 49, a shape of the first lenticular lens sheet 3 and also a shape of the light entrance surface 21 of the Fresnel lens sheet 2 are so constructed that a plurality of horizontally elongate lenticular lenses having the longitudinal direction corresponding to the horizontal screen direction are arranged along the vertical screen direction.

In this second embodiment, light ray diffusion along the vertical screen direction is mainly performed by way of the horizontally elongate lenticular lens of the first lenticular lens sheet 3, and auxiliary light ray diffusion is performed by the horizontally elongate lenticular lens of the Fresnel lens sheet 2. No light diffusing material is contained in both of the first lenticular lens sheet 3 and the second lenticular lens sheet 4.

At this time, the focusing characteristics of the image are slightly lowered, as compared with that of the first embodiment. However, when comparing with the focusing characteristic of the conventional rear-projection screen, better focusing characteristics can be achieved in the second embodiment, since the thickness of the first lenticular lens sheet 3 is made thinner, and no light diffusing material 15 is contained in the base sheets of the first and second lenticular lens sheets 3 and 4.

Both of the contrast and the brightness of the image are similar to those of the first embodiment.

As a result, also in this second embodiment, there are various advantages that the focusing characteristics of the image, the brightness and the contrast characteristics can be simultaneously improved, and further the directional characteristics in the vertical screen direction can be enhanced.

Then, a third embodiment of the present invention will now be explained with reference to FIG. 50.

Figure 50:
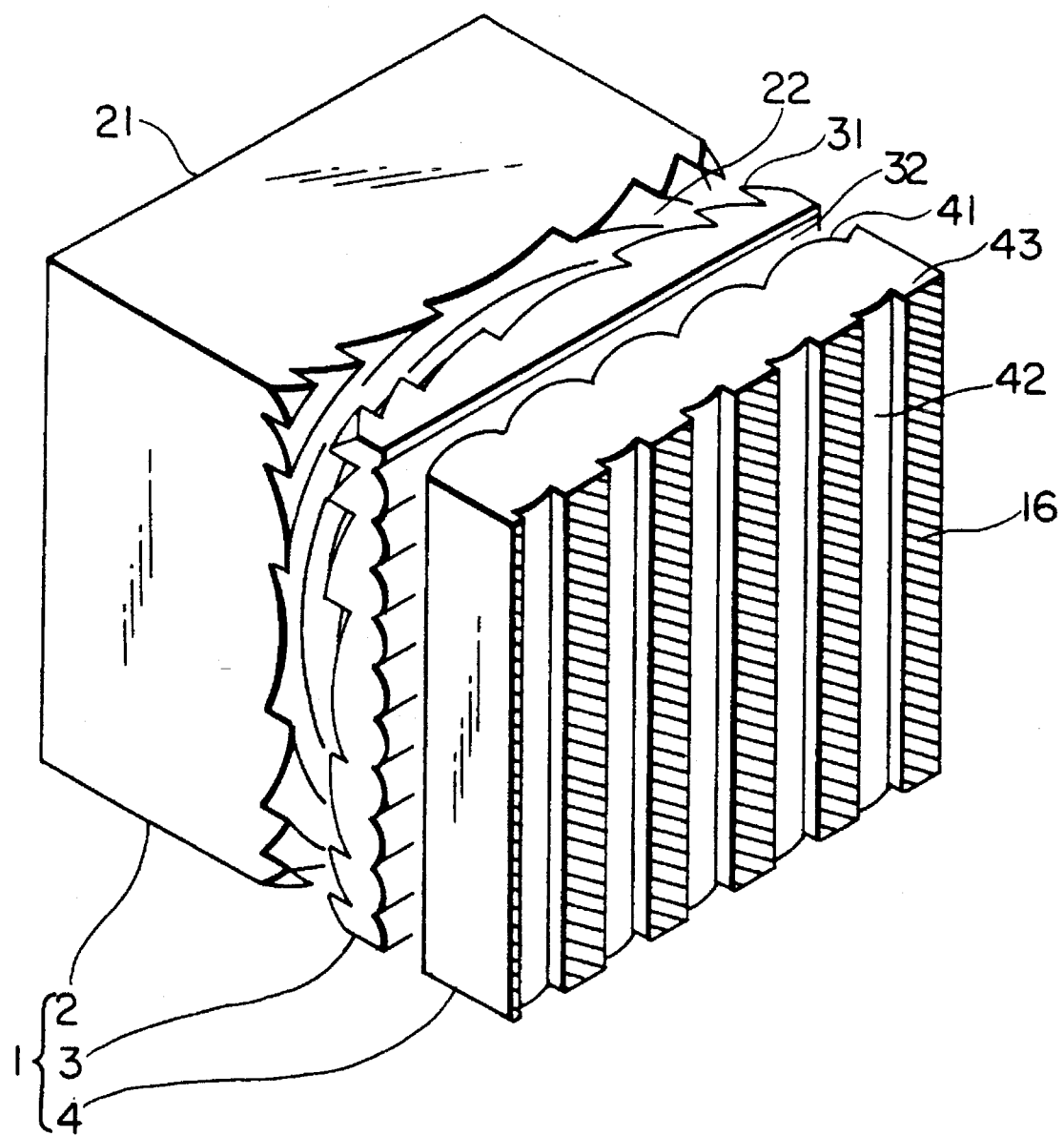
FIG. 50 is a perspective view for representing a major portion of a rear projection screen according to a third embodiment of the present invention.

FIG. 50 is a perspective view for showing a major portion of a rear-projection screen according to the third embodiment of the present invention, in which the same reference numerals as those of FIG. 13 will be employed to denote the same elements in this embodiment. Explanations of the same elements are omitted.

A difference between this third embodiment and the first embodiment shown in FIG. 13 is as follows: In the first embodiment, as shown in FIG. 13, the shape of the first lenticular lens sheet 3 is formed in such a manner that a plurality of horizontally elongate lenticular lenses whose light entrance surface 31 is directed to the horizontal screen direction are arranged along the vertical screen direction. To the contrary, according to the third embodiment, as indicated in FIG. 50, a shape of the light entrance surface 31 is made of convex Fresnel lens shape, whereas the light exit surface 32 is so formed that a plurality of horizontally elongate lenticular lenses having the longitudinal direction corresponding to the horizontal screen direction are arranged along the vertical screen direction.

In this third embodiment, it is so arranged that light ray diffusion along the vertical screen direction is carried out by the horizontally elongate lenticular lens of the first lenticular lens sheet 3. Also, no light diffusing material 15 is contained in the base sheets of the first lenticular lens sheet 3 and the second lenticular lens sheet 4.

Also in accordance with the third embodiment, there are similar advantages to those of the first embodiment that the focusing characteristic of the image, the brightness and the contrast can be improved, and at the same time, the directional characteristics of the vertical screen direction can be enhanced.

In this third embodiment, such a function that the light rays of the red, green and blue projection image light incident upon the entire entrance surface 21 of the Fresnel lens sheet 2 are collimated to obtain substantially parallel color light rays, and these color light rays are entered into the first lenticular lens sheet 3, is shared by the convex Fresnel lens provided at the light exit surface 22 of the Fresnel lens sheet 2 and the convex Fresnel lens provided at the light entrance surface 31 of the first lenticular lens sheet 3. At this time, since the focal distances of the respective convex Fresnel lenses may be set to be longer than the focal distance of the convex Fresnel lens employed in the first embodiment, an inclination of a lens surface of the convex Fresnel lens at the peripheral screen portion does not become large. As a consequence, a reflection loss of the projection image light rays at the peripheral screen portion becomes low and therefore brightness of the image at the peripheral screen portion can be improved.

It should be noted that the shape of the light entrance surface 21 of the Fresnel lens sheet 2 of the rear-projection screen according to the first embodiment shown in FIG. 13 may be made of a shape of a convex Fresnel lens, instead of forming the shape of the light entrance surface 31 for the first lenticular lens sheet 3 as the convex Fresnel lens shape. There is a similar merit to that of the third embodiment when such a modification is formed.

Although any of the Fresnel lens sheet 2, first lenticular lens sheet 3 and second lenticular lens sheet 4 are made transparent in the first to third embodiments, the second lenticular lens may be made semitransparent.

In this case, since projection image light rays passing from the image generating source side to the image obserbing side travel only once through the second lenticular lens sheet 4, a light amount is attenuated in proportion to transmittance of the second lenticular lens sheet 4. In contrast, when externally supplied light rays such as illumination light are reflected at the rear-projection screen and then travel to the image observing side, the light rays except for the light ray reflected at the light exit surface 42 corresponding to the surface of the second lenticular lens sheet 4 positioned nearest the image observing side, pass through the second lenticular lens sheet 4 at least one reciprocation. As a result, a light amount is lowered in proportion to a squared value of the transmittance of the second lenticular lens sheet 4. Thus, the externally supplied light rays are absorbed at a higher degree than that of the projection image light rays, so that a ratio of the lost light rays to the effective light rays becomes large, and contrast in case that there is the illumination light can be increased.

Furthermore, any surface of these Fresnel lens sheet 2, first lenticular lens sheet 3, and second lenticular lens sheet 4 may be coated with a reflection preventing film in the first to third embodiments. In such a film coating case, contrast of an image itself may be improved.

Figure 51:
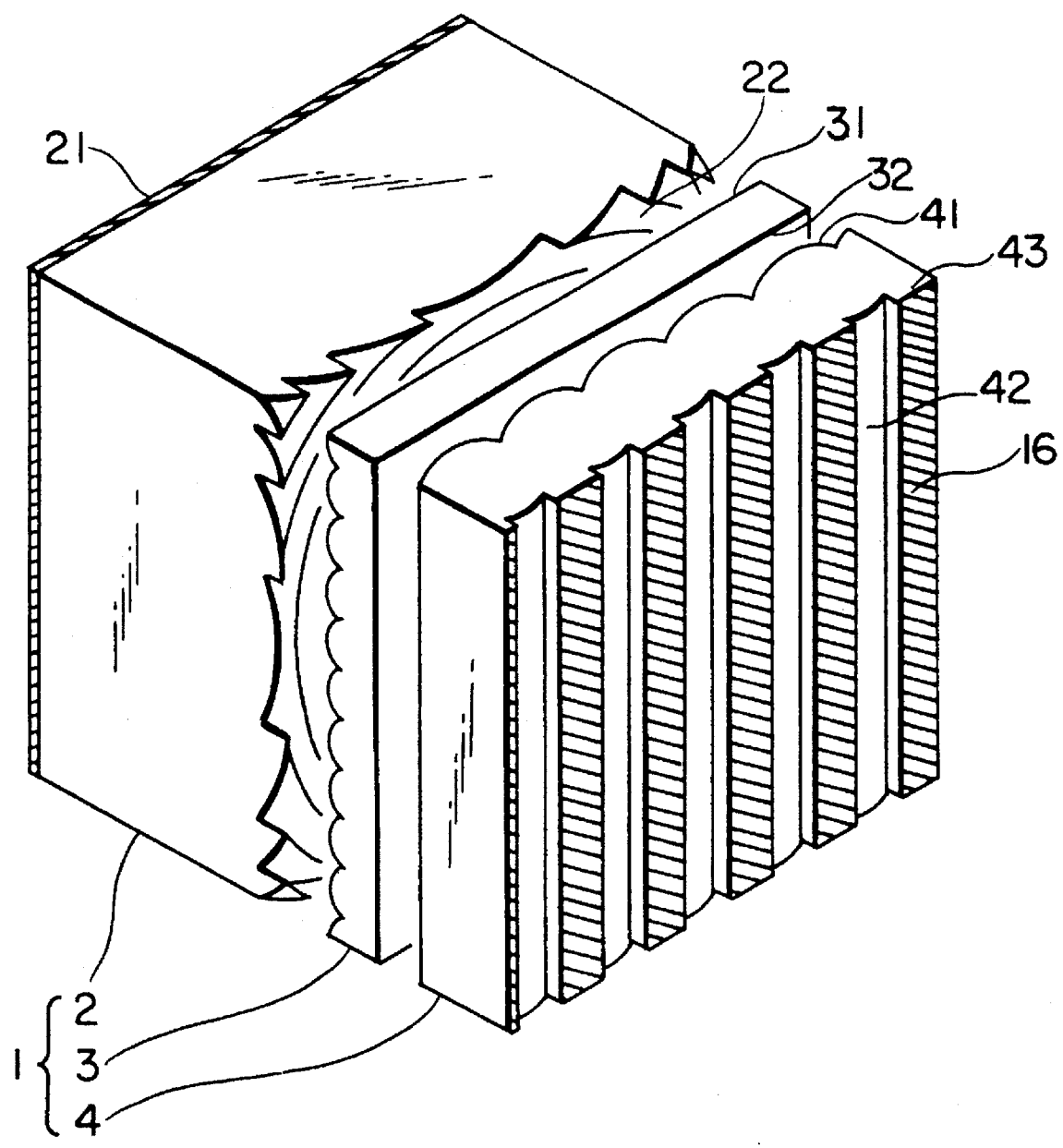
FIG. 51 is a perspective view for representing a major portion of a rear-projection screen according to an application example of the first embodiment of the present invention.
Figure 52:
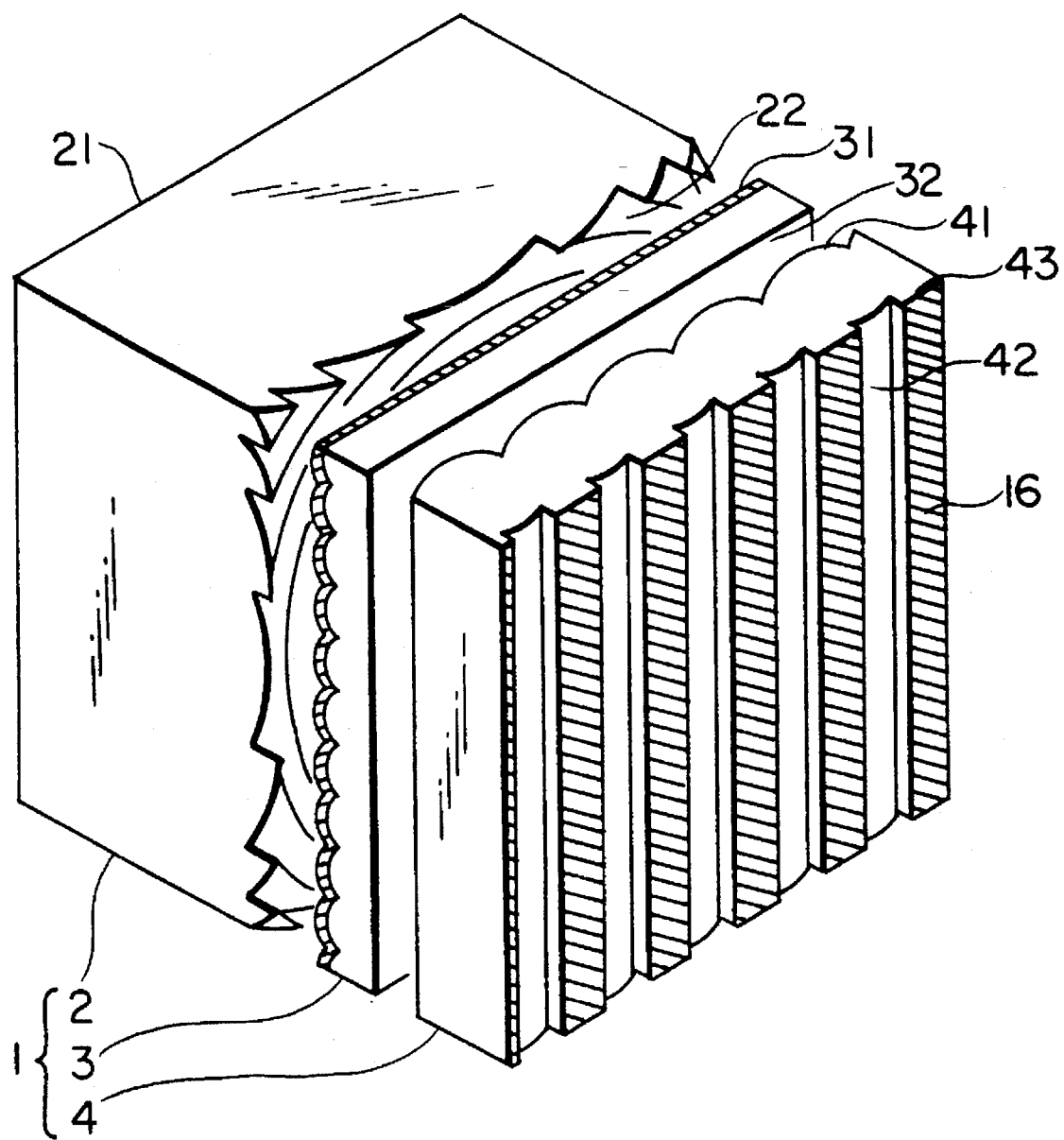
FIG. 52 is a perspective view for representing a major portion of a rear-projection screen according to an application example of the first embodiment of the present invention.
Figure 53:
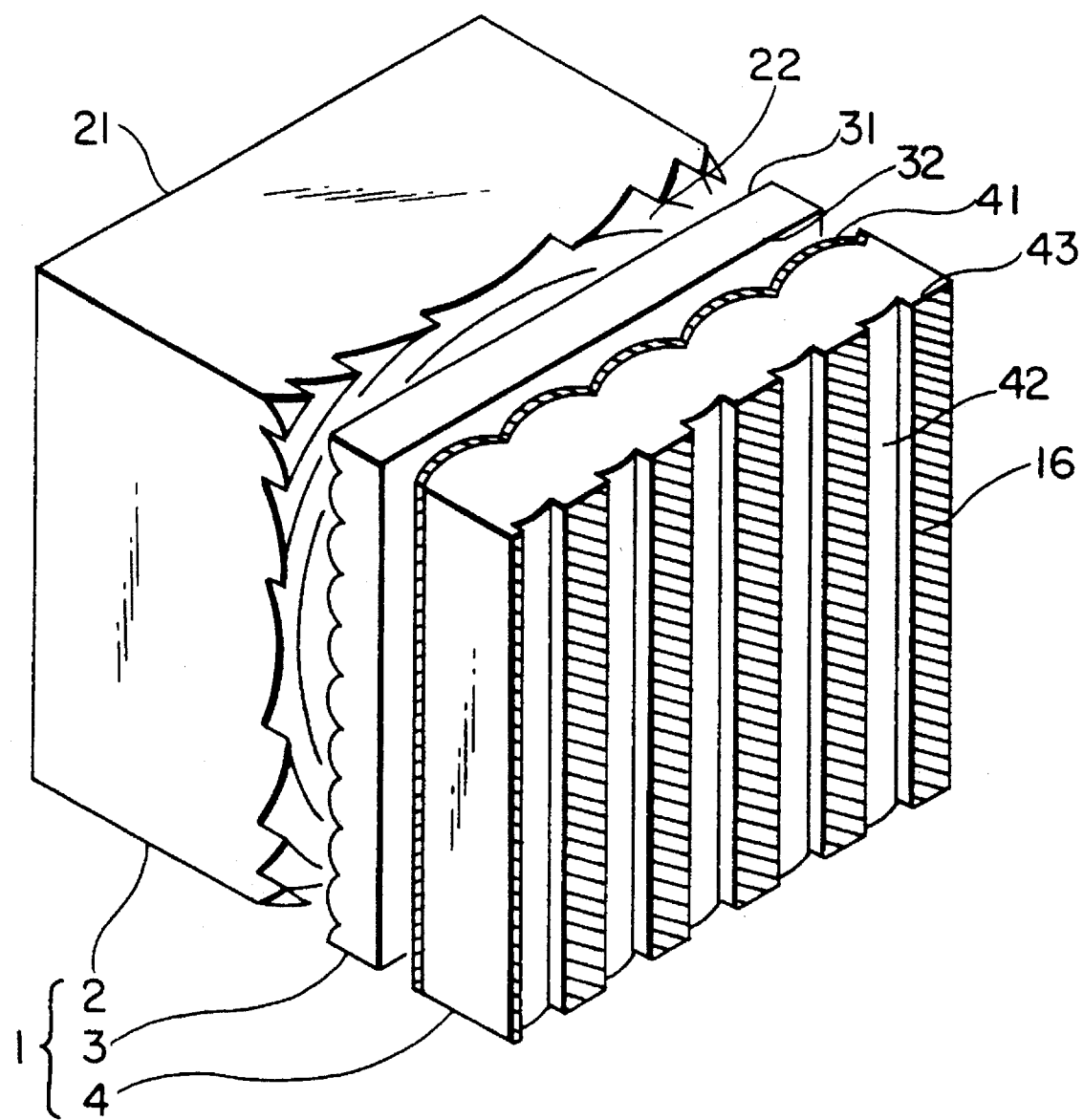
FIG. 53 is a perspective view for showing a major portion of a rear-projection screen according to another application example of the first embodiment of the present invention.

Referring now to FIGS. 51 to 53, rear-projection screens where reflection preventing films are employed will be described as an application example of the above-described embodiment.

FIGS. 51, 52 and 53 are perspective views for showing major portions of rear-projection screens functioning as the application example of the first embodiment.

In the application example of FIG. 51, a reflection preventing film is provided on the light entrance surface 21 of the Fresnel lens sheet 2 arranged nearest the image generating source side. As a result, the stray light appearing inside the set can be reduced and contrast of the image can be improved.

In another application example of FIG. 52, a reflection preventing film is formed on the light entrance surface 31 of the first lenticular lens sheet 3. With such a film coating operation, the stray light caused by multiple reflections between the Fresnel lens sheet 2 and the first lenticular lens sheet 3 can be reduced and thus, contrast of the resultant image can be considerably increased.

In a further application example of FIG. 53, a reflection preventing film is formed on the light entrance surface 41 of the second lenticular lens sheet 4 located nearest the image observing side. With such a reflection preventing film, the stray light caused by multiple reflection between the first lenticular lens sheet 3 and the second lenticular lens sheet 4 can be reduced, and therefore contrast of the resultant image can be greatly improved.

As a concrete method for forming the reflection preventing films on the respective surfaces of the rear-projection screen, there is such a method that, for example, an amorphous fluorine resin manufactured by ASAHI GLASS WORKS as a trandename "Cytop" is melted into perfluoro solvent having a specific density, and then this solution is coated on the surfaces of the screen by way of the spin coat or the dip coat in order to obtain a film having a desirable thickness. As an example., an index of refraction with respect to a D line (wavelength of 589 nm) of this "Cytop" becomes 1.34. This reflection preventing film with better performance than that of the conventional reflection preventing film can be obtained.

Furthermore, with respect to the second lenticular lens sheet 4, any of a nonglaring process, an anticharging process, and a surface hardening process such as a hard coating process may be performed on the surface of the light exit surface 42 at the image observing side. There are two typical methods as the nonglaring process, namely a method for forming fine concave and convex shapes over the entire surface, and a method for forming the above-described optical reflection preventing film on the surface. If these antiglaring processes are performed, there is a merit that the reflection of the ambient images and of the ambient light on the exist surface 42 is reduced. Also, when the anticharging process is executed, there is another merit to prevent dust from being attached to the charged surfaces of the second lenticular lens sheet 4. When the surface hardening process is carried out, there is an advantage that even when any object collides with the hardened surface from the image observing side, the hardened surface of the second lenticular lens sheet 4 is not easily scratched.

A fourth embodiment of the present invention will now be explained with reference to FIG. 54.

Figure 54:
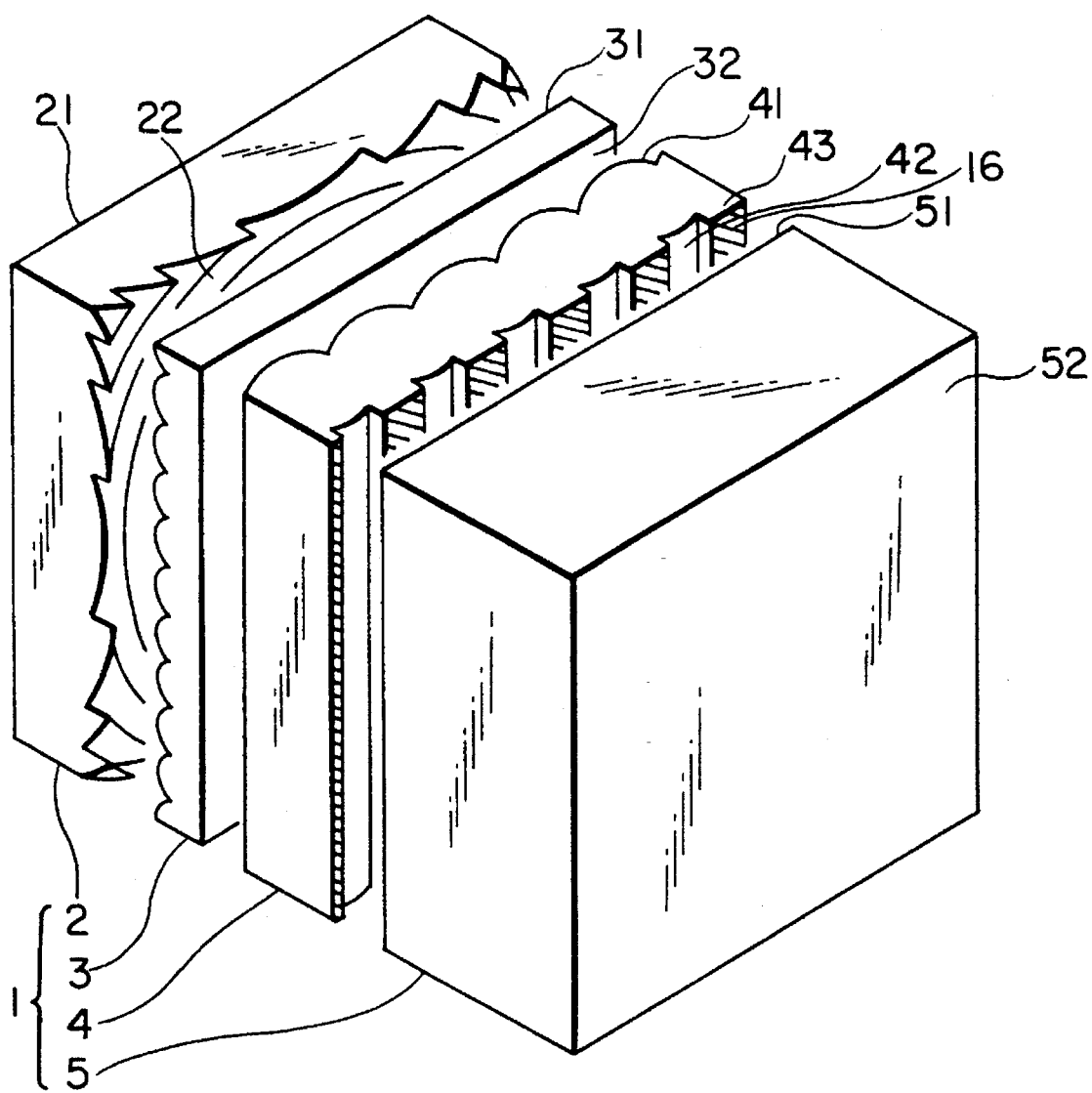
FIG. 54 is a perspective view for showing a major portion of a rear-projection screen according to a fourth embodiment of the present invention.

FIG. 54 is a perspective view for showing a major portion of a rear-projection screen according to the fourth embodiment of the present invention.

In FIG. 54, reference numeral 5 indicates a light absorbing sheet, and edge portions (not shown in detail) of the Fresnel lens sheet 2, the first lenticular lens sheet 3, the second lenticular lens sheet 4 and this light absorbing sheet 5 are mutually fixed with each other. A base sheet of the light absorbing sheet 5 is made of either a semitransparent thermoplastic resin material, or a semitransparent colored glass plate. This light absorbing sheet 5 has a light entrance surface 51 and a light exit surface 52, which are planes in this embodiment. The same reference numerals shown in FIG. 13 are employed as those for denoting the same elements in this fourth embodiment and no explanations thereof are made.

A difference between the fourth embodiment and the first embodiment shown in FIG. 13 is to newly employ the light absorbing sheet 5 as the constructive element.

In this fourth embodiment, the base sheet of the light absorbing sheet 5 is made of a semitransparent thermoplastic resin material, and has a function capable of absorbing a large quantity of externally supplied light rays rather than the projection image light rays.

In other words, since the projection image light rays emitted from the image generating source side to the image observing side are transmitted to the light absorbing sheet 5 only one time, a light amount thereof is lowered in proportion to the transmittance of the light absorbing sheet 5. To the contrary, when the externally supplied light rays such as illumination light are reflected at the rear-projection screen 1 and reached at the image observing side, since the externally supplied light rays except for the rays reflected at the light exit surface 52 of the light absorbing sheet 5 positioned nearest the image observing side, pass through the light absorbing sheet 5 at least 1 reciprocation, a light amount thereof is reduced in proportion to a squared value of transmittance of the light absorbing sheet 5. As a consequence, contrast of an image when such an externally supplied light ray as the illumination light is present can be improved.

Also in this fourth embodiment, the light diffusion along the vertical screen direction is carried out by the horizontally elongate lenticular lenses of the first lenticular lens sheet 3. No light diffusing material 15 is contained in the first lenticular lens sheet 3, the second lenticular lens sheet 4 and the light absorbing sheet 5.

As a result, also in this fourth embodiment, the focusing characteristics of the image, brightness and contrast thereof can be improved, which is similar to those of the first embodiment, and furthermore the directional characteristics along the vertical screen direction can be enhanced.

On the other hand, also in this fourth embodiment, there is a limitation in the sheet thickness of the second lenticular lens sheet 4, which is similar to the first, second and third embodiments, because it is so designed to converge the incident light rays 14 in such a manner that the incident light rays 14 pass through the second vertically elongate lenticular lens provided at the light exit surface 42 by way of the first vertically elongate lenticular lense provided at the light entrance surface 41 of the second lenticular lens sheet 4.

This is similar to that of the lenticular lens sheet 4' of the conventional rear-projection screen as shown in FIG. 1. Consequently, to maintain mechanical strength of the overall rear-projection screen 1 in the conventional rear-projection screen, the thickness of the Fresnel lens sheet 2 is made thicker than that of the lenticular lens sheet 4', generally speaking.

To the contrary, according to the present embodiment, as shown in FIG. 54, the thickness of the Fresnel lens sheet 2 is made thinner than that of the Fresnel lens sheet employed in the conventional rear-projection screen and therefore is made substantially equal to the thickness of the second lenticular lens sheet 4. Furthermore, the sheet thickness of the light absorbing sheet 5 is made the thickest, so that mechanical strength of the overall rear-projection screen 1 becomes higher than that of the first embodiment shown in FIG. 13.

A fifth embodiment of the present invention will now be explained with reference to FIG. 55.

Figure 55:
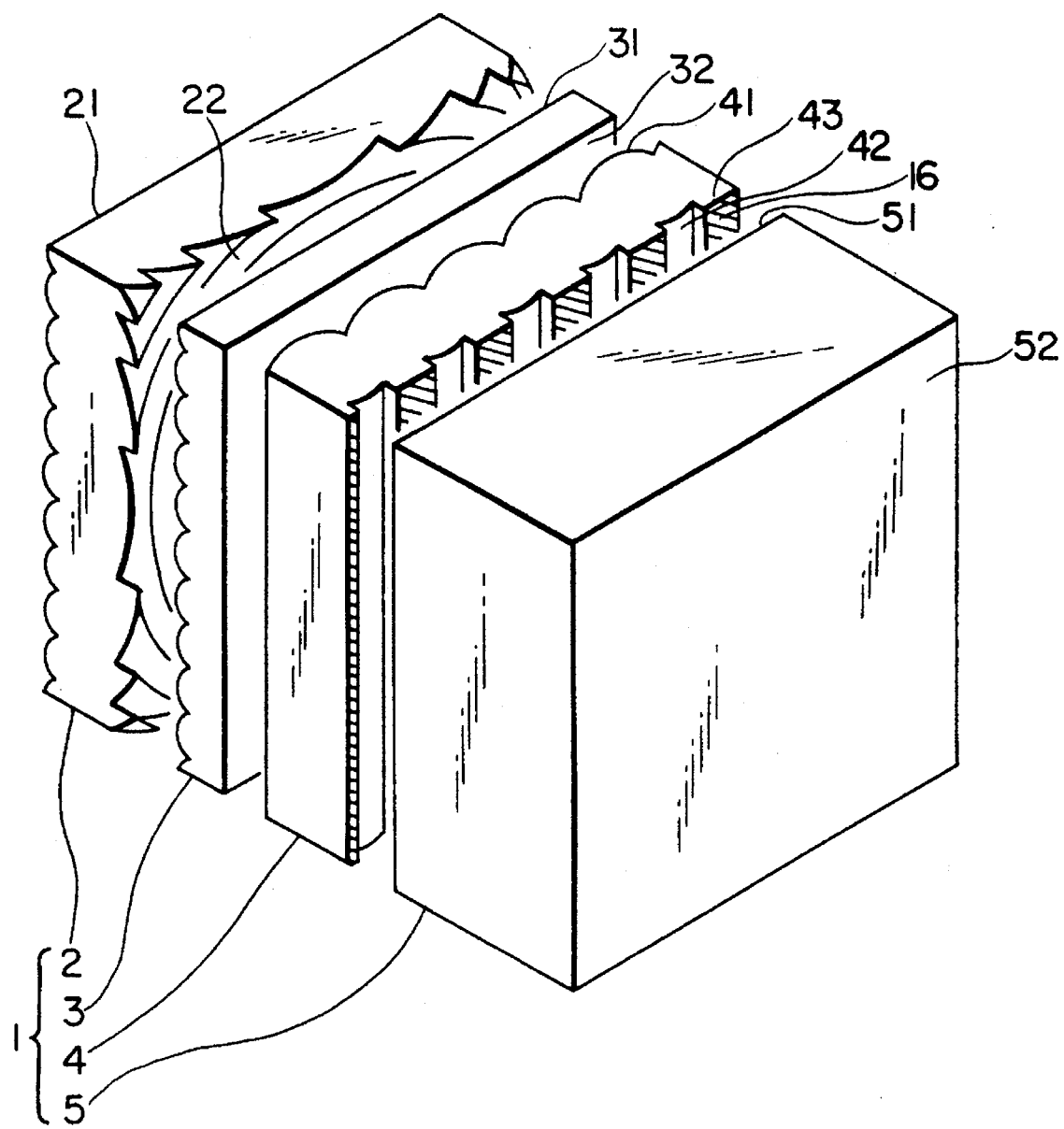
FIG. 55 is a perspective view for showing a major portion of a rear-projection screen according to a fifth embodiment of the present invention.

FIG. 55 is a perspective view for representing a major portion of a rear-projection screen according to a fifth embodiment of the present invention, in which the same reference numerals shown in FIG. 54 are employed as those for denoting the same or similar elements, and no explanations thereof are made.

A difference between this embodiment and the fourth embodiment shown in FIG. 54 is as follows. That is, in the fourth embodiment, as shown in FIG. 54, the shape of the light entrance surface 31 of the first lenticular lens sheet 3 is so formed that a plurality of horizontally elongate lenticular lenses having the longitudinal direction corresponding to the horizontal screen direction are arranged along the vertical screen direction. To the contrary, in accordance with this embodiment, as indicated in FIG. 55, not only the shape of the light entrance surface 31 of the first lenticular lens sheet 3, but also the shape of the light entrance surface 21 of the Fresnel lens sheet 2 are so formed that a plurality of horizontally elongate lenticular lenses having the longitudinal direction corresponding to the horizontal screen direction are arranged along the vertical screen direction.

In this embodiment, light diffusion along the vertical screen direction is mainly performed by the horizontally elongate lenticular lenses of the first lenticular lens sheet 3, and auxiliary light diffusion is carried out by the horizontally elongate lenticular lenses of the Fresnel lens sheet 2. No light diffusing material 15 is contained in the base sheets of the first lenticular lens sheet 3, the second lenticular lens sheet 4, and the light absorbing sheet 5.

At this time, the focusing characteristics of the image are slightly deteriorated, as compared with those of the fourth embodiment. When comparing with the conventional rear-projection screen, since the thickness of the first lenticular lens sheet 3 is made thin, and also no light diffusing material 15 is contained in the base sheets of the first lenticular lens sheet 3, the second lenticular lens sheet 4 and the light absorbing sheet 5, better focusing characteristics can be obtained.

Both of the brightness and contrast characteristics of the image are similar to those of the fourth embodiment.

As a consequence, there are such advantages also in this embodiment that the focusing characteristics, the brightness characteristics and the contrast characteristics of the image can be improved, and at the same time, the directional characteristics along the vertical screen direction can be enhanced.

Figure 56:
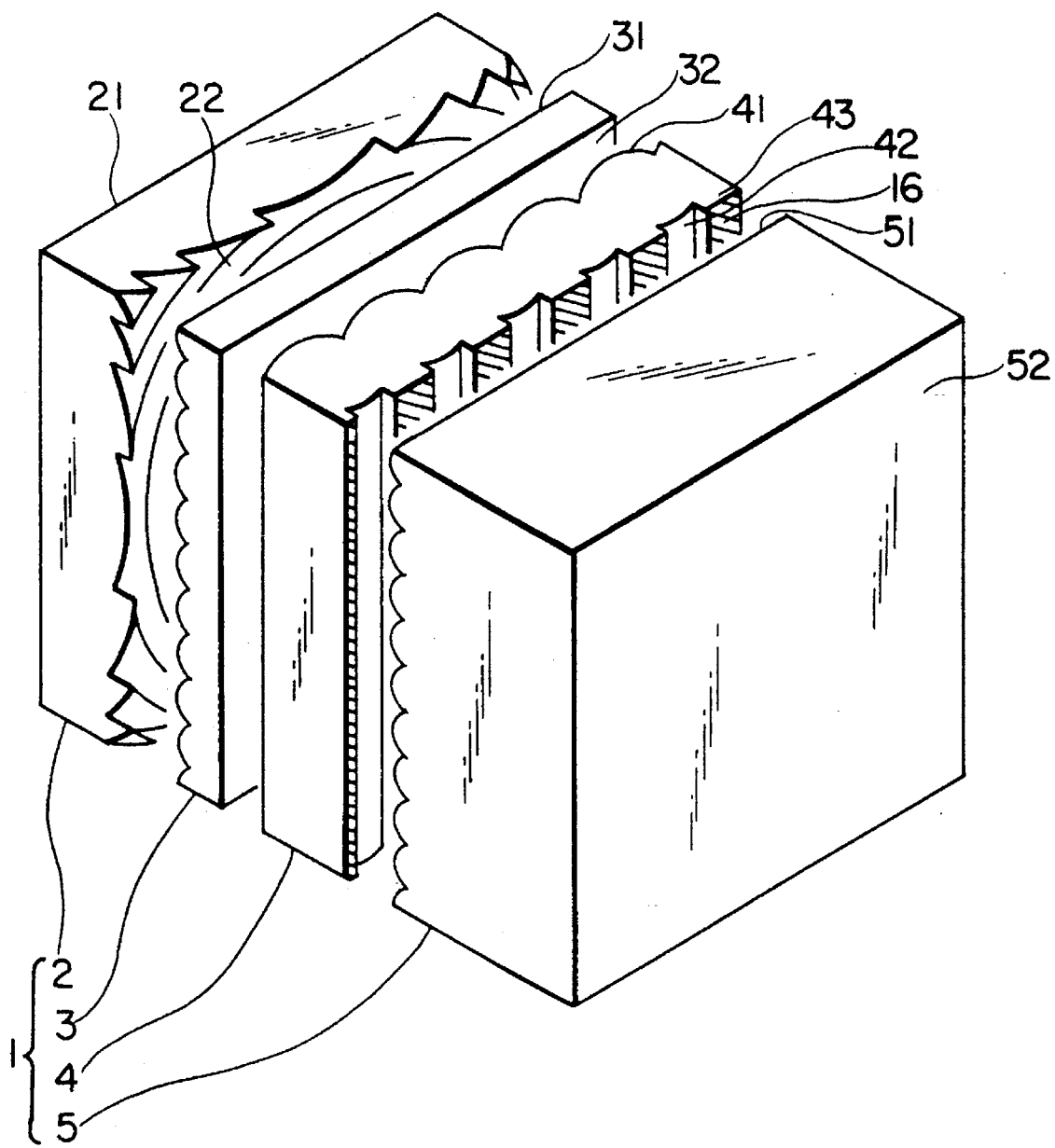
FIG. 56 is a perspective view for showing a major portion of a rear-projection screen according to a sixth embodiment of the present invention.

Referring to FIG. 56, a sixth embodiment of the present invention will now be described.

FIG. 56 is a perspective view for representing a major portion of a rear-projection screen according to a sixth embodiment of the present invention, in which the same reference numerals shown in FIG. 54 are employed as those for denoting the same or similar elements, and no explanations thereof are made.

A difference between this embodiment and the fourth embodiment shown in FIG. 54 is as follows. That is, in the fourth embodiment, as shown in FIG. 54, the shape of the light entrance surface 31 of the first lenticular lens sheet 3 is so formed that a plurality of horizontally elongate lenticular lenses having the longitudinal direction corresponding to the horizontal screen direction are arranged along the vertical screen direction. To the contrary, in accordance with this embodiment, as indicated in FIG. 56, not only the shape of the light entrance surface 31 of the first lenticular lens sheet 3, but also the shape of the light entrance surface 51 of the light absorbing sheet 5 are so formed that a plurality of horizontally elongate lenticular lense having the longitudinal direction corresponding to the horizontal screen direction are arranged along the vertical screen direction.

In this embodiment, light diffusion along the vertical screen direction is performed by the horizontally elongate lenticular lenses of the first lenticular lens sheet 3 and also the horizontally elongate lenticular lens of the light absorbing sheet 5 in a dispersive mode. No light diffusing material 15 is contained in the base sheets of the first lenticular lens sheet 3, the second lenticular lens sheet 4, and the light absorbing sheet 5.

In accordance with this embodiment, even when the radius of curvature of the horizontally lenticular lens of the light absorbing sheet 5 is made small so as to enhance the directional characteristics along the vertical screen direction, the focusing characteristics of this rear-projection screen are not deteriorated, which is similar to such a case that the radius curvature of the horizontally elongate lenticular lens of the first lenticular lens sheet according to the first embodiment, as shown in FIG. 13, is made small.

This can be achieved by arranging the vertically elongate lenticular lens provided at the light entrance surface 41 of the second lenticular lens sheet 4 close to the horizontally elongate lenticular lens provided at the light entrance surface 51 of the light absorbing sheet 5. In other words, according to this embodiment, since the starting point of the diffusion of the incident light rays along the horizontal screen direction is positioned close to the starting position of the incident light diffusion along the vertical screen direction, the focusing characteristic is not deteriorated.

As to brightness of the image, there is a similar effect to that of the fourth embodiment.

On the other hand, according to this embodiment, since the amount of the reflection rays occurring at the horizontally elongate lenticular lens provided at the light entrance surface 51 of the light absorbing sheet 5 along a direction of a front surface of the screen with respect to the externally supplied light rays, becomes greater than those of the fourth embodiment, as shown in FIG. 54, and of the fifth embodiment, as represented in FIG. 55, the contrast of the image is lowered as compared with the image contrast of the fourth embodiment and also the fifth embodiment. However, according to this embodiment, it is possible to compensate for such an image contrast by further providing fine concave and convex shapes over the entire light entrance surface 51 of the light absorbing sheet 5, or forming an optical reflection preventing film on the overall light entrance surface 51, namely by executing the nonglaring process.

As a consequence, there are such advantages also in this embodiment that the focusing characteristics, the brightness characteristics and the contrast characteristics of the image can be improved, and at the same time, the directional characteristics along the vertical screen direction can be enhanced.

Then, a seventh embodiment of the present invention will now be explained with reference to FIG. 57.

Figure 57:
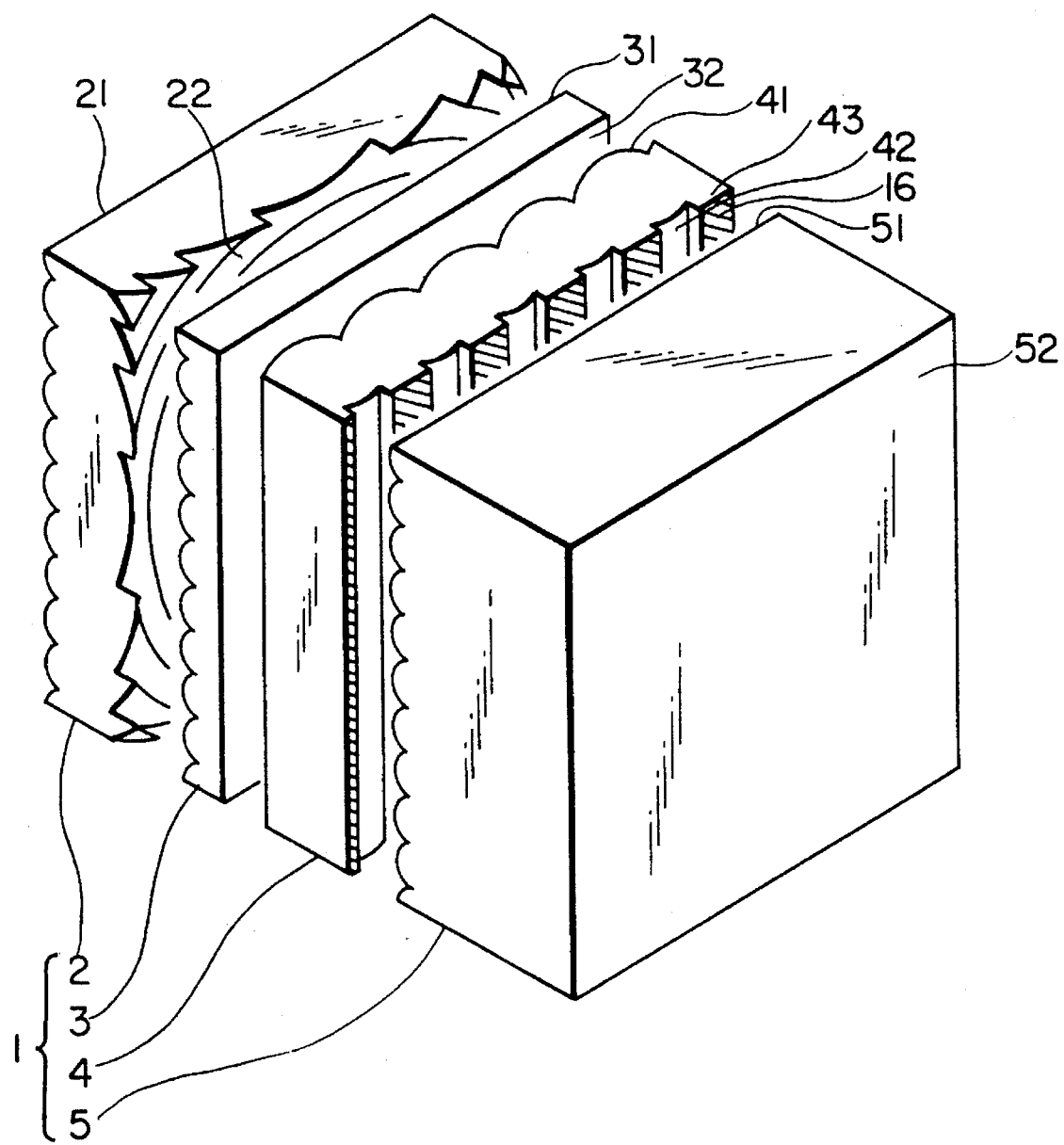
FIG. 57 is a perspective view for showing a major portion of a rear-projection screen according to a seventh embodiment of the present invention.

FIG. 57 is a perspective view for representing a major portion of a rear-projection screen according to a seventh embodiment of the present invention, in which the same reference numerals shown in FIGS. 55 and 56 are employed as those for denoting the same or similar elements, and no explanations thereof are made.

A difference between this embodiment and the sixth embodiment shown in FIG. 56 is as follows. That is, in the sixth embodiment, as shown in FIG. 56, the shape of the light entrance surface 31 of the first lenticular lens sheet 3 and the shape of the light entrance surface 51 of the light absorbing sheet 5 are so formed that a plurality of horizontally elongate lenticular lenses having the longitudinal direction corresponding to the horizontal screen direction are arranged along the vertical screen direction. To the contrary, in accordance with this embodiment, as indicated in FIG. 57, not only the shape of the light entrance surface 51 of the light absorbing sheet 5, and the shape of the light entrance surface 31 of the first lenticular lens sheet 3, but also the shape of the light entrance surface 21 of the Fresnel lens sheet 2 are so formed that a plurality of horizontally elongate lenticular lenses having the longitudinal direction corresponding to the horizontal screen direction are arranged along the vertical screen direction.

In this embodiment, light diffusion along the vertical screen direction is mainly performed by the horizontally elongate lenticular lenses of the first lenticular lens sheet 3 and the horizontally elongate lenticular lens of the light absorbing sheet 5, and auxiliary light diffusion is carried out by the horizontally elongate lenticular lenses of the Fresnel lens sheet 2. No light diffusing material 15 is contained in the base sheets of the first lenticular lens sheets of the first lenticular lens sheet 3, the second lenticular lens sheet 4, and the light absorbing sheet 5.

At this time, the focusing characteristics of the image are slightly deteriorated, as compared with those of the sixth embodiment. When comparing with the conventional rear-projection screen, since the thickness of the first lenticular lens sheet 3 is made thin, and also no light diffusing material 15 is contained in the base sheets of the first lenticular lens sheet 3, the second lenticular lens sheet 4 and the light absorbing sheet 5, better focusing characteristics can be obtained.

Both of the brightness and contrast characteristics of the image are similar to those of the sixth embodiment.

As a consequence, there are such advantages also in this embodiment that the focusing characteristics, the brightness characteristics and the contrast characteristics of the image can be improved, and at the same time, the directional characteristics along the vertical screen direction can be enhanced.

It should be understood that the shape of the horizontally elongate lenticular lens of the Fresnel lens sheet 2, the shape of the horizontally elongate lenticular lens of the first lenticular lens sheet 3, and the shape of the horizontally elongate lenticular lens of the light absorbing sheet 5 are so constructed that a plurality of convex lenticular lenses having the convex directed to the image generating source side are continuously arranged along the vertical direction of the rear-projection screen in the above-described rear-projection screens according to the fifth to seventh preferred embodiments. These shapes of the horizontally elongate lenticular lense may be so formed that a plurality of concave lenticular lenses having a concave directed to the image generating source side and also a plurality of convex lenticular lenses having a convex directed to the image generating source side are alternately and continuously arranged, which is similar to the shapes of the horizontally elongate lenticular lenses of the first lenticular lens sheet as represented in FIG. 35.

In this case, light diffusion along the vertical screen direction is mainly performed by the horizontally elongate lenticular lens of the first lenticular lens sheet 3. When auxiliary light diffusion is performed by other horizontally elongate lenticular lenses, the other horizontally elongate lenticular lenses to execute the auxiliary light diffusion may be so formed that only a plurality of convex lenticular lenses having a convex directed to the image generating source side are arranged along the vertical screen direction, which is similar to the shapes of the horizontally elongate lenticular lenses provided at the light entrance surface of the Fresnel lens sheet employed in the conventional rear-projection screen. This is because the shapes of the lenticular lenses to execute the auxiliary light diffusion are similar to a plane and such plane lenticular lenses can be easily manufactured.

On the other hands, in the above-described fourth to seventh embodiments of the present invention, an image ghost of projection image light caused by spurious or unwanted reflections at the Fresnel lens provided at the light exit surface 22 of the Fresnel lens sheet 2, does not become conspicuous. This reason will now be explained as follows:

FIG. 58A is a vertical sectional view of the Fresnel lens sheet 2 of the prior art rear-projection screen 1 of FIG. 1, and FIG. 58B is a vertical sectional view of the Fresnel lens sheet 2 of the rear-projection screen of FIG. 54. It should be noted that for the sake of simplicity, the horizontally elongate lenticular lenses of the light entrance surface 21 are omitted in FIG. 58A.

Generally, as shown in FIGS. 58A and 58B, most incident light rays 14' travel through the Fresnel lens sheet 2 in outgoing light rays 61, but some of the incident light rays 14' are reflected by the exit surface 22, reflected again by the entrance surface 21 toward the exit surface 22 and become ghost rays 62.

Since the prior art Fresnel lens sheet 2 has a relatively large thickness, the distance R between the desired image and the ghost image is relatively large as shown in FIG. 58A, and hence the ghost image is clearly distinguishable. On the other hand, since the Fresnel lens sheet 2 in the forgoing embodiments has a relatively small thickness, the distance R between the desired image and the ghost image is relatively small as shown in FIG. 58B, and hence the ghost image is obscure.

Forming the Fresnel lens sheet 2 in a relatively small thickness approximately equal to that of the second lenticular lens sheet 4 improves the focusing characteristics of the rear-projection screen effectively.

The exit surface 52 of the light absorbing sheet 5 may be finished by surface finishing processes including a glare-proof process, an antistatic process and a surface hardening process. A typical glare-proof process finishes the exit surface 52 of the light absorbing sheet 5 in a mat surface or coats the exit surface 52 with an optical antireflection film. The glare-proof process reduces the reflection of ambient images and the ambient light on the exit surface 52. The antistatic process prevents the static attraction of dust to the surface 52 of the light absorbing sheet 5. The surface hardening process enhances the resistance of the exit surface 52 of the light absorbing sheet 5 against physical damages resulting from the impingement of matters on the exit surface 52 of the light absorbing sheet 5.

On the other hand, according to the above-described first to seventh embodiments, since the aspheric shape of the horizontally elongate lenticular lenses of the light absorbing sheet are designed so as to secure vertical directional characteristics covering a wide range of vertical viewing angle without using any light diffusing material, the visual sensation of the brightness difference between adjacent portions of the exit surface of the light absorbing sheet corresponding to the vertically arranged horizontally elongate lenticular lenses is mitigated, and hence Moire is obscure. Such an effect of the horizontally elongate lenticular lenses will be described hereinafter with reference to FIG. 59.

The horizontally elongate lenticular lens of the first lenticular lens sheet 3 of respective embodiments focuses the light rays in a mode shown in FIGS. 20, 40, 46 and 48. The incident light rays falling on the entrance surface 31 of the first lenticular lens sheet 3 are focused on a focus by the shape of the horizontally elongate lenticular lens provided at the light entrance surface 31, and then the light rays diverge from the focus and travel toward the exit surface 32. Thus, the light rays representing each picture element of an image are diffused in diffused light rays in a predetermined range of diffusion.

Figure 59:
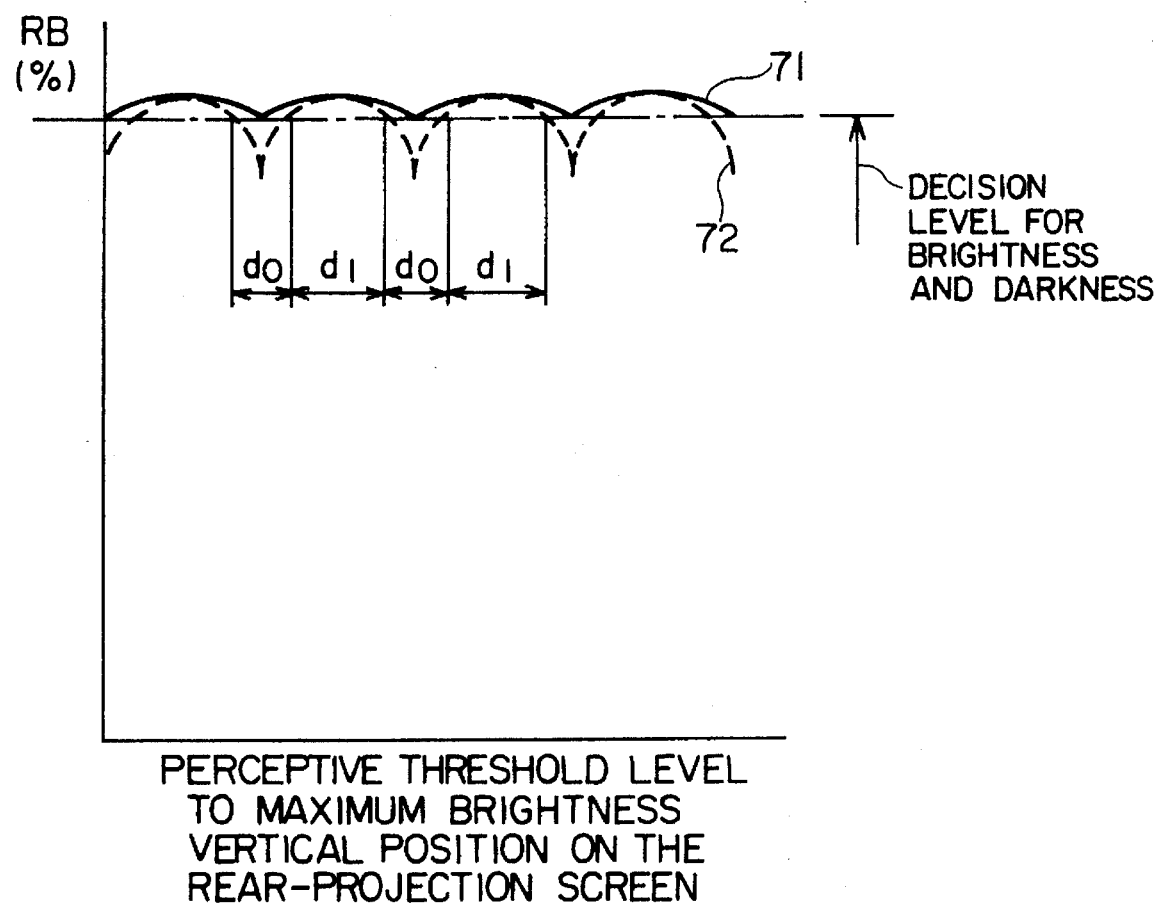
FIG. 59 is a graph comparatively showing brightness distribution with respect to vertical direction on the rear-projection screen of FIG. 1 and the rear-projection screen of FIG. 13.

Since this range of diffusion is very wide and the vertical directional characteristics cover a wide range of vertical viewing angle as shown in FIG. 21, a vertical brightness distribution curve 71 indicating the vertical brightness distribution on the exit surface 32 is relatively flat as shown in FIG. 59; that is, the brightness difference between the brighter portion and the darker portion is small. Accordingly, even if Moiré is formed by the brighter lines and darker lines alternately appearing on the exit surface 42, the intensity of Moiré is very low.

In the above-described first to third embodiments, none of the Fresnel lens sheet 2, the first lenticular lens sheet 3, and the second lenticular lens sheet 4 contains the light diffusing material 15. One or two sheets of the first and second lenticular lens sheets 3 and 4 contain a very small amount of the light diffusing material 15 to perform auxiliary light diffusion. Also, none of the Fresnel lens sheet 2, first lenticular lens sheet 3, second lenticular lens sheet 4 and light absorbing sheet 5 employed in the respective fourth to seventh embodiments contains the light diffusing material 15. Alternatively, a very small amount of the light diffusing material 15 may be dispersed in one, two or three sheets of them to perform the auxiliary light diffusion. In these cases, even when the directional characteristics along the vertical screen direction are enhanced, both of the focusing characteristic and the contrast characteristic of the image become improved and thus a similar merit to that obtained without the light diffusing material 15 may be achieved if the auxiliary light diffusion caused by the light diffusing material 15 is carried out.

Furthermore, in the respective embodiments, the shapes of the second vertically elongate lenticular lenses provided at the light exit surface 42 of the second lenticular lens sheet 4 are so formed that a plurality of lenticular lenses having shapes similar to those of the first vertically elongate lenticular lenses provided at the light entrance surface 41 are continuously arranged. Alternatively, the shape of the light exit surface 42 may be a simple plane and only the above-described light absorbing strip 16 may be employed. In this case, although the color shift of the image is slightly increased, other performances are substantially equal to those of such a case that the second vertically elongate lenticular lenses are provided at the light exit surface 42.

Finally, a description will now be made of a rear-projection type image display apparatus equipped with the rear-projection screen as defined in any of the first to seventh embodiments.

Preferably, the rear-projection image display apparatus as shown in FIG. 14 is provided with the rear-projection screen of the respective embodiments in combination with a conventional means for enhancing the contrast of the image.

As shown in FIG. 14, the rear-projection image display apparatus is provided with three projection CRTs (cathode-ray tubes) 7R, 7G and 7B for projecting images of three primary colors. Since the three projection CRTs 7R, 7G and 7B and the associated components are the same in function and construction, only the projection CRT 7G and the associated components will be described.

Figure 60:
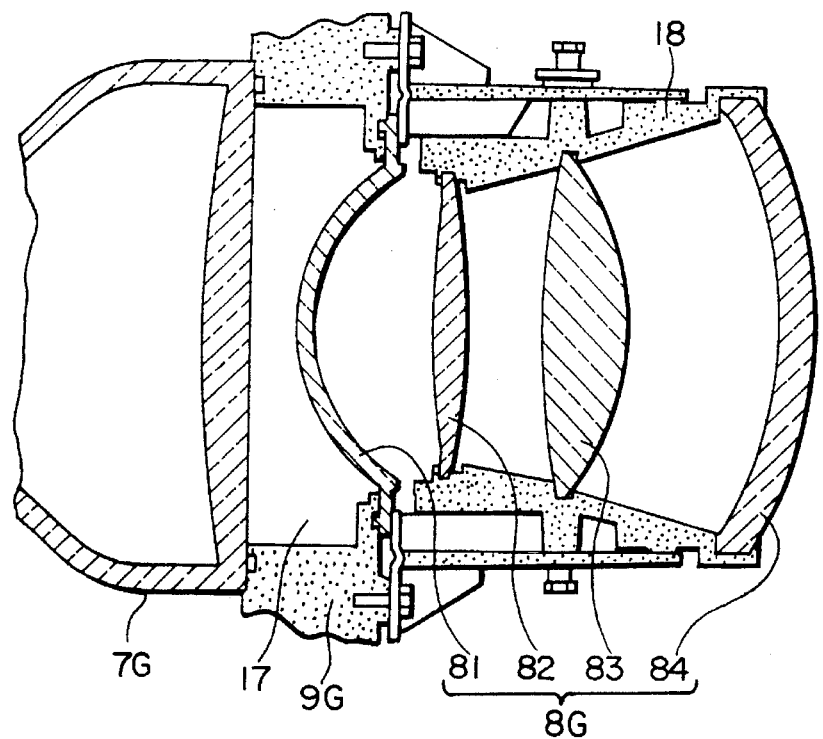
FIG. 60 is a sectional view for indicating a coupling unit between the projection type cathode-ray tube and the projection lens in the rear-projection type image display apparatus of FIG. 14.

FIG. 60 is a sectional view for showing a coupling unit between the projection lens and the projection CRT employed in the rear-projection type image display apparatus of FIG. 14.

Referring to FIG. 60, the green projection CRT 7G is connected to a projection lens unit 8G by a coupler 9G. The projection lens unit 8G comprises a lens barrel 18, a first lens 81, a second lens 82, a third lens 83 and a fourth lens 84. The first lens 81 is a concave lens having a convex surface and a concave surface and disposed with the convex surface thereof on the side of the projection CRT 7G. A liquid coolant 17 such as ethylene glycol, water, glycerol, or a mixture of these liquid coolant, is sealed in a space between the projection CRT 7G and the first lens 81.

If the space is filled merely with air instead of the liquid coolant 17, some of the light rays projected by the projection CRT 7G and traveling toward the first lens 81 stray within the projection optical system. If the stray light rays reach the rear-projection screen 1 after being reflected repeatedly in the projection optical system or the console 12, the contrast of the image is decreased.

To the contrary, when the space is filled with the liquid coolant 17, reflection loss of the light rays at interfaces between the projection CRT 7G and the liquid coolant 17 and between the liquid coolant 17 and the first lens 81 is very small and the image is displayed in high contrast, because the respective refractive indices of the screen of the projection CRT 7G, the liquid coolant 17 and the first lens 81 are approximately equal values on the order of 1.5.

The projection lens unit 8G constructed of the four lenses 81, 82, 83 and 84 is such as disclosed in JP-A-1-250916. However, the rear-projection image display apparatus may employ a projection lens unit other than that shown in FIG. 60, such as disclosed in JP-A-3- 246512 or JP-A-3-276113 or U.S. Pat. No. 4,963,007.

In constructing the rear-projection image display apparatus as shown in FIG. 14 by using the rear-projection screen 1 in one of the foregoing embodiments, it is preferable that the rear-projection image display incorporates conventional focusing characteristics improving means.

One of the focusing characteristics improving means is a reflective optical thin film formed on a major surface of the base of the reflecting mirror 11 as shown in FIG. 14 facing the projection lens unit 8G and the rear-projection screen 1.

FIG. 61 is an enlarged sectional view of the reflecting mirror 11 employed in the rear-projection type image display apparatus of FIG. 14.

Figure 61A:
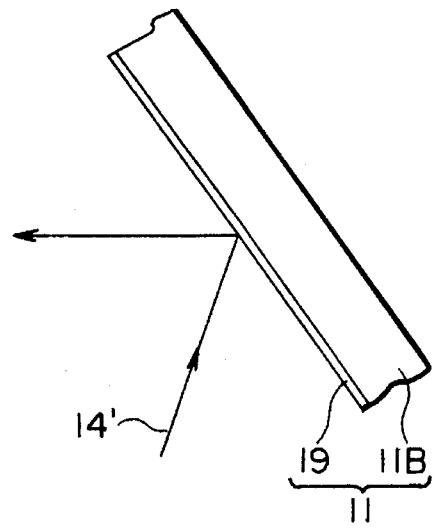
FIGS. 61A and 61B are a sectional view for indicating a reflection mirror employed in the rear-projection type image display apparatus of FIG. 14.
Figure 61B:
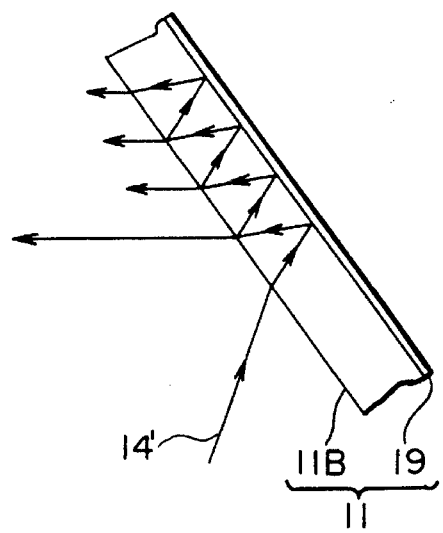

FIG. 61A shows a reflecting mirror 11 comprising a base 11B, i.e., a grass plate, and a reflective optical thin film 19 formed on the front major surface of the base 11B facing the projection lens unit 8G and the rear-projection screen 1, and FIG. 61B shows a reflecting mirror 11 comprising a base 11B, i.e., a grass plate, and a reflecting optical film 19 formed on the back major surface of the base 11B opposite the front major surface.

In the reflection mirror of FIG. 61B, multiple reflection occurs between the front and back major surfaces of the base 11B to expand the incident light rays 14' and, consequently, the image cannot be satisfactorily focused on the rear-projection screen 1.

On the other hand, in the reflection mirror 11 of FIG. 61A, the front major surface coated with the reflective optical thin film 19 reflects the incident light rays 14' and multiple reflection does not occur between the front and back major surfaces and, consequently, the image can be satisfactorily focused on the rear-projection screen 1.

As is apparent form the foregoing description, according to the present invention, light rays projected by the image generating sources, such as projection CRTs, travels through the projection lens units and fall on the rear-projection screen, the light rays are diffused horizontally by the vertically elongate aspherical lenticular lenses forming the entrance surface and the exit surface of the second lenticular lens sheet, and the light rays are diffused vertically primarily by the horizontally elongate aspherical lenticular lenses forming the entrance surface or the exit surface of the first lenticular lens sheet. The horizontally elongate lenticular lenses having a relatively small radius of curvature enhances the vertical directional characteristics of the rear-projection screen and increases the vertical angular range of visibility in accordance with the present invention.

Since the vertical directional characteristics of the rear-projection screen can be enhanced sufficiently by the horizontally elongate lenticular lenses of the first lenticular lens sheet, the first and second lenticular lens sheets and the light absorbing sheet need not contain any light diffusing material or may contain only a very small amount of the light diffusing material. Accordingly, the image is not obscured by the light diffusing effect of the light diffusing material and the image can be focused satisfactorily. Since there is only a little possibility of scattering the incident light rays and the ambient light, such as illuminating light, by the light diffusing material and stray rays are produced scarcely, the image can be displayed in high brightness and high contrast on the rear-projection screen.

Furthermore, according to the present invention, since the semitransparent, colored light absorbing sheet is disposed next to the image observing side with respect to the direction of travel of the light rays or the semitransparent, colored lenticular lens sheet is used, the reflection loss ratio of the ambient light is greater than that of the incident light rays and hence the rear-projection screen displays the image in improved contrast.

In addition, according to the present invention, since the thickness of the first lenticular lens sheet is made thinner than the thicknesses of the Fresnel lens sheet and the second lenticular lens sheet, and also the horizontally elongate lenticular lenses forming the entrance surface of the first lenticular lens sheet and the vertically elongate lenticular lenses forming the entrance surface of the second lenticular lens sheet are disposed close to each other, the origin of horizontal divergence of the light rays and the origin of vertical divergence of the light rays are close to each other, so that the image can be satisfactorily focused on the rear-projection screen even if the vertical directional characteristics of the rear-projection screen are enhanced.

Since the rear-projection screen is provided with the light absorbing sheet having a relatively large thickness and the Fresnel lens sheet having a thickness smaller than that of the Fresnel lens sheet of the prior art rear-projection screen, ghost images resulting from the unnecessary reflection of light rays by the Fresnel lens forming the exit surface of the Fresnel lens sheet can be obscured, and the image can be satisfactorily focused when the entrance surface of the Fresnel lens sheet is formed by the horizontally elongate lenticular lenses.

Still further, when the exit surface of the light absorbing sheet or the second lenticular lens sheet is finished by a glare-proof process, the reflection of matters on the viewing side and the ambient light on the rear-projection screen can be prevented. When the exit surface of the light absorbing sheet or the second lenticular lens sheet is finished by an antistatic process, the static attraction of dust to the exit surface can be prevented. When the exit surface of the light absorbing sheet or the second lenticular lens sheet is finished by a surface hardening process, the resistance of the exit surface against damages resulting from the impingement of matters on the exit surface can be enhanced.

What is claimed is:

1. A rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed in such a manner that a plurality of horizontally elongate lenticular lenses having a longitudinal direction corresponding to a horizontal direction of said rear-projection screen are continuously arranged on a light entrance surface of said first lenticular lens sheet and along a vertical direction of said rear-projection screen and each of said horizontally elongate lenticular lenses of said first lenticular lens sheet has a symmetrical shape with respect to the optical axis thereof, and when a contour shape of said horizontally elongate lenticular lenses is expressed by a function Z(r) of a distance "r" separated from said optical axis along the radial direction, a second differential value of said function Z(r) increases monotonously as r is increased, and a shape of a light entrance surface of said second lenticular lens sheet is formed in such a manner that a plurality of first vertically elongate lenticular lenses having a longitudinal direction corresponding to said vertical direction of said rear-projection screen are continuously arranged on a light entrance surface of said second lenticular lens sheet and along said horizontal direction of said rear-projection screen and each of said first vertically elongate lenticular lenses forming the entrance surface of said second lenticular lens sheet has a convex, horizontal cross section toward said image generating source and symmetrical with respect to the optical axis thereof, and a sign of a second differential of a function Z=f(r), where "r" is the distance between a point on a convex contour of the convex, horizontal cross section and the optical axis and Z is the distance parallel to the optical axis between a same point on the convex contour and a vertex of the convex, horizontal cross section, defining the convex contour of the convex, horizontal cross section for a point on the convex contour near the optical axis and the sign of the second differential of the function Z=f(r) for a point on the convex contour remote from the optical axis are different from each other.

2. A rear-projection screen as claimed in claim 1, wherein said horizontally elongate lenticular lenses of said first lenticular lens sheet are defined by:

$$l_0 \geq 2 \cdot l_1,$$

assuming that a distance along the optical axis direction is measured as "$l_0$", between a focal point obtained by a lens effect of said horizontally elongate lenticular lenses near the optical axis and a vertex of a contour shape of said horizontally elongate lenticular lenses, and also another distance along the optical axis direction is measured as "$l_1$", between a focal point obtained by a lens effect of said horizontally elongate lenticular lenses at a peripheral portion thereof and a vertex of a contour shape thereof.

3. A rear-projection screen as claimed in claim 1, wherein the light entrance surface of said first lenticular lens sheet is finished by a glareproof process.

4. A rear-projection image display apparatus comprising: said rear-projection screen as defined in claim 1.

5. A rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed in such a manner that a plurality of horizontally elongate lenticular lenses having a longitudinal direction corresponding to a horizontal direction of said rear-projection screen are continuously arranged on a light entrance surface of said first lenticular lens sheet and along a vertical direction of said rear-projection screen, and a shape of a light entrance surface of said second lenticular lens sheet is formed in such a manner that a plurality of first vertically elongate lenticular lenses having a longitudinal direction corresponding to said vertical direction of said rear-projection screen are continuously arranged on a light entrance surface of said second lenticular lens sheet and along said horizontal direction of said rear-projection screen, wherein each of said horizontally elongate lenticular lenses of said first lenticular lens sheet has a symmetrical shape with respect to the optical axis thereof, and when a contour shape of said horizontally elongate lenticular lenses is expressed by a function Z(r) of a distance "r" separated from said optical axis along the radial direction, a second differential value of said function Z(r) increases monotonously as r is increased.

6. A rear-projection screen as claimed in claim 5, wherein a thickness of said first lenticular lens sheet is selected to be thinner than thicknesses of said Fresnel lens sheet and of said second lenticular lens sheet.

7. A rear-projection screen as claimed in claim 5, wherein the light entrance surface of said first lenticular lens sheet is finished by a glareproof process.

8. A rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed as a convex Fresnel lens shape and also a shape of a light exit surface is formed in such a manner that a plurality of horizontally elongate lenticular lenses with a longitudinal direction corresponding to a horizontal direction of said rear-projection screen are continuously arranged along a vertical direction of said rear-projection screen, and each of said horizontally elongate lenticular lenses provided at the light exit surface of said first lenticular lens sheet has a symmetrical shape with respect to the optical axis thereof, and when a contour shape of said horizontally elongate lenticular lenses is expressed by a function Z(r) of a distance "r" separated from said optical axis along the radial direction, a second differential value of said function Z(r) increases monotonously as r is increased and wherein a shape of a light entrance surface of said second lenticular lens sheet is formed in such a manner that a plurality of first vertically elongate lenticular lenses with a longitudinal direction corresponding to said vertical direction of said rear-projection screen are continuously arranged along said horizontal direction of said rear-projection screen.

9. A rear-projection screen as claimed in claim 6, wherein said horizontally elongate lenticular lenses provided at the light exit surface of said first lenticular lens sheet are defined by:

$$l_0 \geq 2 \cdot l_1$$

assuming that a distance along the optical axis direction is measured as "$l_0$", between a focal point obtained by a lens effect of said horizontally elongate lenticular lenses near the optical axis and a vertex of a contour shape of said horizontally elongate lenticular lenses, and also another distance along the optical axis direction is measured as "$l_1$", between a focal point obtained by a lens effect of said horizontally elongate lenticular lenses at a peripheral portion thereof and a vertex of a contour shape thereof.

10. A rear-projection screen as claimed in claim 1 or 9, wherein at least one of said first lenticular lens sheet and said second lenticular lens sheet contains a light diffusing material.

11. A rear-projection screen as claimed in claim 1 or 9, wherein a semitransparent, colored light absorbing sheet is disposed on the image observing side of said second lenticular lens sheet.

12. A rear-projection screen as claimed in claim 11, wherein a bending stiffness of said light absorbing sheet is greater than that of said Fresnel lens sheet, said first lenticular lens sheet and said second lenticular lens sheet.

13. A rear-projection screen as claimed in claim 11, wherein a thickness of said light absorbing sheet is thicker than thicknesses of said Fresnel lens sheet, said first lenticular lens sheet and said second lenticular lens sheet.

14. A rear-projection screen as claimed in claim 8, wherein a thickness of said first lenticular lens sheet is selected to be thinner than thicknesses of said Fresnel lens sheet and of said second lenticular lens sheet.

15. A rear-projection screen as claimed in claim 8, wherein the light entrance surface of said first lenticular lens sheet is finished by a glareproof process.

16. A rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed in such a manner that a plurality of horizontally elongate lenticular lenses having a longitudinal direction corresponding to a horizontal direction of said rear-projection screen are continuously arranged on a light entrance surface of said first lenticular lens sheet and along a vertical direction of said rear-projection screen, and a shape of a light entrance surface of said second lenticular lens sheet is formed in such a manner that a plurality of first vertically elongate lenticular lenses having a longitudinal direction corresponding to said vertical direction of said rear-projection screen are continuously arranged on a light entrance surface of said second lenticular lens sheet and along said horizontal direction of said rear-projection screen, and each of said first vertically elongate lenticular lenses forming the entrance surface of said second lenticular lens sheet has a convex, horizontal cross section toward said image generating source and symmetrical with respect to the optical axis thereof, and a sign of a second differential of a function Z=f(r), where "r" is the distance between a point on a convex contour of the convex, horizontal cross section and the optical axis and Z is the distance parallel to the optical axis between a same point on the convex contour and a vertex of the convex, horizontal cross section, defining the convex contour of the convex, horizontal cross section for a point on the convex contour near the optical axis and the sign of the second differential of the function Z=f(r) for a point on the convex contour remote from the optical axis are different from each other.

17. A rear-projection screen as claimed in claim 16, wherein the exit surface of said second lenticular lens sheet is formed by horizontally arranging a plurality of second vertically elongate lenticular lenses substantially opposite to said first vertically elongate lenticular lenses, respectively, and horizontally arranging a plurality of vertically elongate light absorbing strips of a finite width on boundaries between adjacent second vertically elongate lenticular lenses, respectively, wherein each of said vertically elongate lenticular lenses forming the exit surface of said second lenticular lens sheet has a convex, horizontal cross section toward said image viewing side and symmetrical with respect to the optical axis thereof, and a sign of a second differential of a function Z=f(r), where "r" is the distance between a point on a convex contour of the convex, horizontal cross sectional and the optical axis and Z is a distance parallel to the optical axis between a same point on the convex contour and a vertex of the convex, horizontal cross section, defining the convex contour of the convex, horizontal cross section for a point on the convex contour near the optical axis and a sign of the second differential of the function Z=f(r) for a point on the convex contour remote from the optical axis are different from each other.

18. A rear-projection screen as claimed in claim 1, wherein a thickness of said first lenticular lens sheet is selected to be thinner than thicknesses of said Fresnel lens sheet and of said second lenticular lens sheet.

19. A rear-projection screen as claimed in claim 16, wherein a thickness of said first lenticular lens sheet is selected to be thinner than thicknesses of said Fresnel lens sheet and of said second lenticular lens sheet.

20. A rear-projection screen as claimed in claim 16, wherein the light entrance surface of said first lenticular lens sheet is finished by a glareproof process.

21. A rear-projection image display apparatus comprising:

said rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed in such a manner that a plurality of horizontally elongate lenticular lenses having a longitudinal direction corresponding to a horizontal direction of said rear-projection screen are continuously arranged on a light entrance surface of said first lenticular lens sheet and along a vertical direction of said rear-projection screen, and a shape of a light entrance surface of said second lenticular lens sheet is formed in such a manner that a plurality of first vertically elongate lenticular lenses having a longitudinal direction corresponding to said vertical direction of said rear-projection screen are continuously arranged on a light entrance surface of said second lenticular lens sheet and along said horizontal direction of said projection screen, wherein each of said horizontally elongate lenticular lenses of said first lenticular lens sheet has a symmetrical shape with respect to the optical axis thereof, and when a contour shape of said horizontally elongate lenticular lenses is expressed by a function Z(r) of a distance "r" separated from said optical axis along the radial direction, a second differential value of said function Z(r) increases monotonously as r is increased.

22. A rear-projection image display apparatus comprising:

said rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed as a convex Fresnel lens shape and also a shape of a light exit surface is formed in such a manner that a plurality of horizontally elongate lenticular lenses with a longitudinal direction corresponding to a horizontal direction of said rear-projection screen are continuously arranged along a vertical direction of said rear-projection screen, and each of said horizontally elongate lenticular lenses provided at the light exit surface of said first lenticular lens sheet has a symmetrical shape with respect to the optical axis thereof, and when a contour shape of said horizontally elongate lenticular lenses is expressed by a function $Z(r)$ of a distance "r" separated from said optical axis along the radial direction, a second differential value of said function $Z(r)$ is not constant and wherein a shape of a light entrance surface of said second lenticular lens sheet is formed in such a manner that a plurality of first vertically elongate lenticular lenses with a longitudinal direction corresponding to said vertical direction of said rear-projection screen are continuously arranged along said horizontal direction of said rear-projection screen.

23. A rear-projection image display apparatus comprising:

said rear-projection screen comprising a Fresnel lens sheet having a Fresnel lens on a light exit surface of said Fresnel lens sheet, a first lenticular lens sheet, and a second lenticular lens sheet arranged in this order from an image generating source side to an image observing side, wherein a shape of a light entrance surface of said first lenticular lens sheet is formed in such a manner that a plurality of horizontally elongate lenticular lenses having a longitudinal direction corresponding to a horizontal direction of said rear-projection screen are continuously arranged on a light entrance surface of said first lenticular lens sheet and along a vertical direction of said rear-projection screen, and a shape of a light entrance surface of said second lenticular lens sheet is formed in such a manner that a plurality of first vertically elongate lenticular lenses having a longitudinal direction corresponding to said vertical direction of said rear-projection screen are continuously arranged on a light entrance surface of said second lenticular lens sheet and along said horizontal direction of said rear-projection screen, and each of said first vertically elongate lenticular lenses forming the entrance surface of said second lenticular lens sheet has a convex, horizontal cross section toward said image generating source and symmetrical with respect to the optical axis thereof, and a sign of a second differential of a function $Z=f(r)$, wherein "r" is the distance between a point on a convex contour of the convex, horizontal cross section and the optical axis and Z is the distance parallel to the optical axis between a same point on the convex contour and a vertex of the convex, horizontal cross section, defining the convex contour of the convex, horizontal cross section for a point on the convex contour near the optical axis and the sign of the second differential of the function $Z=f(r)$ for a point on the convex contour remote from the optical axis are different from each other.

* * * * *

UNITED STATES PATENT AND TRADEMARK OFFICE
CERTIFICATE OF CORRECTION

PATENT NO. : 5,485,308
DATED : January 16, 1996
INVENTOR(S) : HIRATA et al.

It is certified that error appears in the above-indentified patent and that said Letters Patent is hereby corrected as shown below:

On the title page, item [30], change "May 15, 1994" to --May 15, 1992--.

Signed and Sealed this

Tenth Day of June, 1997

Attest:

BRUCE LEHMAN

Attesting Officer     *Commissioner of Patents and Trademarks*